(12) United States Patent
Shibata et al.

(10) Patent No.: US 7,895,248 B2
(45) Date of Patent: Feb. 22, 2011

(54) INFORMATION PROCESSING APPARATUS, INFORMATION PROCESSING METHOD, RECORDING MEDIUM AND PROGRAM

(75) Inventors: Yoshiaki Shibata, Kanagawa (JP); Mitsutoshi Shinkai, Kanagawa (JP); Nobuhiro Kotaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 382 days.

(21) Appl. No.: 11/064,464

(22) Filed: Feb. 23, 2005

(65) Prior Publication Data

US 2005/0198018 A1    Sep. 8, 2005

(30) Foreign Application Priority Data

Feb. 24, 2004 (JP) ............................. 2004-047625

(51) Int. Cl.
*G06F 17/30* (2006.01)

(52) U.S. Cl. ...................................... 707/823; 346/137

(58) Field of Classification Search ................. 707/823; 346/137
See application file for complete search history.

(56) References Cited

U.S. PATENT DOCUMENTS

| 5,956,716 A * | 9/1999 | Kenner et al. ................. 707/10 |
| 2002/0131764 A1 * | 9/2002 | David et al. ................... 386/69 |
| 2002/0159752 A1 * | 10/2002 | David .......................... 386/52 |

* cited by examiner

*Primary Examiner*—Khanh B Pham
*Assistant Examiner*—Johnese Johnson
(74) *Attorney, Agent, or Firm*—Frommer Lawrence & Haug LLP; William S. Frommer; Ellen Marcie Emas

(57) ABSTRACT

A clip without UMID is transmitted to a disc drive from an editing device. The disc drive generates the UMID and NRT with respect to the transmitted clip, and stores the UMID in association with the NRT. The editing device edits the NRT, and transmits the NRT that is edition results to the disc drive. The disc drive overwrites the NRT that has been transmitted from the editing device on the generated NRT, and stores the NRT in association with the clip with the UMID. The present invention can be applied to a disc recording and reproducing device.

6 Claims, 40 Drawing Sheets

FIG. 11

| UMID of Input signal | Univ Lavel | Instance | \{ TimeSnap | Rnd | DeviceNode \} Material Number |
|---|---|---|---|---|---|
| NEW | | | | | |
| None | | | | | |
| Clip.smi | | | | | |
| MpUmid=" | 060A2B34010101050101010D43 | 13 000000 | 6C291C00722405C2 | 0800 | 46020117F001 " |
| FpUmid=" | 060A2B34010101050101010D43 | 13 000000 | 6D291C00722405C2 | 0800 | 46020117F001 " |
| RealTimeMeta.bim | | | | | |
| BodyUmid=" | 060A2B34010101050101010D43 | 13 000000 | 6C291C00722405C2 | 0800 | 46020117F001 " |
| Picture.mxf | | | | | |
| MpUmid=" | 060A2B34010101050101010643 | 13 000000 | 6C291C00722405C2 | 0800 | 46020117F001 " |
| FpUmid=" | 060A2B34010101050101010643 | 13 000000 | 6D291C00722405C2 | 0800 | 46020117F001 " |
| AudioCh1.mxf | | | | | |
| MpUmid=" | 060A2B34010101050101010843 | 13 000000 | 6C291C00722405C2 | 0800 | 46020117F001 " |
| FpUmid=" | 060A2B34010101050101010843 | 13 000000 | 6D291C00722405C2 | 0800 | 46020117F001 " |
| AudioCh2.mxf | | | | | |
| MpUmid=" | 060A2B34010101050101010843 | 13 000000 | 6E291C00722405C2 | 0800 | 46020117F001 " |
| FpUmid=" | 060A2B34010101050101010843 | 13 000000 | 6F291C00722405C2 | 0800 | 46020117F001 " |
| AudioCh3.mxf | | | | | |
| MpUmid=" | 060A2B34010101050101010843 | 13 000000 | 70291C00722405C2 | 0800 | 46020117F001 " |
| FpUmid=" | 060A2B34010101050101010843 | 13 000000 | 71291C00722405C2 | 0800 | 46020117F001 " |
| AudioCh4.mxf | | | | | |
| MpUmid=" | 060A2B34010101050101010843 | 13 000000 | 72291C00722405C2 | 0800 | 46020117F001 " |
| FpUmid=" | 060A2B34010101050101010843 | 13 000000 | 73291C00722405C2 | 0800 | 46020117F001 " |
| Proxy.mxf | | | | | |
| MpUmid=" | 060A2B34010101050101010D43 | 13 FF0000 | 6C291C00722405C2 | 0800 | 46020117F001 " |
| FpUmid=" | 060A2B34010101050101010D43 | 13 FF0000 | 6D291C00722405C2 | 0800 | 46020117F001 " |

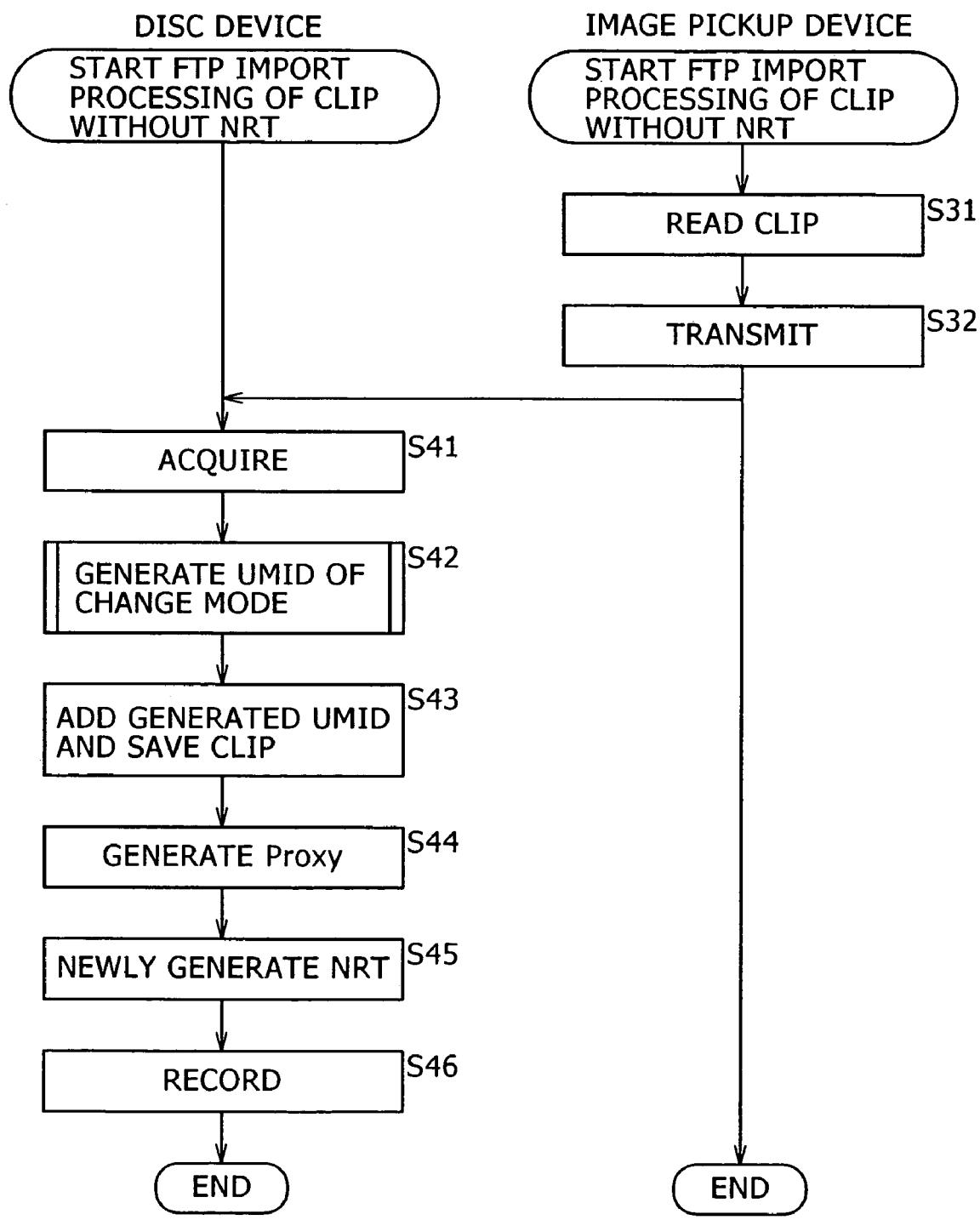

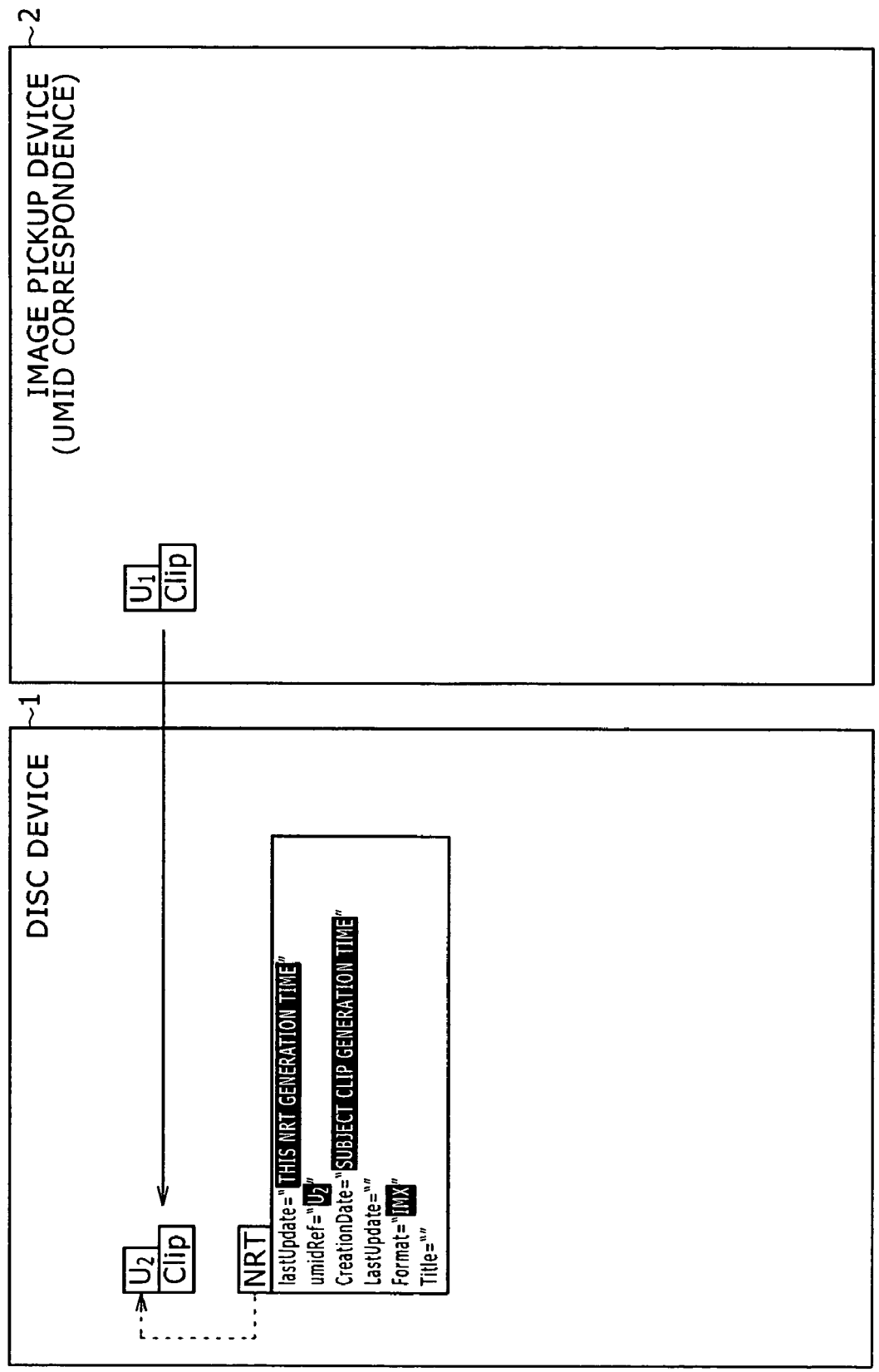

FIG. 15

| | Univ Lavel | Instance | | Material Number | | |
|---|---|---|---|---|---|---|
| | | | TimeSnap | | Rnd | DeviceNode |

| UMID of Input signal | | | | | | |
|---|---|---|---|---|---|---|
| MpUmid UMID=" | 060A2B34010101050101010D43 | 13 0000000 | 2405C20800460201 | 17F0 | 016C291C0072 " |
| Clip.smi | | | | | |
| MpUmid=" | 060A2B34010101050101010D43 | 13 000000 | 6C291C00722405C2 | 0800 | 46020117F0 | 016C291C0072 " |
| FpUmid=" | 060A2B34010101050101010D43 | 13 01ABCD | 2405C20800460201 | 17F0 | 016C291C0072 " |
| RealTimeMeta.bim | | | | | |
| BodyUmid=" | 060A2B34010101050101010D43 | 13 000000 | 2405C20800460201 | 17F0 | 016C291C0072 " |
| Picture.mxf | | | | | |
| MpUmid=" | 060A2B340101010501010100643 | 13 000000 | 6C291C00722405C2 | 0800 | 46020117F0 | 016C291C0072 " |
| FpUmid=" | 060A2B340101010501010100643 | 13 01ABCD | 2405C20800460201 | 17F0 | 016C291C0072 " |
| AudioCh1.mxf | | | | | |
| MpUmid=" | 060A2B340101010501010100843 | 13 000000 | 6C291C00722405C2 | 0800 | 46020117F0 | 016C291C0072 " |
| FpUmid=" | 060A2B340101010501010100843 | 13 01ABCD | 2405C20800460201 | 17F0 | 016C291C0072 " |
| AudioCh2.mxf | | | | | |
| MpUmid=" | 060A2B340101010501010100843 | 13 000000 | 6E291C00722405C2 | 0800 | 46020117F0 | 016C291C0072 " |
| FpUmid=" | 060A2B340101010501010100843 | 13 01ABCE | 2405C20800460201 | 17F0 | 016C291C0072 " |
| AudioCh3.mxf | | | | | |
| MpUmid=" | 060A2B340101010501010100843 | 13 000000 | 70291C00722405C2 | 0800 | 46020117F0 | 016C291C0072 " |
| FpUmid=" | 060A2B340101010501010100843 | 13 01ABDO | 2405C20800460201 | 17F0 | 016C291C0072 " |
| AudioCh4.mxf | | | | | |
| MpUmid=" | 060A2B340101010501010100843 | 13 000000 | 72291C00722405C2 | 0800 | 46020117F0 | 016C291C0072 " |
| FpUmid=" | 060A2B340101010501010100843 | 13 01ABCE | 2405C20800460201 | 17F0 | 016C291C0072 " |
| Proxy.mxf | | | | | |
| MpUmid=" | 060A2B34010101050101010D43 | 13 FF0000 | 6C291C00722405C2 | 0800 | 46020117F0 | 016C291C0072 " |
| FpUmid=" | 060A2B34010101050101010D43 | 13 01ABCE | 2405C20800460201 | 17F0 | 016C291C0072 " |

FIG. 18

MXF INPUT (UMID SAVE MODE)

| | Univ Lavel | Instance | Material Number | | |
|---|---|---|---|---|---|
| | | | TimeSnap | Rnd | DeviceNode |

UMID of Input signal
MpUmid UMID="060A2B34010101050101010D4313 00000024 05C2080046020117F0016C291C0072"
FpUmid UMID="060A2B34010101050101010D4313 000000F0 016C291C00722405C2080046020117"

Clip.smi
MpUmid="060A2B34010101050101010D4313 00000024 05C2080046020117F0016C291C0072"
FpUmid="060A2B34010101050101010D4313 000000F0 016C291C00722405C2080046020117"

RealTimeMeta.bim
BodyUmid="060A2B34010101050101010D4313 00000024 05C2080046020117F0016C291C0072"

Picture.mxf
MpUmid="060A2B340101010501010106 4313 00000024 05C2080046020117F0016C291C0072"
FpUmid="060A2B340101010501010106 4313 000000F0 016C291C00722405C2080046020117"

AudioCh1.mxf
MpUmid="060A2B3401010105010101084313 00000024 05C2080046020117F0016C291C0072"
FpUmid="060A2B3401010105010101084313 000000F0 016C291C00722405C2080046020117"

AudioCh2.mxf
MpUmid="060A2B3401010105010101084313 00000026 05C2080046020117F0016C291C0072"
FpUmid="060A2B3401010105010101084313 000000F2 016C291C00722405C2080046020117"

AudioCh3.mxf
MpUmid="060A2B3401010105010101084313 00000028 05C2080046020117F0016C291C0072"
FpUmid="060A2B3401010105010101084313 000000F4 016C291C00722405C2080046020117"

AudioCh4.mxf
MpUmid="060A2B3401010105010101084313 0000002A 05C2080046020117F0016C291C0072"
FpUmid="060A2B3401010105010101084313 000000F6 016C291C00722405C2080046020117"

Proxy.mxf
MpUmid="060A2B34010101050101010D4313 FF000024 05C2080046020117F0016C291C0072"
FpUmid="060A2B34010101050101010D4313 FF0000F0 016C291C00722405C2080046020117"

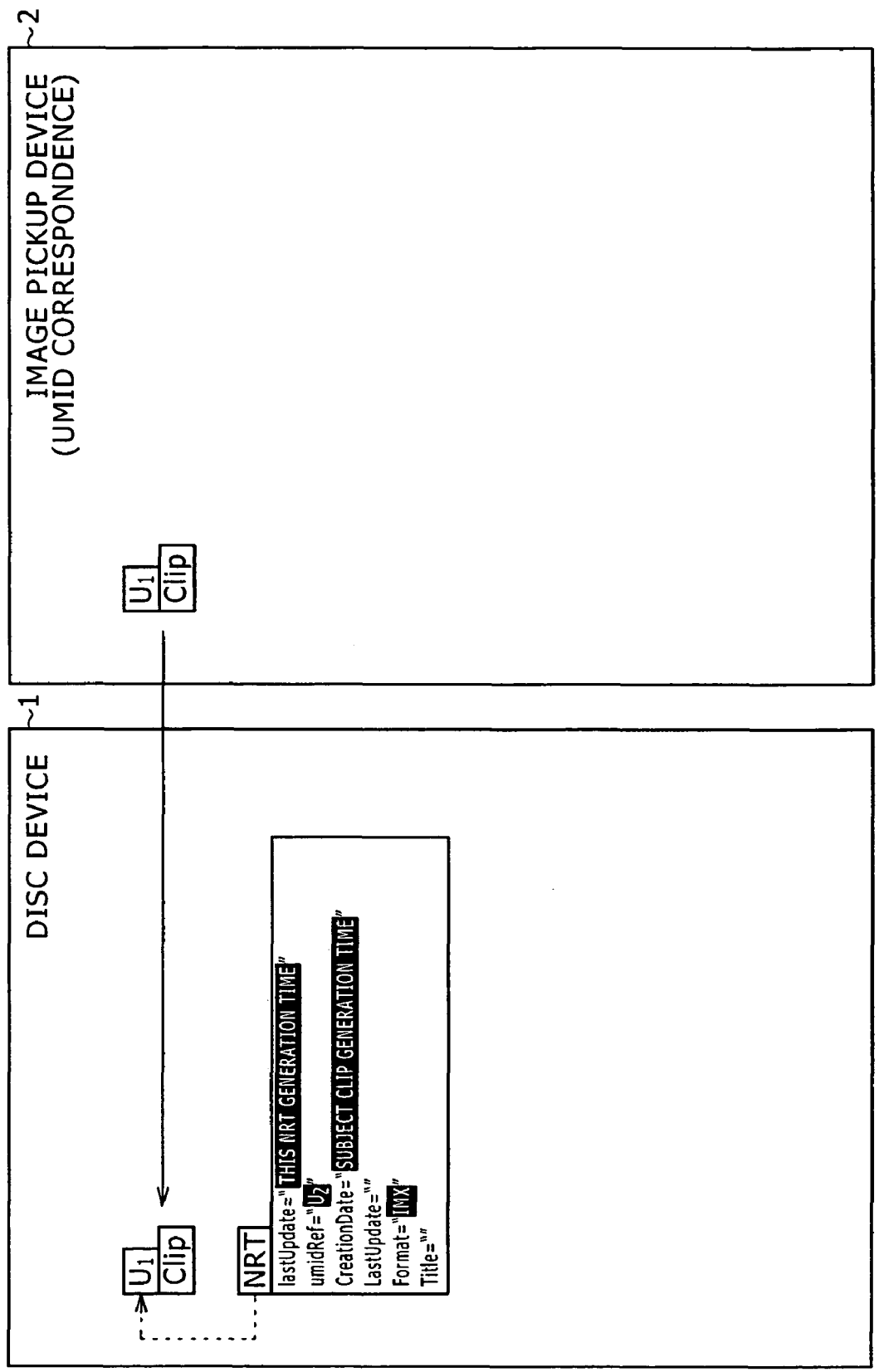

FIG. 39

| | Univ Lavel | Instance | Material Number ||| |
|---|---|---|---|---|---|
| | | | TimeSnap | Rnd | DeviceNode |

SDI INPUT (SINGLE CLIP)

UMID of Input signal
Ancillary UMID=" 060A2B340101010501010D43 13 02FEDC 6C291C00722405C2 0800 46020117F0 016C291C0072 "

Clip.smi
MpUmid=" 060A2B340101010501010D43 13 000000 6C291C00722405C2 0800 46020117F0 016C291C0072 "
FpUmid=" 060A2B340101010501010D43 13 03ABCD 6C291C00722405C2 0800 46020117F0 016C291C0072 "

RealTimeMeta.bim
BodyUmid=" 060A2B340101010501010D43 13 03ABCD 6C291C00722405C2 0800 46020117F0 016C291C0072 "

Picture.mxf
MpUmid=" 060A2B340101010501010646 43 000000 6C291C00722405C2 0800 46020117F0 016C291C0072 "
FpUmid=" 060A2B340101010501010646 43 03ABCD 6C291C00722405C2 0800 46020117F0 016C291C0072 "

AudioCh1.mxf
MpUmid=" 060A2B340101010501010846 43 000000 6C291C00722405C2 0800 46020117F0 016C291C0072 "
FpUmid=" 060A2B340101010501010846 43 03ABCD 6C291C00722405C2 0800 46020117F0 016C291C0072 "

AudioCh2.mxf
MpUmid=" 060A2B340101010501010846 43 000000 6E291C00722405C2 0800 46020117F0 016C291C0072 "
FpUmid=" 060A2B340101010501010846 43 03ABCE 6C291C00722405C2 0800 46020117F0 016C291C0072 "

AudioCh3.mxf
MpUmid=" 060A2B340101010501010846 43 000000 70291C00722405C2 0800 46020117F0 016C291C0072 "
FpUmid=" 060A2B340101010501010846 43 03ABCF 6C291C00722405C2 0800 46020117F0 016C291C0072 "

AudioCh4.mxf
MpUmid=" 060A2B340101010501010846 43 000000 72291C00722405C2 0800 46020117F0 016C291C0072 "
FpUmid=" 060A2B340101010501010846 43 03ABD0 6C291C00722405C2 0800 46020117F0 016C291C0072 "

Proxy.mxf
MpUmid=" 060A2B340101010501010D43 13 FF0000 6C291C00722405C2 0800 46020117F0 016C291C0072 "
FpUmid=" 060A2B340101010501010D43 13 03ABCE 6C291C00722405C2 0800 46020117F0 016C291C0072 "

FIG. 40

SDI INPUT (PLURAL CLIPS)

UMID of Input signal: Not determined

| | Univ Lavel | Instance | | Material Number | | |
|---|---|---|---|---|---|---|
| | | | TimeSnap | | Rnd | DeviceNode |

Clip.smi
MpUmid=" 060A2B3401010105010100D43 13 00000000 6C291C00722405C2 0800 46020117F001 "
FpUmid=" 060A2B3401010105010100D43 13 00000000 6D291C00722405C2 0800 46020117F001 "

RealTimeMeta.bim
BodyUmid=" 060A2B3401010105010100D43 13 00000000 6C291C00722405C2 0800 46020117F001 "

Picture.mxf
MpUmid=" 060A2B3401010105010100643 13 00000000 6C291C00722405C2 0800 46020117F001 "
FpUmid=" 060A2B3401010105010100643 13 00000000 6D291C00722405C2 0800 46020117F001 "

AudioCh1.mxf
MpUmid=" 060A2B3401010105010100843 13 00000000 6C291C00722405C2 0800 46020117F001 "
FpUmid=" 060A2B3401010105010100843 13 00000000 6D291C00722405C2 0800 46020117F001 "

AudioCh2.mxf
MpUmid=" 060A2B3401010105010100843 13 00000000 6E291C00722405C2 0800 46020117F001 "
FpUmid=" 060A2B3401010105010100843 13 00000000 6F291C00722405C2 0800 46020117F001 "

AudioCh3.mxf
MpUmid=" 060A2B3401010105010100843 13 00000000 70291C00722405C2 0800 46020117F001 "
FpUmid=" 060A2B3401010105010100843 13 00000000 71291C00722405C2 0800 46020117F001 "

AudioCh4.mxf
MpUmid=" 060A2B3401010105010100843 13 00000000 72291C00722405C2 0800 46020117F001 "
FpUmid=" 060A2B3401010105010100843 13 00000000 73291C00722405C2 0800 46020117F001 "

Proxy.mxf
MpUmid=" 060A2B3401010105010100D43 13 FF0000 6C291C00722405C2 0800 46020117F001 "
FpUmid=" 060A2B3401010105010100D43 13 FF0000 6D291C00722405C2 0800 46020117F001 "

INFORMATION PROCESSING APPARATUS, INFORMATION PROCESSING METHOD, RECORDING MEDIUM AND PROGRAM

BACKGROUND OF THE INVENTION

1. Field of the Invention

The present invention relates to an information processing apparatus, an information processing method, a recording medium and a program, and more particularly to an information processing apparatus, an information processing method, a recording medium and a program, which allow UMID to be generated at a high speed, and can manage even a material by means of the UMID, which has been edited by another information processing apparatus that cannot manage the UMID.

2. Description of the Related Art

Conventionally, in a production site of news program, after desired pieces have been extracted from a large number of AV (audio visual) data that is coverage results, those pieces are joined together. The program is produced with the above work.

However, it is difficult to conduct the work that the desired pieces are extracted from an enormous amount of AV data while recalling the coverage situation. As a result, a work that AV data is reproduced one by one, and confirmation is conducted while viewing the reproduced AV data is repeated, and the desired pieces are extracted every time those pieces are found out. Such a troublesome work must be conducted.

Under the above circumstances, in order to eliminate the troublesomeness of the above program production, there has been proposed, for example, that the AV data and the situation at the time of coverage are liable to be managed by recording coverage information on a common disc recording medium for all equipments such as an image pickup device used in coverage and an editing device (for example, refer to JP 11-088821A).

However, in the above-mentioned manner, it is difficult to conduct edition processing by plural persons at the same time, such that a first staff edits the AV data, and a second staff produces information (for example, metadata) related to the AV data. Also, it is difficult to efficiently advance the work in the coverage program that must be produced in a short time.

In order to solve the above problem, there has been proposed a method in which a UMID (unique material identifier) is attached to each of materials that are generated, individually as inherent ID for identifying those materials to manage AV data in the case where the respective AV data materials are edited by plural persons at the same time.

The UMID is ID that is attached to individual elements such as image data or audio data of AV data which is a material, and the use of UMID enables an enormous amount of AV data including photograph and edition to be managed, and, for example, enables simultaneous edition to be conducted by plural staffs.

However, in the process of attaching UMID to the materials that are edition results, individually, it is necessary to generate UMID for the individual materials such as the image data or the audio data of the AV data one by one, individually. However, in recent years, the amount of data of the material that is dealt with by the AV data is increasing with an increase in the number of channels of the audio data, and a demand that a larger amount of UMID is generated at a high speed is increased. However, a speed at which the UMID is generated is limited. When the material is generated at a speed higher than the limited speed, the UMID cannot be attached to the respective materials with the result that there is a fear that a management per se of the material by the UMID is failed.

Also, even if UMID is attached to the materials that are edition results, individually, UMID cannot be recognized depending on the equipments, and in this case, there arises such a problem that UMID which identifies the materials cannot be effectively employed for edition.

SUMMARY OF THE INVENTION

The present invention has been made under the above circumstances, and particularly can produce a large amount of UMID at a high speed and also can realize management of a material that has been edited by an information processing apparatus which cannot manage UMID by means of UMID.

In order to achieve the above object, according to the present invention, there is provided an information processing apparatus comprising a receiving section that receives clip data which is generated by another information processing apparatus; a UMID generating section that generates UMID corresponding to the clip data which is generated by another information processing apparatus; a nonreal time metadata generating section that generates nonreal time metadata including the UMID corresponding to the clip data which is generated by another information processing apparatus; and a transmitting section that transmits the nonreal time metadata which is generated by the nonreal time metadata generating section to another information processing apparatus.

The receiving section can receive the nonreal time metadata transmitted from the transmitting section which is edited by another information processing apparatus.

The information processing apparatus further comprises a memory section that stores the nonreal time metadata which is generated by the nonreal time metadata generating section in association with the clip data which is generated by another information processing apparatus. The memory section overwrites the nonreal time metadata which is edited by another information processing apparatus on the nonreal time metadata which is generated by another information processing apparatus, and can store the overwritten nonreal time metadata in association with the clip data which is generated by another information processing apparatus.

According to the present invention, there is provided an information processing method comprising the steps of: receiving clip data which is generated by another information processing apparatus; generating UMID corresponding to the clip data which is generated by another information processing apparatus; generating nonreal time metadata including the UMID corresponding to the clip data which is generated by another information processing apparatus; and transmitting the nonreal time metadata which is generated by the nonreal time metadata generating section to another information processing apparatus.

According to the present invention, there is provided a recording medium readable by a computer, the storage medium storing a program comprising: controlling the reception of clip data generated by an information processing apparatus; controlling the generation of UMID corresponding to the clip data received by the process of controlling the reception; controlling the generation of nonreal time metadata including the UMID generated in the process of controlling the generation of the UMID, which corresponds to the clip data; and controlling the transmission of the nonreal time metadata generated in the process of controlling the generation of the nonreal time metadata to the information processing apparatus.

According to the present invention, there is provided a program executable by a computer, comprising: controlling the reception of clip data generated by an information processing apparatus; controlling the generation of UMID corresponding to the clip data received by the process of controlling the reception; controlling the generation of nonreal time metadata including the UMID generated in the process of controlling the generation of the UMID, which corresponds to the clip data; and controlling the transmission of the nonreal time metadata generated in the process of controlling the generation of the nonreal time metadata to the information processing apparatus.

In the information processing apparatus and method, and program, the clip data that is generated by another information processing apparatus is received, the nonreal time metadata including the generated UMID in association with the clip data is generated, and the generated nonreal time metadata is transmitted to another information processing apparatus.

The information processing apparatus according to the present invention may be structured by an independent apparatus or a block that conducts information processing.

According to the present invention, a large amount of UMID can be generated at a high speed, and even the material that is edited by an information processing apparatus which cannot manage UMID can be managed by using UMID.

BRIEF DESCRIPTION OF THE DRAWINGS

These and other objects and advantages of this invention will become more fully apparent from the following detailed description taken with the accompanying drawings in which:

FIG. 11 is a diagram for explaining the new-UMID generating process;

FIG. 12 is a flowchart for explaining an FTP import process of a clip without NRT in a disk drive and the image pickup device shown in FIG. 3 in a change mode;

FIG. 13 is a diagram for explaining an FTP import process of a clip without NRT in a disk drive and the image pickup device shown in FIG. 3 in a change mode;

FIG. 15 is a diagram for explaining the UMID generating process in the change mode;

FIG. 18 is a diagram for explaining the UMID generating process in the save mode;

FIG. 19 is a diagram for explaining an FTP import process of a clip without NRT in the disk drive and the image pickup device shown in FIG. 3 in the save mode;

FIG. 39 is a diagram for explaining-a UMID generating process in the SDI transfer; and FIG. 40 is a diagram for explaining the UMID generating process in the SDI transfer.

DETAILED DESCRIPTION OF THE PREFERRED EMBODIMENTS

Now, a description will be given in more detail of preferred embodiments of the present invention with reference to the accompanying drawings. The correspondence of the present invention and embodiments described in the present specification is exemplified as follows. This description confirms that the embodiments that support the present invention described in the present specification are described in the present specification. Accordingly, even if there is an embodiment that is described in the embodiments of the present invention but is not described in the present specification as corresponding to the present invention, this does not means that the embodiment does not correspond to the present invention. Conversely, even if the embodiment is described as corresponding to the present invention, this does not mean that the embodiment does not correspond to the invention other than that invention.

In addition, the present description does not mean all of the present invention described in the present specification. In other words, this description does not deny the existence of the invention which is not claimed in the present application, that is, the existence of the invention that is subjected to a divisional application, or appears and is added by amendment in the future in the invention described in the present specification.

That is, according to the present invention, there is provided an information processing apparatus comprising: a receiving section (for example, a communication section 20 in FIG. 2) that receives clip data which is generated by another information processing apparatus; a UMID generating section (for example, a UMID generating section 31 in FIG. 2) that generates UMID corresponding to the clip data which is generated by another information processing apparatus; a nonreal time metadata generating section (for example, an NRT editing section 32 in FIG. 2) that generates nonreal time metadata including the UMID corresponding to the clip data which is generated by another information processing apparatus; and a transmitting section (for example, a communication section 20 in FIG. 2) that transmits the nonreal time metadata which is generated by the nonreal time metadata generating section to another information processing apparatus.

The information processing apparatus may further comprise a memory section (for example, a disc drive section 22 in FIG. 2) that stores the nonreal time metadata which is generated by the nonreal time metadata generating section in association with the clip data which is generated by another information processing apparatus. The memory section overwrites the nonreal time metadata which is edited by another information processing apparatus on the nonreal time metadata which is generated by another information processing apparatus, and can store the overwritten nonreal time metadata in association with the clip data which is generated by another information processing apparatus.

Figure 34:
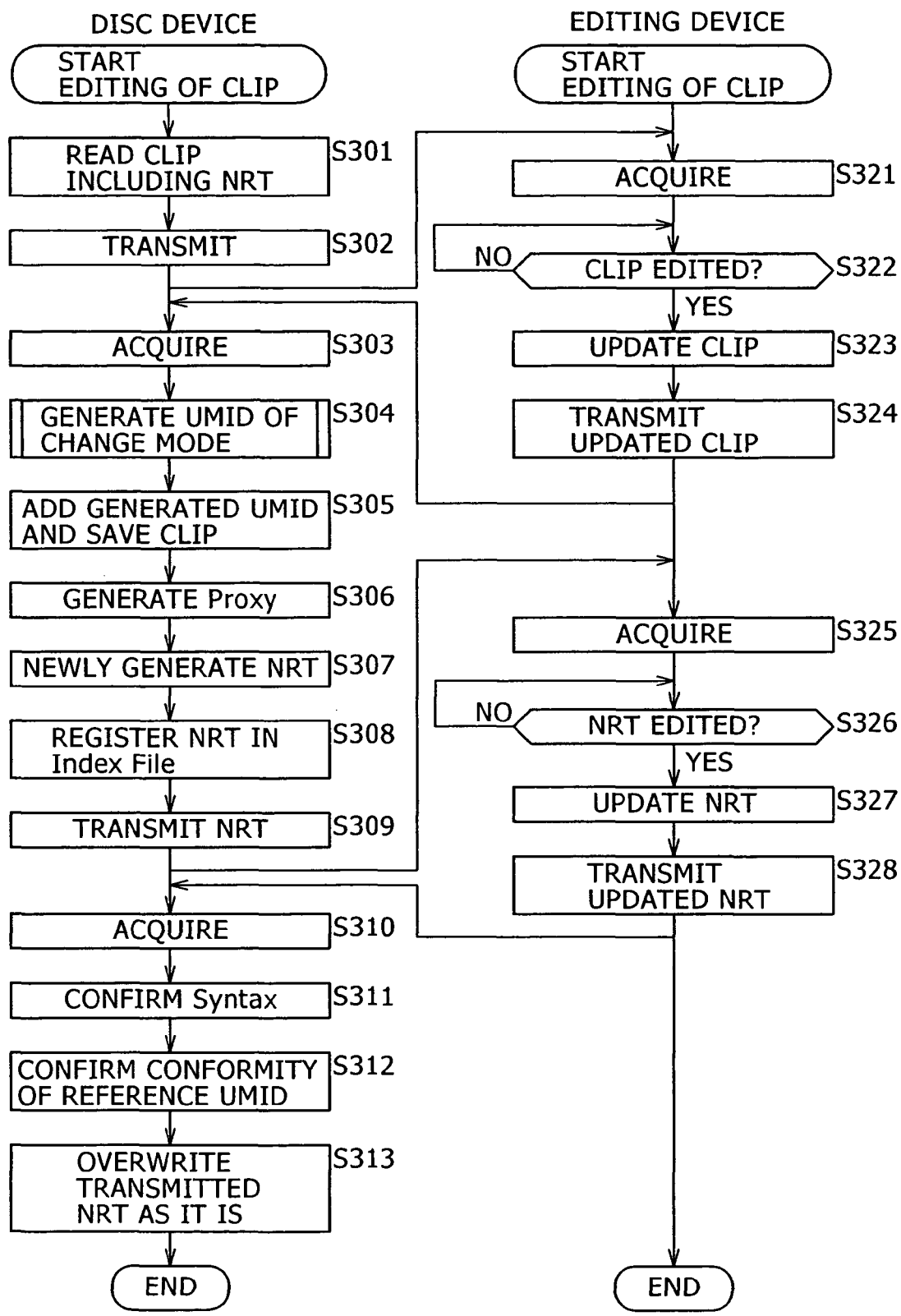
FIG. 34 is a flowchart for explaining an editing process of a clip with NRT by the disc drive and the editing device shown in FIG. 6 in the standard FTP transfer.

According to the present invention, there is provided an information processing method comprising the steps of: receiving clip data which is generated by another information processing apparatus (for example, processing of Step S303 in a flowchart shown in FIG. 34); generating UMID corresponding to the clip data which is generated by another information processing apparatus (for example, processing of Step S304 in the flowchart of FIG. 34); generating nonreal time metadata including the UMID corresponding to the clip data which is generated by another information processing apparatus (for example, processing of Step S307 in the flowchart of FIG. 34); and transmitting the nonreal time metadata which is generated by the nonreal time metadata generating section to another information processing apparatus (for example, processing of Step S309 in the flowchart of FIG. 34).

The correspondence of a recording medium and a program are identical with the information processing method, and therefore their description will be omitted.

Figure 1:
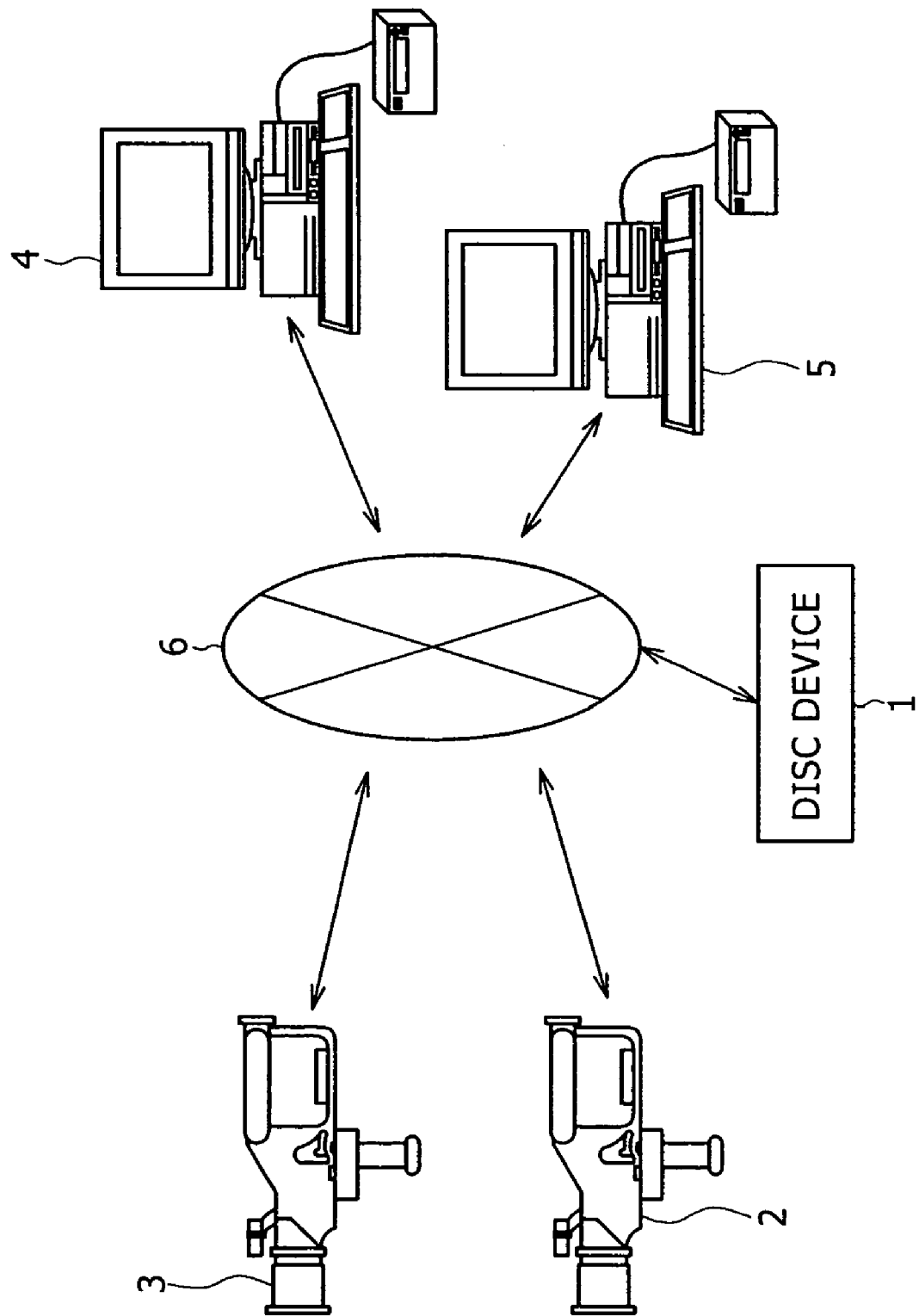
FIG. 1 is a block diagram showing the structure of an image program production support system according to an embodiment of the present invention.

FIG. 1 is a diagram showing a structural example of an image program production support system according to the present invention.

In FIG. 1, the image program production support system is a system that is equipped in, for example, a TV station that broadcasts a TV signal and a production company of image contents such as a video or a movie, and a system for producing image program which is an image production such as a TV program or a movie. The image program production support system is a system for efficiently producing the image program by allowing metadata added to the image program which is structured by an electronic file format to be available coherently between plural departments that are involved with the production of the image program.

The image program production support system is made up of a disc drive 1, image pickup devices 2, 3 and editing devices 4, 5 as shown in FIG. 1, which are connected to each other through a network 6.

The disc drive 1 records a clip, image data, sound data, metadata (including RTM (real time metadata), and proxy data which are picked up by the image pickup devices 2 or 3, or edited by the editing devices 4 or 5 in association with UMID by attaching UMED to those data, individually. Also, the disc drive 1 records NRT (non-real time metadata), and reads the recorded information and supplies the read information to the editing devices 4 or 5 if necessary.

The image pickup device 2 is, for example, a video camera such as a camcorder (registered trademark) which is a device used for photographing the coverage of a broadcast news program, a sports game or the image contents such as a movie. The image pickup device 2 is operated by a photograph staff, photographs the respective scenes that structure the image program, and transmits a clip obtained by photograph to the disc drive 1 or the editing devices 4 and 5.

Also, the image pickup device 2 can record, for example, not only original image data among the clip obtained by picking up the image, but also proxy data (data consisting of image data with low resolution). Since the original image data included in the clip is image data which is large in the data amount but high in the quality, the original image data is used for a final product of the image program. On the other hand, the proxy data is image data obtained by thinning out the number of pixels of the respective frames from the original image data, which corresponds to the frame image which is small in the number of pixels. Also, the proxy data may be further encoded through an MPEG (moving picture experts group) 4 system. The proxy data is lower in the quality but smaller in the data amount than those of the original image data. Therefore, the proxy data is low in a load of the processing such as transmission or reproduction, and is mainly used for a coarse editing process.

The image pickup device 2 manages the clip in a state where UMID is attached to the respective elements such as the image data, the sound data, the metadata and proxy data which are obtained by image pickup.

The image pickup device 3 is basically identical with the image pickup device 2, but cannot generate UMID and also cannot recognize the UMID of data attached with UMID.

Accordingly, the clip that is generated by the image pickup device 3 is not newly attached with UMID. However, the image data, the sound data, the metadata and the proxy data which are included in the clip generated by the image pickup device 2 can be recognized, individually, and those contents can be edited.

In the following description, in the drawings, the image pickup device 2 is added with "UMID correspondence" whereas the image pickup device 3 is added with "UMID non-correspondence).

The editing device 4 is made up of, for example, an information processing apparatus such as a personal computer, and a peripheral device, and is equipped in a so-called editing department that edits the image contents. The editing device 4 acquires the clip that is transmitted from the image pickup device 2.

The editing device 4 is operated by a user, and consecutively displays the proxy data or the original clip which is acquired through a network 6 in an order based on a scenario, or displays only the image data of a desired clip.

Also, the editing device 4 not only reproduces and displays, for example, necessary image data in a preferred order, but also edits the clip obtained by coverage.

The editing process is classified into a coarse editing process and a main editing process.

The coarse editing process is a simple editing process for the image data or the sound data which is included in the clip. For example, in the case where the editing device 4 acquires plural data (hereinafter referred to as "clip data") related to the image contents including the image data or the sound data, which corresponds to a clip that is a unit indicative of one image pickup process, the editing device 4 selects clip data to be used in the main edition, select (logging) the necessary image portion from the selected clip data, sets an edition start position (point In) and an edition end position (point Out) corresponding to the selected image portion, for example, by using a time code, and extracts (ingesting) the corresponding portion from the above clip data.

The clip is a unit indicative of not only one image pickup process but also a period of time from the image pickup start to the image pickup end in the image pickup process. Also, the clip is a unit indicative of the length of various data that is obtained through the image pickup process, and a unit indicative of the data amount of various data that is obtained through the image pickup process. In addition, the clip may be indicative of the assembly per se of various data.

The main editing process is a process in which the respective clip data that have been subjected to the coarse editing process are joined together, the image data is subjected to final image quality adjustment to produce a complete package data which is data to be broadcasted in programs.

The editing device 5 basically has the same functions as the editing device 4, but the editing device 5 cannot generate UMID and also cannot recognize the UMID attached to the clip. Accordingly, the clip that is edited by the editing device 5 is not newly attached with the UMID. However, the image data, the metadata and the proxy data of the clip which has been edited by the editing device 5 can be recognized individually, and those contents can be edited.

In the following description, in the figures, the edited device 4 is attached with (UMID correspondence) and the editing device 5 is attached with (UMID non-correspondence). Also, the respective devices of the above disc drive 1, image pickup devices 2, 3 and editing devices 4, 5 may be structured by plural devices, respectively. For example, the clips that have been obtained by the plural image pickup devices 2 and 3 may be acquired by one predetermined editing device 4 or 5 and subjected to the editing process. Alternatively, the clips that have been supplied from one predetermined image pickup device 2 or 3 may be edited by the plural editing device 4 or 5.

Conversely, the respective devices of the above disc drive 1, the image pickup devices 2, 3 and the editing devices 4, 5 are structured as different members, but the present invention is not limited to this structure, and a part or all of the functions of the respective devices may be integrated together.

Also, the image program production support system may be equipped with, for example, a center server (not shown) that is connected to the network 6 in addition to the above disc drive 1, the image pickup devices 2, 3 and the editing devices 4, 5. With the above structure, the image program production support system may be structured as a client/server system with the disc drive 1, the image pickup devices 2, 3 and the editing devices 4, 5 as clients.

Figure 2:
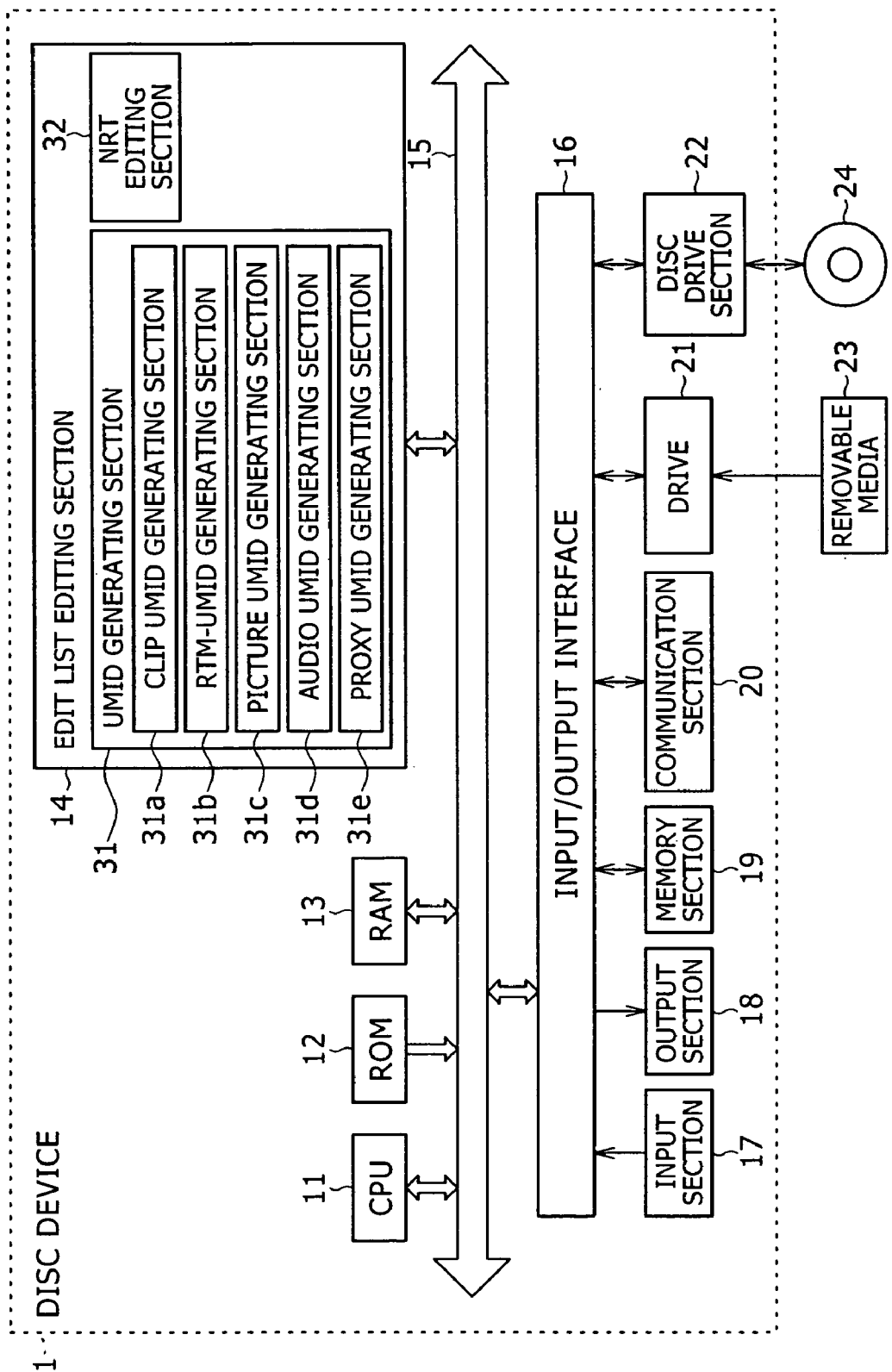
FIG. 2 is a block diagram showing the structure of a disc drive shown in FIG. 1.

FIG. 2 is a detailed structural example of the disc drive 1 shown in FIG. 1.

In FIG. 2, a CPU 11, a ROM 12, a RAM 13 and an edit list editing section 14 are mutually connected through a bus 15. The bus 15 is also connected with an input/output interface 16. Also, the CPU (central processing unit) 11 of the disc drive 1 executes various processing according to programs that are stored in the ROM (read only memory) 12. The RAM (random access memory) 13 appropriately stores data and program necessary in execution of the various processing by the CPU 11 therein.

The edit list editing section 14 generates an edit list that is information related to the edition results on the basis of the various information which is generated with transfer of the clip with respect to the image pickup devices 2, 3 or the editing devices 4, 5. The edit list editing section 14 then allows the edit list to be stored in the memory section 19.

A UMID generating section 31 in the edit list editing section 14 generates UMID with respect to the clip, an RTM (real timer metadata: for example, an LTC (linear time code) which is a time code that characterizes an image signal corresponding to the frame by given time information such as date (year, month, day, hour, minute, second), the image data, the sound data, and the proxy data, respectively. Then, those data are recorded with attachment of the UMID. More specifically, a clip UMID generating section 31a, an RTM-UMID generating section 31b, a picture UMID generating section 31c, an audio UMID generating section 31d and a proxy UMID generating section 31e generate the UMID with respect to the clip, the RTM (real time metadata), the image data, the audio data, and the proxy data, and then add the UMID to the respective data.

The UMID generating section 31 changes the UMID generating method according to a communication system of data that is supplied to the disc drive 1 or the user settable operation mode. In the case where, for example, data of an MXF (material exchange format) is transmitted through an FTP (file transfer protocol), there are two operation modes consisting of an update mode and a save mode. The update mode is a mode that generates new UMID with respect to all of data that is supplied to the disc drive 1, and then attaches the new UMID to the respective data. Also, the save mode is a mode that uses the UMID attached from another apparatus as it is in the case where another apparatus that transmits data can generate the UMID. Also, in the case of communication of the clip through an SDI (serial digital interface), there are an operation mode in which the UMID of the transmitted clip is used as it is when a single clip is provided, and an operation mode in which a UMID is newly generated and attached when plural clips are provided. The UMID generating method will be described in more detail later.

Also, the UMID generating section 31 has no clip without UMID, that is, no function of generating the UMID. For example, the UMID generating section 31 generates the UMID and attaches the UMID to the clip that is generated by the image pickup device 3 or the editing device 5 shown in FIG. 1.

The NRT (non-real time metadata) editing section 32 in the edit list editing section 14 edits the NRT among the information related to the edition result on the basis of the various information that is generated with transfer of the clip with respect to the image pickup device 2, 3 or the editing devices 4, 5. More particularly, the NRT editing section 14 edits lastupdate (information on the generation or update date of the NRT), umidRef (information on reference UMID that is referred to at the time of link), CreationDate (information on the update date of an object clip or the edit list), Format (the format of information that is generated in an equipment), and Title (title of the generated NRT) with the edition of the clip.

Further, the NRT editing section 32 has no function of generating a clip without UMID, that is, the UMID. For example, the NRT is generated in the clip that is generated by the image pickup device 3 or the editing device 5 shown in FIG. 1.

The input/output interface 16 is connected with an input section 17 that is made up of a keyboard or a mouse, and outputs a signal that is inputted to the input section 17 to the CPU 11. Also, the input/output interface 16 is connected with an output section 18 that is made up of a display or a speaker.

In addition, the input/output interface 16 is connected with a memory section 19 that is made up of a hard disc and an EEPROM (electronically erasable and programmable read only memory), and a communication section 20 that communicates data with another apparatus through the network 6. The drive 21 is used when reading data from a removable media 23 that is made up of a magnetic disc, an optical disc, a magnetic optical disc, or a semiconductor memory, and write the data therein.

The disc drive section 22 records the clip that is generated by the image pickup devices 2, 3 or the editing devices 4, 5 in association with the UMID and NRT which are generated by the edit list 14 in the disc recording medium 24.

The disc recording medium 24 may be, for example, an optical disc, and can be applied with a DVD-RAM (digital versatile disc random access memory), a DVD-R (DVD-recordable), a DVD-RW (DVD-rewritable), a DVD+R (DVD+recordable), a DVD-RW (DVD-rewritable), a CD-R (compact disc-recordable), or a CD-RW (CD-rewritable). Also, an HDD (hard disc drive) is applicable to the disc recording medium 24.

Also, any file system may be used as a file system that manages the data that has been recorded in the disc recording medium 24. For example, a UDF (universal disk format) or an ISO9660 (international organization for Standardization 9660) Also, in the case where a magnetic disc such as a hard disc is used as the disc recording medium 24, an FAT (file allocation tables), an NTFS (new technology file system), an HFS (hierachical file system), or a UFS (unix (registered trademark) file system) may be used as the file system. Also, a dedicated file system may be employed.

Subsequently, a structure of the image pickup device 2 will be described with reference to FIG. 3.

The structures of a CPU 41, a ROM 42, a RAM 43, a bus 46, an input/output interface 47, an input section 50, an output section 51, a memory section 52, a communication section 53, a drive 54 and a removal media 55 in the image pickup device 2 are identical with those of the CPU 11, the ROM 12, the RAM 13, the bus 15, the input/output interface 16, the input section 17, the output section 18, the memory section 19, the communication section 20, the drive 21 and the removable media 23 in the disc drive 1 shown in FIG. 2. Therefore, their description will be omitted.

A clip data editing section 44 generates image data, sound data, metadata and proxy data which constitute the clip on the basis of the image data that is picked up by an image pickup section which is made up of a CCD (charge coupled device) image sensor or a CMOS (complementary metal oxide semiconductor) image sensor, and sound data that is supplied from a sound input section 49 which is made up of a microphone, and supplies the image and sound data thus generated to an edit list editing section 45.

The edit list editing section 45 is identical with the edit list editing section 14 in the disc drive 1 shown in FIG. 2. Accordingly, a UMID generating section 61, a clip UMID generating section 61a, an RTM-UMID generating section 61b, a picture UMID generating section 61c, an audio UMID generating section 61d, and a proxy UMID generating section 61e are identical in the basic structure with the UMID generating section 31, the clip UMID generating section 31a, the RTM-UMID generating section 31b, the picture UMID generating section 31c, the audio UMID generating section 31d, and the proxy UMID generating section 31e. However, the edit list editing section 14 is different from the edit list editing section 45 in that the edit list editing section 14 processes the clip that is supplied to the disc drive 1 whereas the edit list editing section 45 generates an edit list which is an information related to the edition result and stores the edit list thus generated in the memory section 52 on the basis of various information that is generated with the editing process which is conducted in the clip data editing section 44 with the image pickup. Accordingly, the UMID generating method in the UMID generating section 61 is identical with those in the UMID generating section 31.

Figure 4:
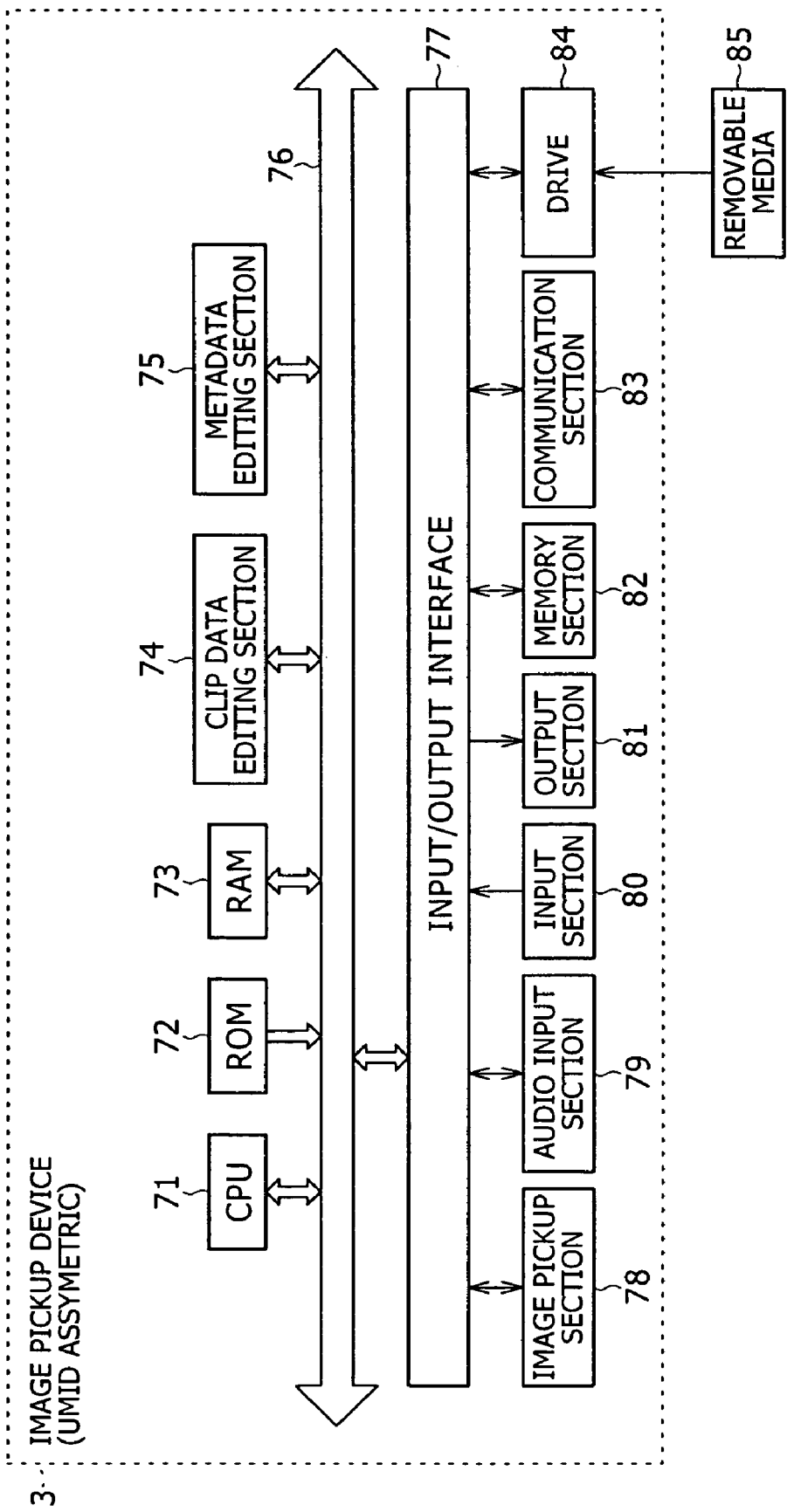
FIG. 4 is a block diagram showing the structure of the image pickup device shown in FIG. 1.

Subsequently, a structure of the image pickup device 3 will be described with reference to FIG. 4.

The image pickup device 3 is basically identical with the image pickup device 2, but different in that the image pickup device 3 cannot generate UMID.

Figure 3:
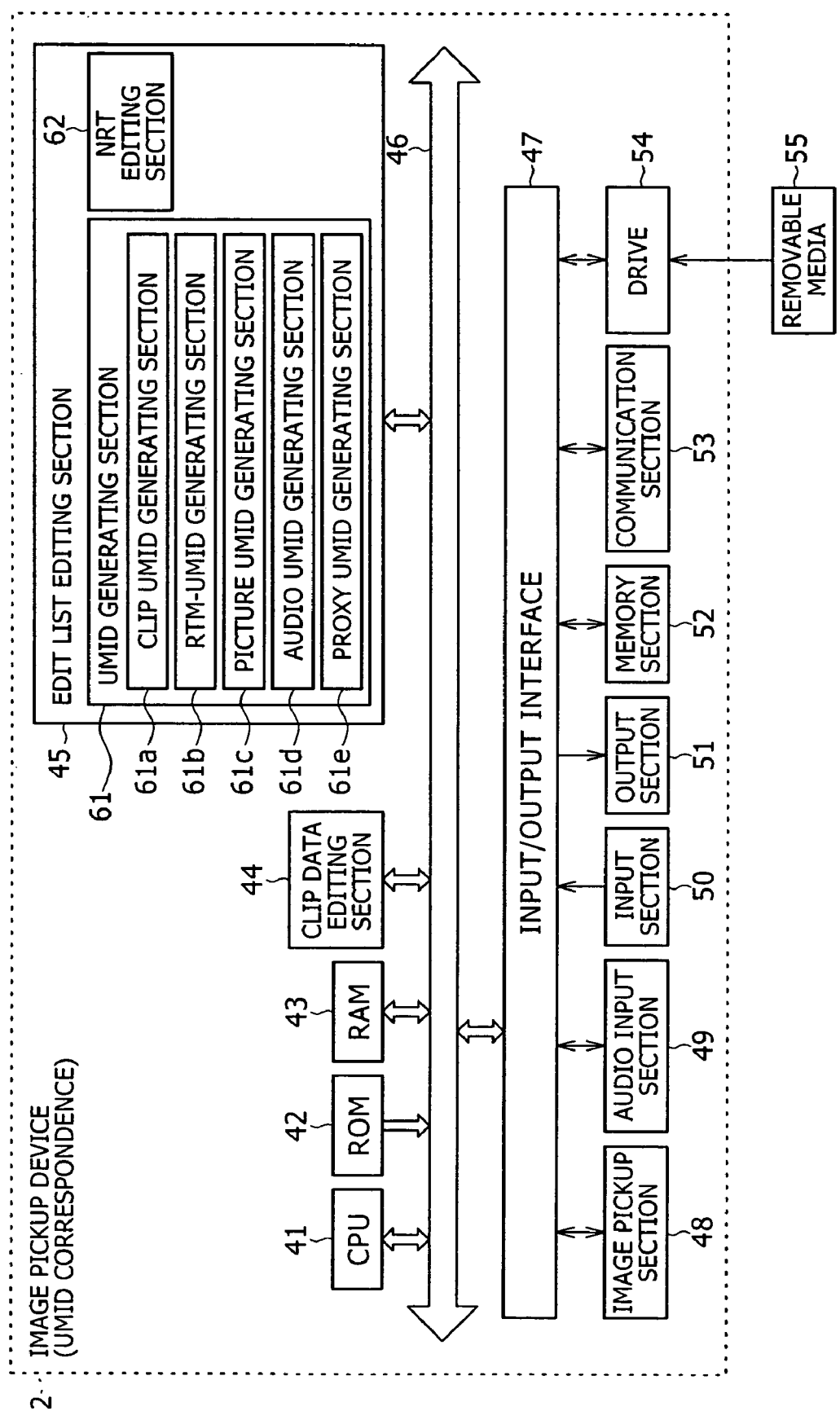
FIG. 3 is a block diagram showing the structure of an image pickup device shown in FIG. 1.

The structures of a CPU 71, a ROM 72, a RAM 73, a click data editing section 74, a bus 76, an input/output interface 77, an image pickup section 78, a sound input section 79, an input section 80, an output section 81, a memory section 82, a communication section 83, a drive 84 and a removable media 85 in the image pickup device 3 are identical with those of the CPU 41, the ROM 42, the RAM 43, the click data editing section 44, the bus 46, the input/output interface 47, the image pickup section 48, the sound input section 49, the input section 50, the output section 51, the memory section 52, the communication section 53, the drive 54 and the removable media 55 in the image pickup device 2 shown in FIG. 3. Therefore, their description will be omitted.

The metadata editing section 75 edits (generates) the metadata related to the clip that is generated by the clip data editing section 74, and stores the edited metadata in association with the clip in the memory section 52. Accordingly, No UMID is attached to the generated clip.

Subsequently, the structure of the editing device 4 will be described with reference to FIG. 5.

The structures of a CPU 101, a ROM 102, a RAM 103, a bus 106, an input/output interface 107, an input section 108, an output section 109, a memory section 110, a communication section 111, a drive 112 and a removable media 113 in the editing device 4 are identical with those of the CPU 11, the ROM 12, the RAM 13, the bus 15, the input/output interface 16, the input section 17, the output section 18, the memory section 19, the communication section 20, the drive 21 and the removable media 23 in the disc drive 1 shown in FIG. 2. Therefore, their description will be omitted.

The clip data editing section 104 is basically identical with the clip data editing section 74. However, the clip data editing section 104 is different from the clip data editing section 74 in that the clip data editing section 74 generates the clip on the basis of the image data and the sound data which are picked up by the image pickup process whereas the clip data editing section 104 edits the clip data that has been edited by operating the input section 10-8 by a user.

That is, the clip data editing section 104 controls the output section 109 so as to allow GUI (graphical user interface) to be displayed on a display, and receives an operation input from the user through the input section 108. On the basis of the operation input, the clip data editing section 104 edits the image data, the sound data, low resolution data, or the metadata which is recorded in the memory section 110 or the removable media 113 equipped in the drive 112, or low resolution data that has been acquired through the communication section 111. Then, the clip data editing section 104 generates information related to the information related to the edition contents or the information related to the edited data, and then supplies the information thus generated to the edit list editing section 105.

The edit list editing section 105 is basically identical with the edit list editing section 14 of the disc drive 1 shown in FIG. 2. Accordingly, a UMID generating section 121, a clip UMID generating section 121a, an RTM-UMID generating section 121b, a picture UMID generating section 121c, an audio UMID generating section 121d and a proxy UMID generating section 121e are identical in the basic structure with the UMID generating section 31, the clip UMID generating section 31a, the RTM-UMID generating section 31b, the picture UMID generating section 31c, the audio UMID generating section 31d and the proxy UMID generating section 31e. However, the edit list editing section 105 is different from the edit list editing section 14 in that the edit list editing section 14 processes the clip that is supplied to the disc drive 1. On the contrary, the edit list editing section 105 generates the edit list which is information related to the edition result on the basis of the various information that is generated by the editing process which is conducted in the clip data editing section 44 with the editing operation by the user. The edit list editing section 105 then stores the edit list thus generated in the memory section 110. Therefore, the UMID generating method in the UMID generating section 121 is identical with that in the UMID generating section 31.

An NRT editing section 122 is identical with the NRT editing section 32, and edits NRT among information related to the edition result on the basis of various information that is generated with the edition of the clip by the clip data editing section 104.

Also, the NRT editing section 122 generates NRT in a clip without UMID, that is, the clip with no function of generating the UMID which is, for example, generated by the image pickup device 3 or the editing device 5 shown in FIG. 1.

Figure 6:
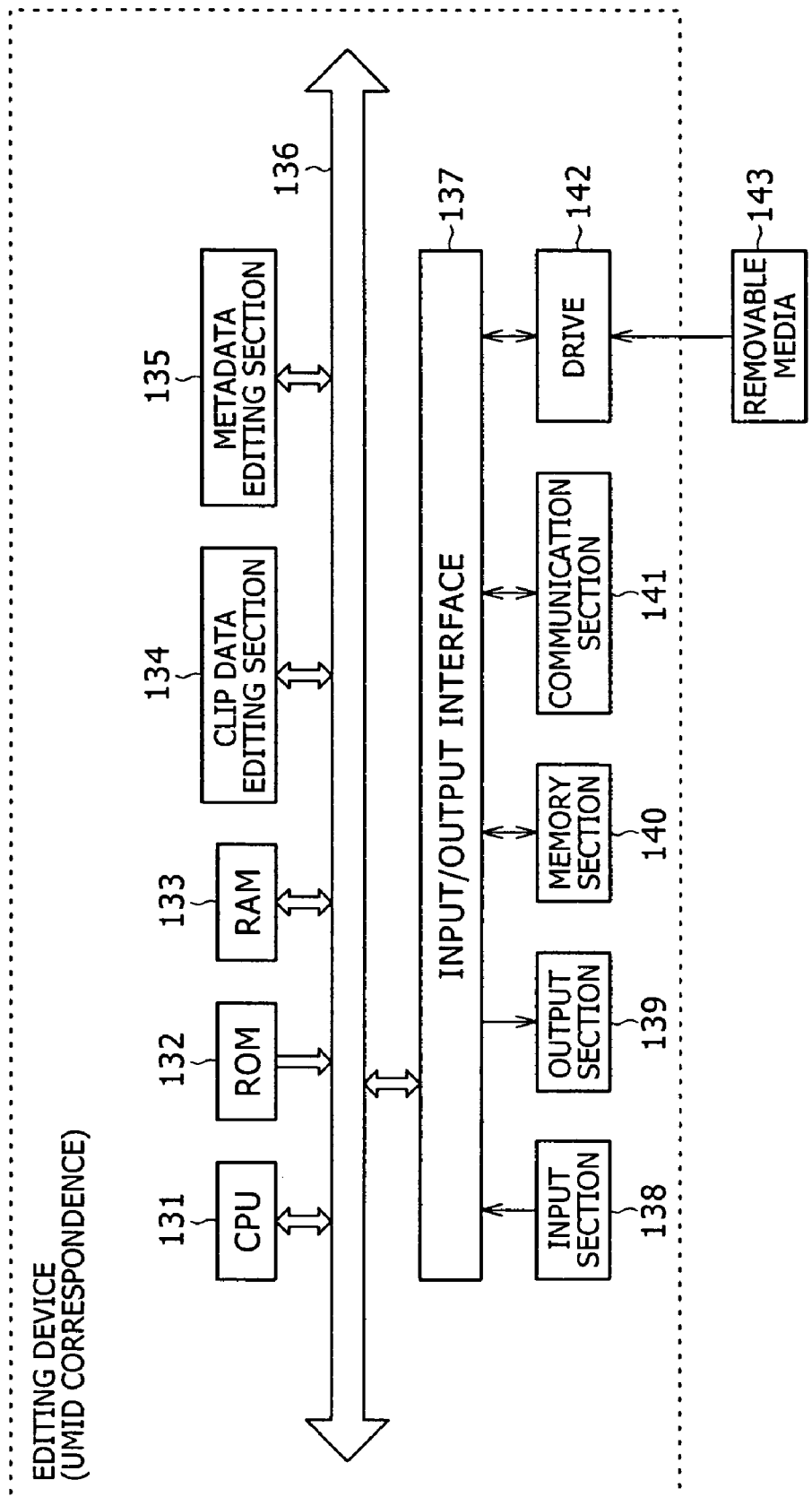
FIG. 6 is a block diagram showing the structure of the editing device shown in FIG. 1.

Subsequently, the structure of the editing device 5 will be described with reference to FIG. 6.

The editing device 5 is basically identical with the editing device 4, but different from the editing device 4 in that the editing device 5 cannot generate the UMID or recognize the UMID.

Figure 5:
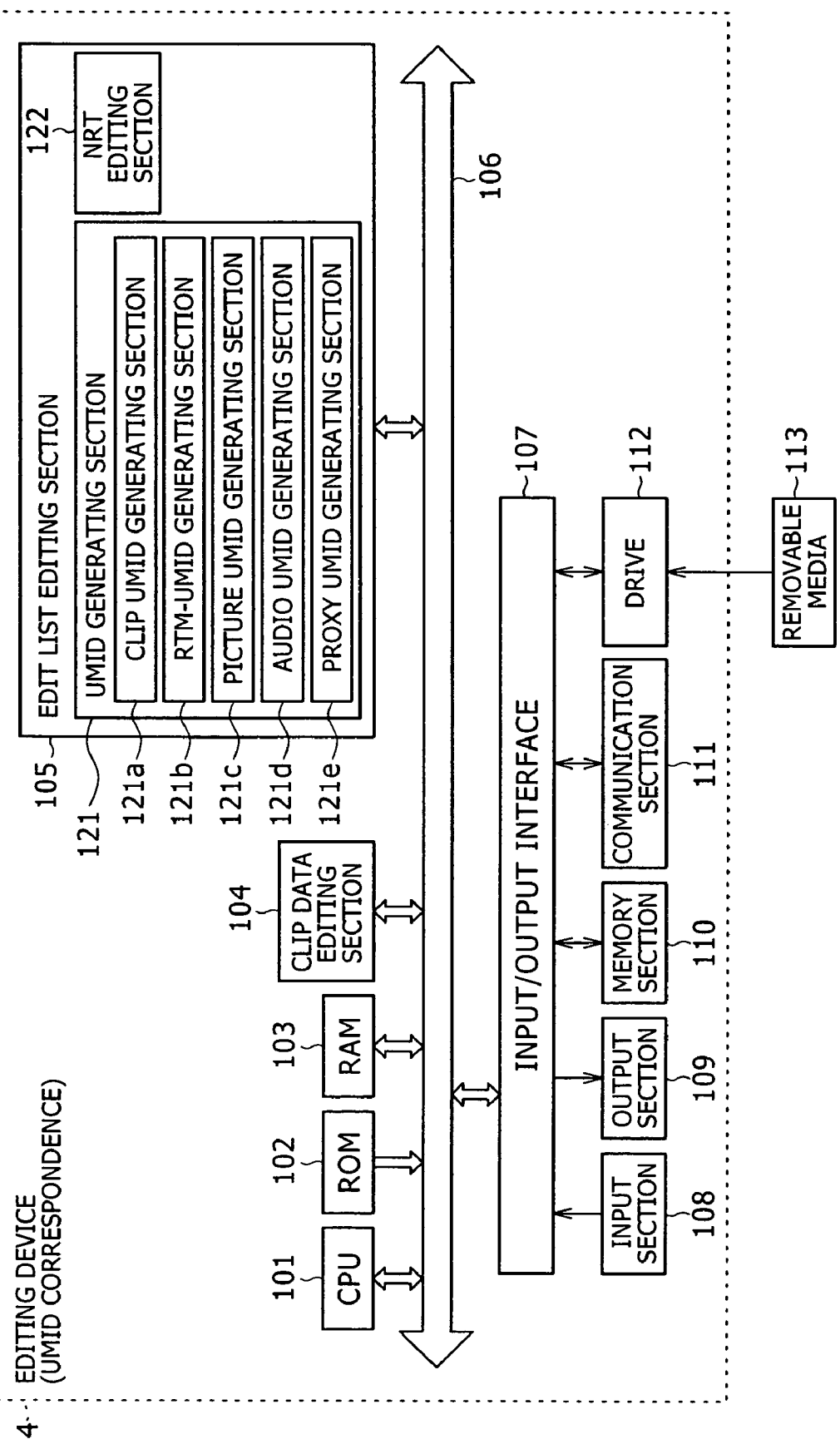
FIG. 5 is a block diagram showing the structure of an editing device shown in FIG. 1.

The structures of a CPU 131, a ROM 132, a RAM 133, a clip data editing section 134, a bus 136, an input/output interface 137, an input section 138, an output section 139, a memory section 140, a communication section 141, a drive 142 and a removable media 143 in the editing device 5 are identical with those of the CPU 101, the ROM 102, the RAM 103, the clip data editing section 104, the bus 106, the input/output interface 107, the input section 108, the output section 109, the memory section 110, the communication section 111, the drive 112 and the removable media 113 in the editing device 4 shown in FIG. 5. Therefore, their description will be omitted.

The metadata editing section 135 is basically identical with the metadata editing section 75, and edits (or generates) the metadata related to the clip that has been generated by the clip data editing section 134, and stores the metadata thus edited in association with the clip in the memory section 140. Accordingly, the generated clip has no UMID.

Subsequently, a format of the UMID will be described with reference to FIG. 7.

Figure 7:
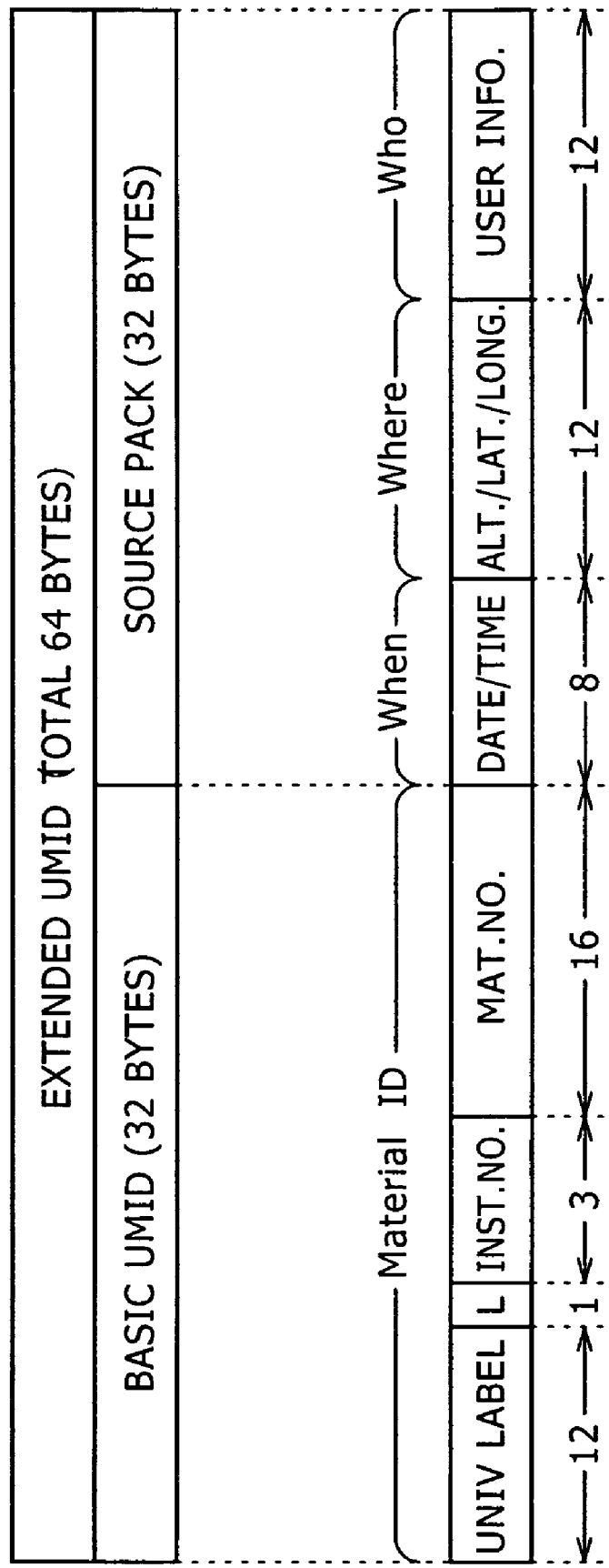
FIG. 7 is a diagram for explaining the structure of UMID.

The UMID has two kinds of UMID consisting of a basic UMID (Basic UMID in FIG. 7) and an extended UMID (Extended UIMD in FIG. 7). In the present specification, the extended UIMD is called "extended UMID", and the basic UMID is called "basic UMID" or "UMID".

As shown in FIG. 7, the extended UMID (Extended UMID in FIG. 7) is information of 64 bytes, and 32 bytes from a head (left in the drawing) is a basic UMID, and the remaining 32 bytes are a source pack.

The basic UMID functions as the material ID which is ID that identifies the extended UMID. The basic UMID is made up of a universal label indicative of a fixed header (UnivLabel in the figure), and a length indicative of the data length (a portion indicated by L in the figure). The basis UMID is further made up of instance number (Ins.No. in the figure) indicative of an instance No. representing information for associating the respective materials (for example, in the case where data having a certain extended UMID is copied, only the instance NO. of the extended UMID that is attached to the original data is changed to generate a new extended UMID, thereby exhibiting a relationship with the original data), and material number Z (Mat.No.) that identifies the material as an image. Those data is stored as data of the data length of 12 bytes, 1 byte, 3 bytes and 16 bytes from the head, respectively. In the example, structure is made as KLV data in which Univ Label is structured as key data, Length is structured as length data, and Inst.No. and Mat.No. are structured as value data.

Also, the source pack is made up of "when data" indicative of date and time (Date/Time in the figure), "where data indicative of altitude, latitude and longitude (Alt./Lat./Long.), and "who data" indicative of user information that is information specifying a photographer (User Info. in the figure) from the head. The source pack includes information indicative of when, where and whom the image data has been photographed by, which is recorded as 8 bytes, 12 bytes and data of 12 bytes from the head, respectively.

In the following description, only the basis UMID will be described, and the basic UMID is called simply "UMID".

Subsequently, the detailed structure of the "Material Number" of the UMID will be described with reference to FIG. 8.

Figure 8:
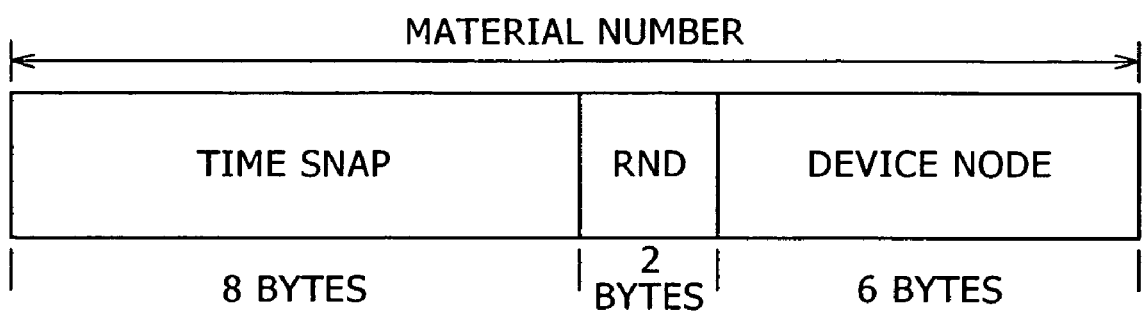
FIG. 8 is a diagram for explaining the structure of Material Number shown in FIG. 7.

As shown in FIG. 8, the material number is information of 16 bytes, 8 bytes from the head (left in the figure) among the information of 16 bytes is a time snap. Further, 9 and 10 bytes from the head are a random number (RND), and the 6 remaining bytes are a device node.

The time snap is a value that is generated on the basis of the information of date when UMID is generated. The random number is a value that is generated by producing a random number of 16 bits. At this same time, in the case where plural UMID are generated, the random number is provided so as not to generate the identical UMID. The device node is a value inherent to the respective devices.

The UMID is structured as described above and set with respect to the respective materials, individually. That is, the UMID is set with respect to the clip, the RTM, the image data, the sound data of the respective channels, and the proxy data, respectively. Further, MpUmid (material package umid) and FpUmid (file package umid) are set for the clip, the image data, the sound data of the respective channels, and the proxy data, respectively. In this example, MpUmid is UMID that is attached to the respective files that constitute the data, and FpUmid is UMID that is attached to the assembly of the files that structure the data.

Subsequently, an image pickup process by the image pickup device 2 will be described with reference to a flowchart of FIG. 9.

In Step S1, the image pickup section 48 picks up an image, and then supplies the image to the clip data editing section 44 as the image data. In Step S2, the sound input section 49 generates the sound data on the basis of the acquired sound, and then supplies the sound data to the clip data editing section 44.

In Step S3, the clip data editing section 44 generates the proxy data on the basis of the supplied image data and sound data. In Step S4, the clip data editing section 44 generates the RTM, and then supplies the RTM to the edit list editing section 45 together with the image data, the sound data, and the proxy data.

In Step S5, the UMID generating section 61 in the edit list editing section 45 executes the new UMID generating process, and generates the UMID with-respect to the respective materials of the clip.

Figure 10:
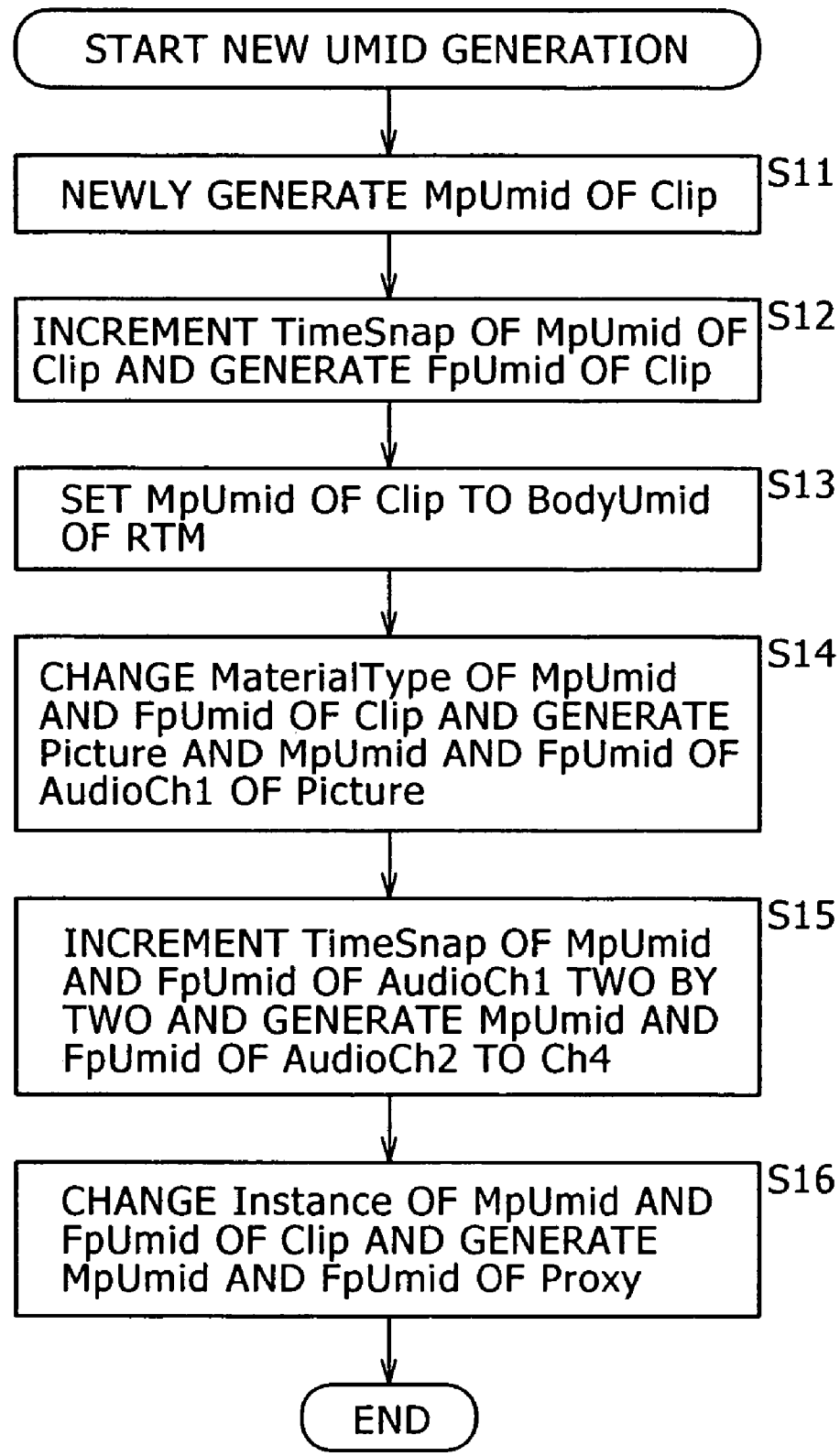
FIG. 10 is a flowchart for explaining a new-UMID generating process.

Now, the new UMID generating process will be described with reference to a flowchart of FIG. 10.

In Step S1, the clip UMID generating section 61a newly generates MpUmid according to a time at which the MpUmid of the clip is generated. For example, the clip UMID generating section 61a generates the MpUmid with respect to the clip as "060A2B340101010501010D43130000006C291C 00722405C2080046020 117F001" as shown in FIG. 1. In FIG. 11, the UMID of the supplied material is exhibited on the uppermost column as "UMID of Input signal". In this case, there is no material to be supplied because of the new generating process, and therefore No UMID exists, and "None" is displayed.

Below the uppermost column, "Clip.smi" is exhibited, and MpUmid and FpUmid are exhibited among the UMID attached to the clip in the order from the above. Below "Clip.Smi", "Real Time Meta. Bin" is exhibited, and BodyUmid that is UMID attached to RTM is also exhibited. Below "Real Time Meta. Bin", "Picture. Mxf" is exhibited, and MpUmid and FpUmid are exhibited among the UMID attached to the image data in the order from the above.

In addition, below "Picture.mxf", "AudioCh1.mxf", "AudioCh2.mxf", "AudioCh3.mxf" and "AudioCh4.mxf" are exhibited, and MpUmid and FpUmid of the UMID that is attached to each of first channel to fourth channel of the sound data in the order from the above are exhibited. Below "AudioCh4.mxf", "Proxy.mxf" is exhibited, and MpUmid and FpUmid of the UMID that is attached to the proxy data are exhibited. In the following description, the same display is made.

In Step S12, the clip UMID generating section 61a increments TimeSnap in MpUmid of the clip by 1, and generates FpUmid of the clip. That is, as shown in FIG. 11, the clip UMID generating section 61a increments "6C" which is a head byte of TimeSnap in MpUmid of the clip by 1 to obtain "6D", and newly generates "6D" as FpUmid of the clip. In FIG. 11, the newly generated FpUmid is a portion indicated by a white character on a black background.

In Step S13, the RTM-UMID generating section 61b sets the MpUmid of the clip as BodyUmid of the RTM. That is, as shown in FIG. 11, BodyUmid of the RTM is generated as the same value as the MpUmid of the clip.

In Step S14, the picture UMID generating section 61c changes the Material Type of the MpUmid and FpUmid of the clip, and generates the MpUmid and FpUmid of the image data. Also, the audio UMID generating section 61d changes the Material Type of the MpUmid and FpUmid of the clip, and generates the MpUmid and. FpUmid of the audio data of the first channel. In this example, the Material Type is a value of 12 bytes in the Universal Lavel, which identifies the kind of the material of data to which the UMID is attached. In the Material Type, for example, "0D" exhibits the group data, "06" exhibits the image data, and "08" exhibits the sound data.

In the case of FIG. 11, when the respective MpUmid and FpUmid of the clip and the image data are compared with each other, the Material Type of the clip is "0D", and the Material Type of the image data is "06". When the picture UMID generating section 61c changes the Material Type from "0D" to "06", the MpUmid and FpUmid of the image data are generated. Likewise, when the respective MpUmid and FpUmid of the clip and the sound data of the first channel are compared with each other, the Material Type of the clip is "0D", and the Material Type of the sound data of the first channel is "08". When the picture UMID generating section 61d changes the Material Type from "0D" to "08", the MpUmid and FpUmid of the sound data of the first channel are generated. In the figure, the character of the byte indicative of the Material Type is indicated by a white character on a black background, and the same is applied in the following description.

In Step S15, the audio UMID generating section 61d sequentially increments the head byte of the TimeSnap of the MpUmid and FpUmid of the sound data of the first channel two by two, respectively, and then generates the MpUmid and FpUmid of the sound data of the second to fourth channels.

That is, as shown in FIG. 11, the values of the head byte of the TimeSnap of the MpUmid and FpUmid in the sound data of the first channel are "6C" and "6D", respectively. The audio UMID generating section 61d increments the above respective values by two to provide "6E" and "6F", and generates the MpUmid and FpUmid in the sound data of the second channel.

Likewise, the values of the head byte of the TimeSnap of the MpUmid and FpUmid in the sound data of the second channel are "6E" and "6F", respectively. Therefore, the audio UMID generating section 61d further increments the above respective values by two to provide "70" and "71", and generates the MpUmid and FpUmid in the sound data of the third channel.

In addition, the values of the head byte of the TimeSnap of the MpUmid and FpUmid in the sound data of the third channel are "70" and "71", respectively. Therefore, the audio UMID generating section 61d further increments the above respective values by two to provide "72" and "73", and generates the MpUmid and FpUmid in the sound data of the fourth channel. As a result, the sound data is structured by the continuous timeSnap of the MpUmid and FpUmid of the first to fourth channels in each of the channels.

In Step S16, the proxy UMID generating section 61e changes the head byte of the respective instance numbers of the MpUmid and FpUmid of the clip from "00" to "FF" indicative of the proxy data to generate the MpUmid and FpUmid of the proxy data.

Through the above processing, other UMID can be substantially generated in a chain reaction by generating only the MpUmid of the clip, thereby making it possible to generate a large amount of UMID at a high speed.

Figure 9:
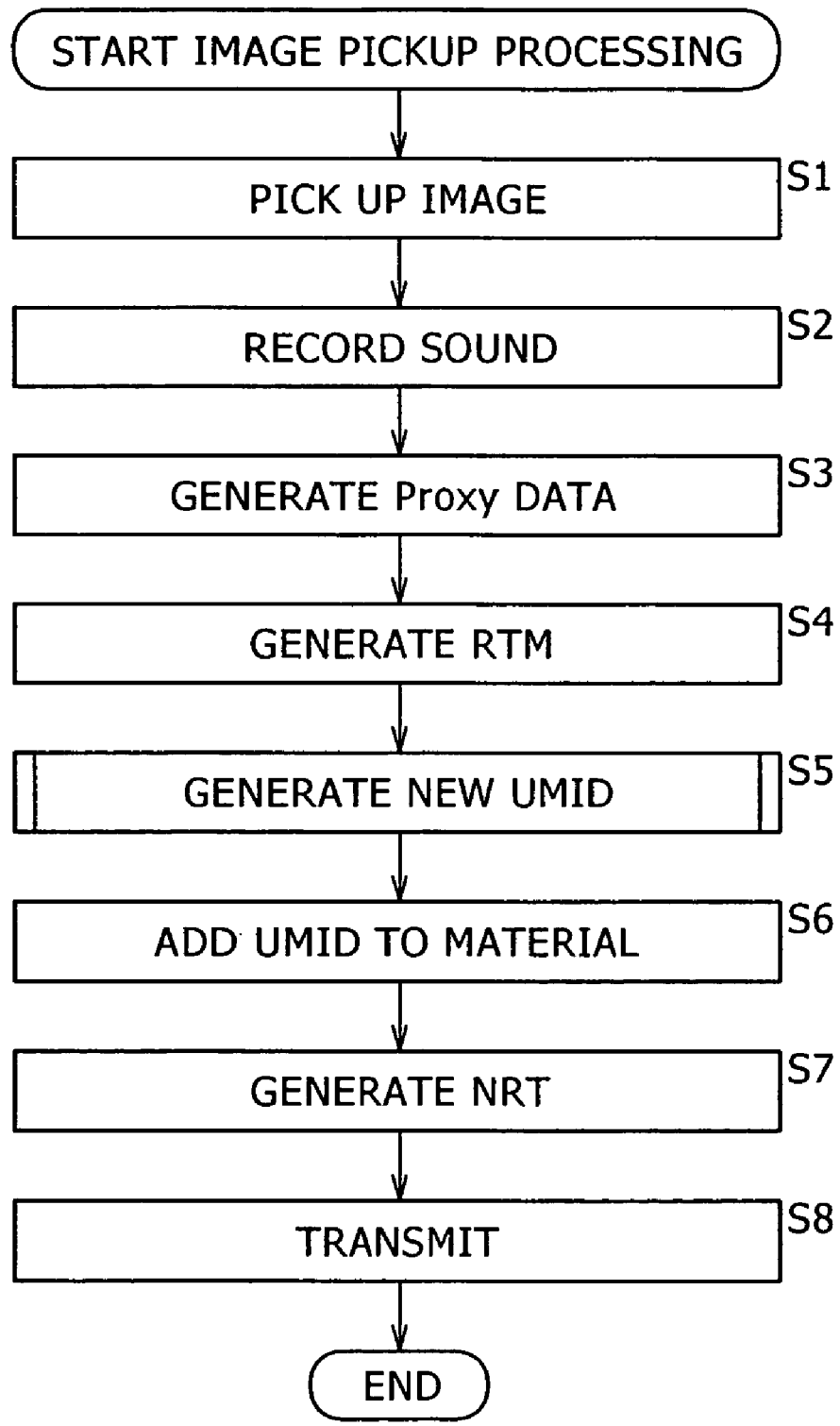
FIG. 9 is a flowchart for explaining image pickup processing by the image pickup device shown in FIG. 3.

Now, the description will be turned to the flowchart of FIG. 9.

In Step S6, the edit list editing section 45 attaches the respective UMID generated in the process of Step S5 to the clip, the image data, the sound data, the RTM and the proxy data.

In Step S7, the NRT generating section 62 newly generates the NRT on the basis of the information of the generated clip. That is, the NRT generating section 62 generates astupdata (information of data at which the NRT is generated), umidRef (information on the reference UMID which is referred to at the time of link), CreationDate (information on date at which an object clip is generated), LastUpdate (information on update date of the object clip), Format (format of the information generated by an equipment), and Title (title of the generated NRT) with the information of the generated clip.

In Step S8, the memory section 52 stores the clip having the UMID attached to the image data, the sound data, the RTM and the proxy data in association with the NRT.

Through the above processing, the clip generated by image pickup includes plural materials such as the image data, the sound data (in each of the channels), the RTM and the proxy data, and the UMID is required for the plural materials with the generation of one clip. However, after the MpUmid of the clip has been generated, the TimeSnap is incremented by 1 to generate FpUmid of the clip. The MaterialType is simply changed to generate the MpUmid and FpUmid of the image data and the sound data of the first channel. Also, the Time-Snap of the MpUmid and FpUmid of the sound data of the first channel are sequentially incremented two by two to generate the MpUmid and FpUmid of the second to fourth channels. In addition, since the MpUmid and FpUmid of the proxy data are generated by only changing the instance number in the MpUmid and FpUmid of the clip, other UMID can be substantially generated in a chain reaction by only generating the MpUmid of the clip. As a result, it is possible to generate a large amount of inherent UMID at a high speed.

In the image pickup device 3 that does not correspond to the UMID, the processing of Steps S3 to S6 is omitted, and the metadata is generated by the metadata editing section 75 instead of the generation of the NRT. Accordingly, the clip is generated, but the UMID or NRT is not attached to the clip.

Also, in the above processing, a case in which NRT is generated together at the time of generating the clip is described above. However, NRT is not necessary to generate. In the case, the processing of Step S6 is omitted, and only the clip with the UMID is generated.

Subsequently, a description will be given of a process in which the clip without NRT which is generated through the image pickup process by the image pickup device 2 is transmitted to the disc drive 1 by the FTP, and then imported (recorded) with reference to a flowchart of FIG. 12. A case in which a processing mode of generating the UMID is a change mode will be described.

In Step S31, the communication section 53 of the image pickup device 2 reads the clip that is stored in the memory section 52, and as shown in FIG. 13, transmits the read clip to the disc drive 1 through the network 6 in Step S32. In Step S32, a portion indicated by "Clip" in the image pickup device 2 represents the transmitted clip. Further, "$U_1$" indicated above the clip represents UMID that is attached to the clip at the time of generating the clip (UMID indicates MpUmid of the clip, and includes FpUmid of the clip, BodyUmid of the RTM, MpUmid and FpUmid of the image data, MpUmid and FpUmid of the respective channels of the sound data, and MpUmid and FpUmid of the proxy data, respectively). The $U_1$ includes the respective UMID of the clip, the RTM, the image data, the sound data and the proxy data described above. Also, the same display is applied to the following description.

In Step S41, the communication section 20 acquires the clip that is transmitted from the image pickup device 2.

In Step S42, the UMID generating section 31 of the edit list editing section 14 generates the UMID of the clip that is acquired by the image pickup device 2 through the network 6 and the communication section 20 in a change mode. That is, the transmitted clip is attached with the UMID within the disc drive 1 as in the case where the clip is newly generated.

Figure 14:
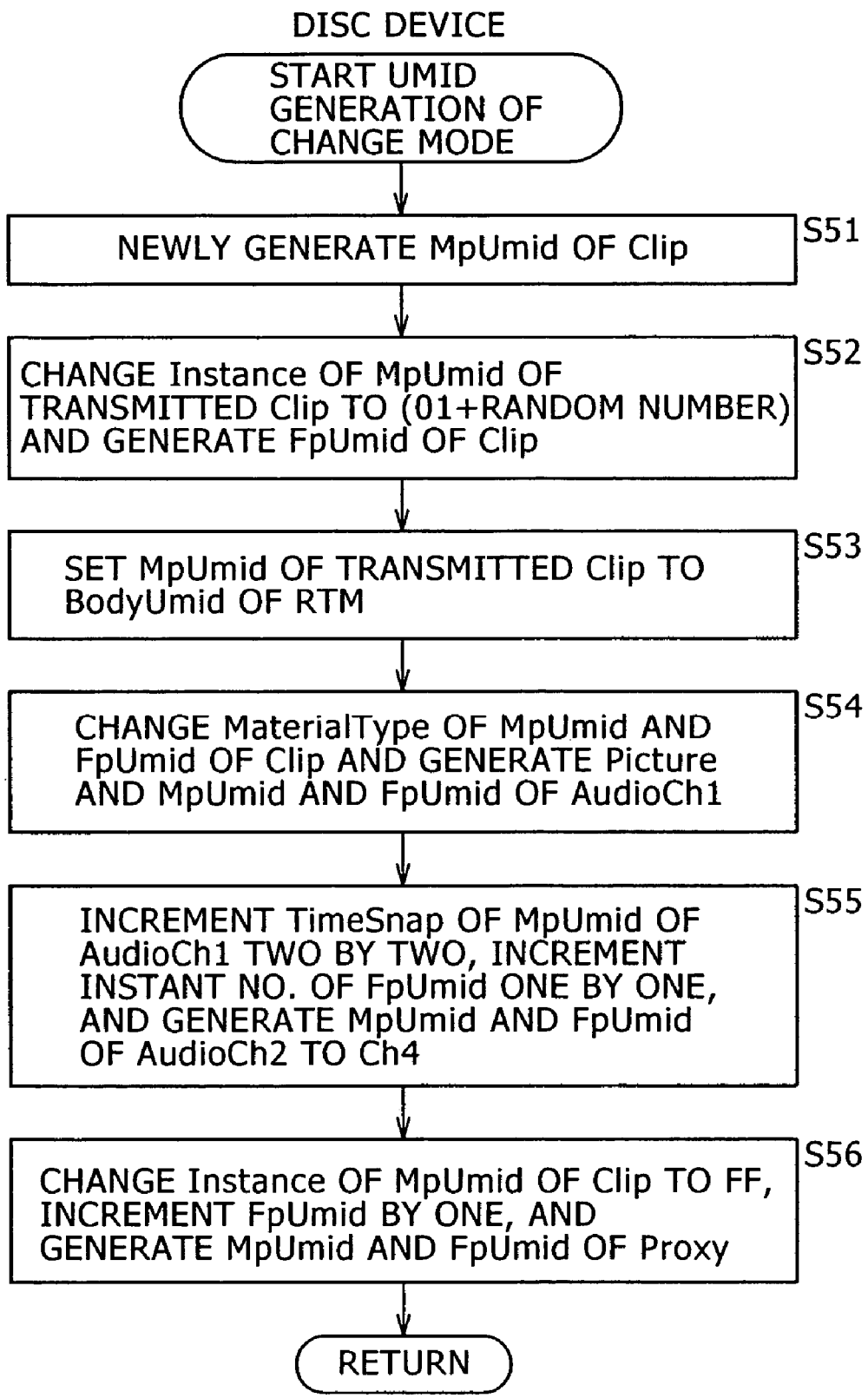
FIG. 14 is a flowchart for explaining a UMID generating process in the change mode.

Now, a UMID generating process in the change mode will be described with reference to a flowchart of FIG. 14.

In Step S51, the clip UMID generating section 51a newly generates the MpUmid with respect to the clip according to a time at which the MpUmid is generated. For example, it is assumed that the clip UMID generating section 31a generates the MpUmid with respect to the clip in "060A2B340101010 501010D43130000006C291C2405C2080046020 117F001" as shown in FIG. 15. In FIG. 15, "UMID of Input signal" is indicated at the uppermost column in the figure, which indicates the UMID of the MpUmid of the transmitted clip. In this case, the UMID attached to the transmitted clip is displayed as "060A2B340101010501010D43130000002405C208004 6020117F0016C2 91C0072".

In Step S52, the clip UMID generating section 31a changes the instance number in the MpUmid that is attached to the transmitted clip to (01+random number), and then generates FpUmid of a new clip. That is, as shown in FIG. 15, the clip UMID generating section 61a changes "000000" which is the instance number in the MpUmid that is attached to the supplied clip to "01ABCD", to thereby generate FpUmid of the new clip. In FIG. 15, the FpUmid of the new clip is a portion indicated by white characters on a black background. The "ABCD" in the instance number represents a value generated by a random number.

In Step S53, the RTM-UMID generating section 31b sets the MpUmid of the transmitted clip as the BodyUmid of the RTM. That is, as shown in FIG. 15, the BodyUmid of the RTM is generated as the same value as the MpUmid of the clip.

In Step S54, the picture UMID generating section 31c changes the Material Type of the MpUmid and FpUmid of the clip, and generates the MpUmid and FpUmid of the image data. Also, the audio UMID generating section 31d changes the Material Type of the MpUmid and FpUmid of the clip, and generates the MpUmid and FpUmid of the sound data of the first channel.

In Step S55, the audio UMID generating section 31d sequentially increments the head byte of the TimeSnap of the MpUmid of the sound data of the first channel two by two, respectively, to generate the MpUmid of the sound data of the second to fourth channels. Also, the audio UMID generating section 31d sequentially increments the final byte of the instance number of the FpUmid of the sound data of the first channel one by one, respectively, to generate the FpUmid of the sound data of the second to fourth channels.

That is, as shown in FIG. 15, the value of the head byte of the TimeSnap of the MpUmid in the sound data of the first channel is "6C". The audio UMID generating section 31d increments the above value by two to provide "6E", and generates the MpUmid in the sound data of the second channel.

Likewise, since the value of the head byte of the TimeSnap of the MpUmid in the sound data of the second channel is "6E", respectively, the audio UMID generation section 31d further increments that value by two to provide "70", to thereby generate the MpUmid in the sound data of the third channel.

In addition, since the value of the head byte of the TimeSnap of the MpUmid in the sound data of the third channel is "70", the audio UMID generating section 31d further increments that value by two to provide "72", and then generates the MpUmid in the sound data of the fourth channel.

Also, the value of the instance number of the FpUmid in the sound data of the first channel is "01ABCD". The audio UMID generating section 31d increments that value by one to provide "01ABCE", and then generates the FpUmid in the sound data of the second channel.

Likewise, the value of the instance number of the FpUmid in the sound data of the second channel is "01ABCE". Therefore, the audio UMID generating section 31d further increments that value by one to provide "01ABCf", respectively, and then generates the FpUmid in the sound data of the third channel.

Furthermore, the value of the instance number of the FpUmid in the sound data of the third channel is "01ABCF", respectively. Therefore, the audio UMID generating section 31d further increments that value by one to provide "01ABD0", and then generates the FpUmid in the sound data of the fourth channel.

In Step S56, the proxy UMID generating section 31e changes the head byte of the instance number of the MpUmid of the clip from "00" to "FF" indicative of the proxy data, increments the final byte of the instance number of the FpUmid of the clip by one, and generates the MpUmid and FpUmid of the proxy data. That is, in the case of FIG. 15, the instance of the MpUmid of the proxy data is "FF0000", and the instance of the FpUmid is "01ABCE" obtained by incrementing "01ABCD" of the instance number of the clip by one.

Through the above processing, other UMID can be substantially generated in a chain reaction by generating only the MpUmid of the clip, thereby making it possible to generate a large amount of UMID at a high speed.

Now, the description will be turned to the flowchart of FIG. 12.

In Step S43, the edit list editing section 14 adds the UMID generated by the UMID generating section 31 to the respective materials of the transmitted clip, that is, the clip, the RTM, the image data, the sound data and the proxy data, respectively.

In Step S44, the edit list editing section 14 generates the proxy data on the basis of the information of the transmitted clip.

In Step S45, the NRT editing section 32 newly generates the NRT. That is, the NRT editing section 32 newly generates the NRT on the basis of the information on the generated clip. That is, the NRT generating section 62 records "this NRT generating time" as lastupdata (information on generation date of this NRT) with the information of the generated clip as shown in FIG. 13. Also, the NRT generating section 62 records "U$_2$" as the umidRef (information on the reference UMID that is referred to at the time of link), and records "object clip generation time" as CreationDate (information on object clip generation date). Further, the NRT generating section 62 records blank as the LastUpdate (information on object clip generation date) because the LastUpdate is new, records "IMX" as the Format (format of the information generated by the equipment), and records blank as the Title (title of the generated NRT) since the Title is newly generated and therefore not edited. With the above operation, the NRT generating section 62 newly generates the NRT. In FIG. 13, the information newly recorded is indicated by white characters on the black background. Also, the UMID of the transmitted clip is changed from "U$_1$" indicative of the UMID of the clip that has not yet been transmitted to "U$_2$", and the UMID is newly generated.

In Step S46, the disc drive section 22 records the transmitted clip to which the new UMID is attached in association with the generated NRT in the disc recording medium 24.

Through the above processing, in the change mode, when the clip that has been generated by picking up the image through the image pickup device 2 is transferred to the disc drive 1, the UMID is newly attached to the clip as it is, with the result that the UMID is changed and recorded. Through the above processing, the clip in the image pickup device 2 that generates the clip and the clip in the disc drive 1 that records the clip have different UMID attached thereto, respectively, as a result of which even if edition is made in the following process, those clips can be distinctly managed.

However, in the case where plural staffs are going to edit the same clip by different devices, respectively, there is a case in which the management of the clip becomes difficult when the UMID is changed every time the clip is moved between the respective devices as described above. Under the above circumstances, there is a save mode in which the UMID is saved even if the clip is moved between the respective devices.

Figure 16:
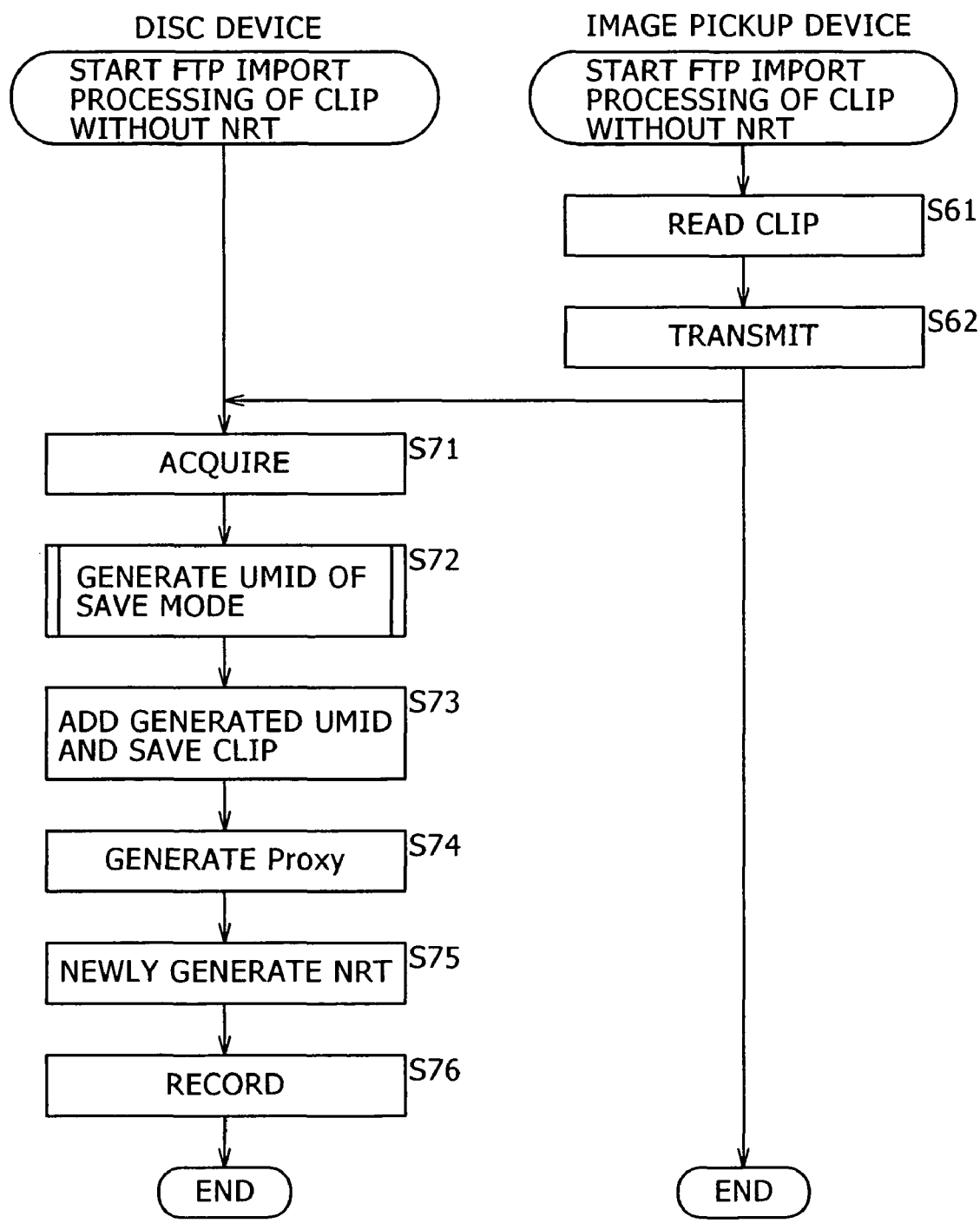
FIG. 16 is a flowchart for explaining an FTP import process of a clip without NRT in the disk drive and the image pickup device shown in FIG. 3 in a change mode.

Subsequently, a description will be given of a process in which the clip without NRT which has been generated thorugh the image pickup process by the image pickup device 2 in the save mode is transmitted to the disc drive 1 by the FTP, and then imported (recorded) with reference to a flowchart of FIG. 16. The processing of Steps S61 and S62 and the processing of Steps S71 and S73 to S76 in the flowchart of FIG. 16 are identical with the processing of Steps S31 and S32 and the processing of Steps S41 and S42 to S46 which are described with reference to the flowchart of FIG. 12. Therefore, their description will be omitted.

In Step S72, the UMID generating section 31 in the edit list editing section 14 generates the UMID of the clip that has been transmitted through the network 6 and the communication section 20 from the image pickup device 2 in the save mode. That is, the transmitted clip is recorded within the disc drive 1 without any change.

Figure 17:
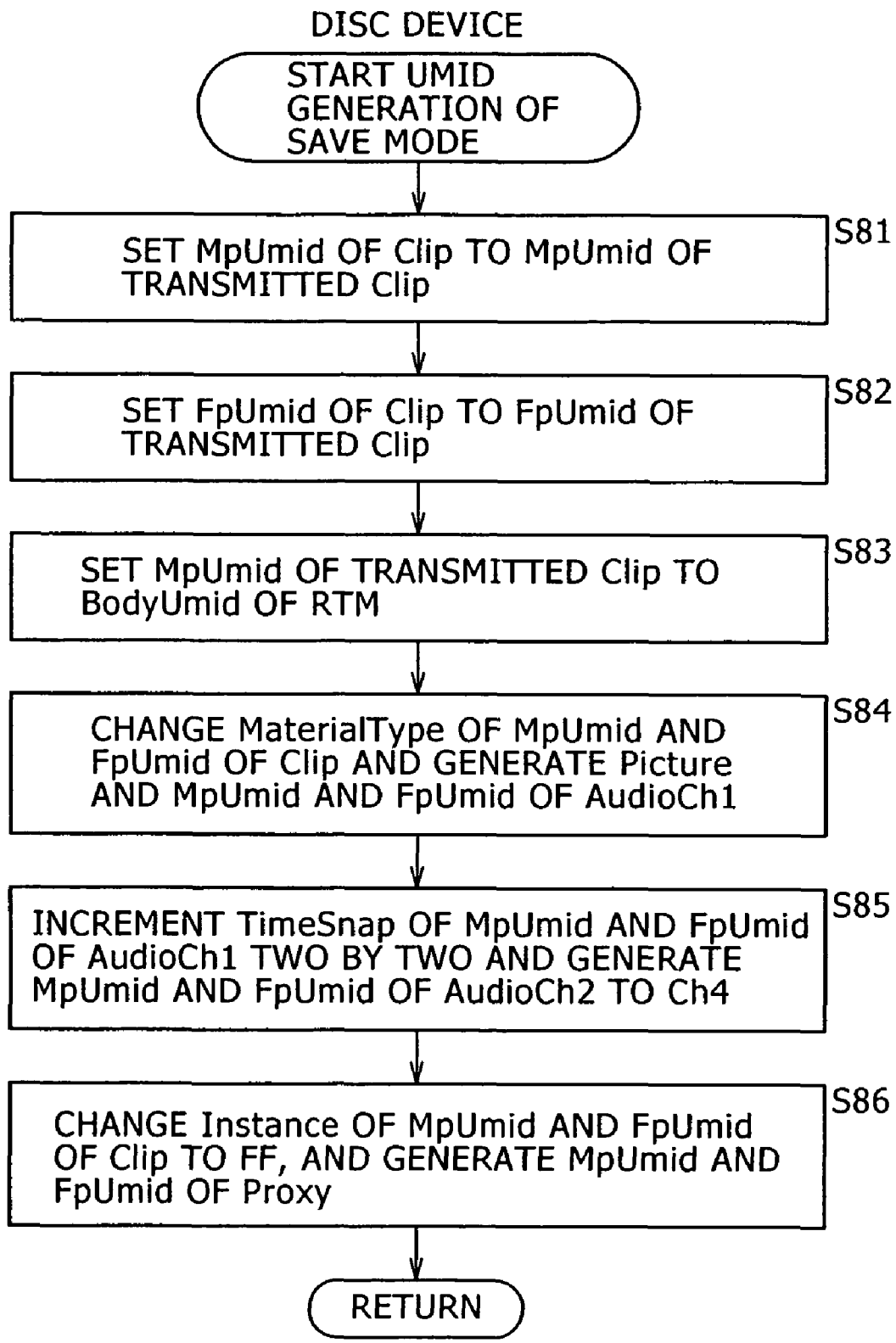
FIG. 17 is a flowchart for explaining a UMID generating process in a save mode.

Now, the UMID generating process in the save mode will be described with reference to the flowchart of FIG. 17.

In Step S81, the clip UMID generating section 51a newly generates the MpUmid with respect to the clip according to the generation time. For example, it is assumed that the clip UMID generating section 51a generates the MpUmid with respect to the clip as "060A2B3401010105010010D4313000 000 2405C2080046020117F0016C2 91C0072" as shown in FIG. 18. In FIG. 18, "UMID of Input signal" is exhibited at the uppermost column in the figure, which indicates the UMID of the MpUmid of the transmitted clip. In this case, the MpUmid that is attached to the transmitted clip is indicated as "060A2B340101010501010D43130000002405C20800460 20117F0016C2 91C0072", and the FpUmid that is attached to the transmitted clip is indicated as "060A2B3401010105 01010D43130000006C291C00722405C2080046020 117".

In Step S82, the clip UMID generating section 31a sets the FpUmid that is attached to the transmitted clip as UpUmid of the new clip. That is, as shown in FIG. 18, the FdUmid of the clip is generated as the same value as the MpUmid of the transmitted clip.

In Step S83, the RTM-UMID generating section 31b generates the MpUmid of the transmitted clip as BodyUmid of the RTM. That is, as shown in FIG. 15, the BodyUmid of the RTM is generated as the same value as the MpUmid of the transmitted clip.

In Step S84, the picture UMID generating section 31c changes the Material Type of the MpUmid and the FpUmid of the clip, and generates the MpUmid and the FpUmid of the image data. Also, the audio UMID generating section 31d changes the Material Type of the MpUmid and the FpUmid of the clip, and generates the MpUmid and the FpUmid of the sound data of the first channel.

In Step S85, the audio UMID generating section 31d sequentially increments the head byte of the TimeSnap of the MpUmid and FpUmid of the sound data of the first channel two by two, respectively, and generates the MpUmid and FpUmid of the sound data of the second to fourth channels.

In step S86, the proxy UMID generating section 31e changes the head bytes of the respective instance numbers of the MpUmid and FpUmid of the clip from "00" to "FF" indicative of the proxy data to generate the MpUmid and FpUmid of the proxy data.

Through the above processing, the MUmid of the clip is substantially generated but not changed, and also other UMID can be generated in a chain reaction, thereby making it possible to generate the UMID at a high speed.

That is, as shown in FIG. 19, the information on the clip and the UMID which have been generated by the image pickup device 2 is recorded in the disc drive 1 without any change (as shown in FIG. 19, the UMID of the clip remains "$U_1$" even in the image pickup device 2 or the disc drive 1), and NRT is newly generated.

The above processing makes it possible to facilitate the management of a case in which the clip is edited by another apparatus and then returned to the original.

In the management of the UMID of the clip, basically, in the case where the UMID is moved between the respective apparatuses, the UMID is basically generated in the update mode. More particularly, in a specific case in which the edited clip is decided to be returned to the original later, the save mode is applied. Under the circumstances, the FTP transfer under the assumption that the UMID is updated in the update mode is particularly called "standard FTP transfer", and the FTP transfer under the assumption that the UMID is updated (actually not updated) in the save mode is particularly called "extended FTP transfer".

Figure 20:
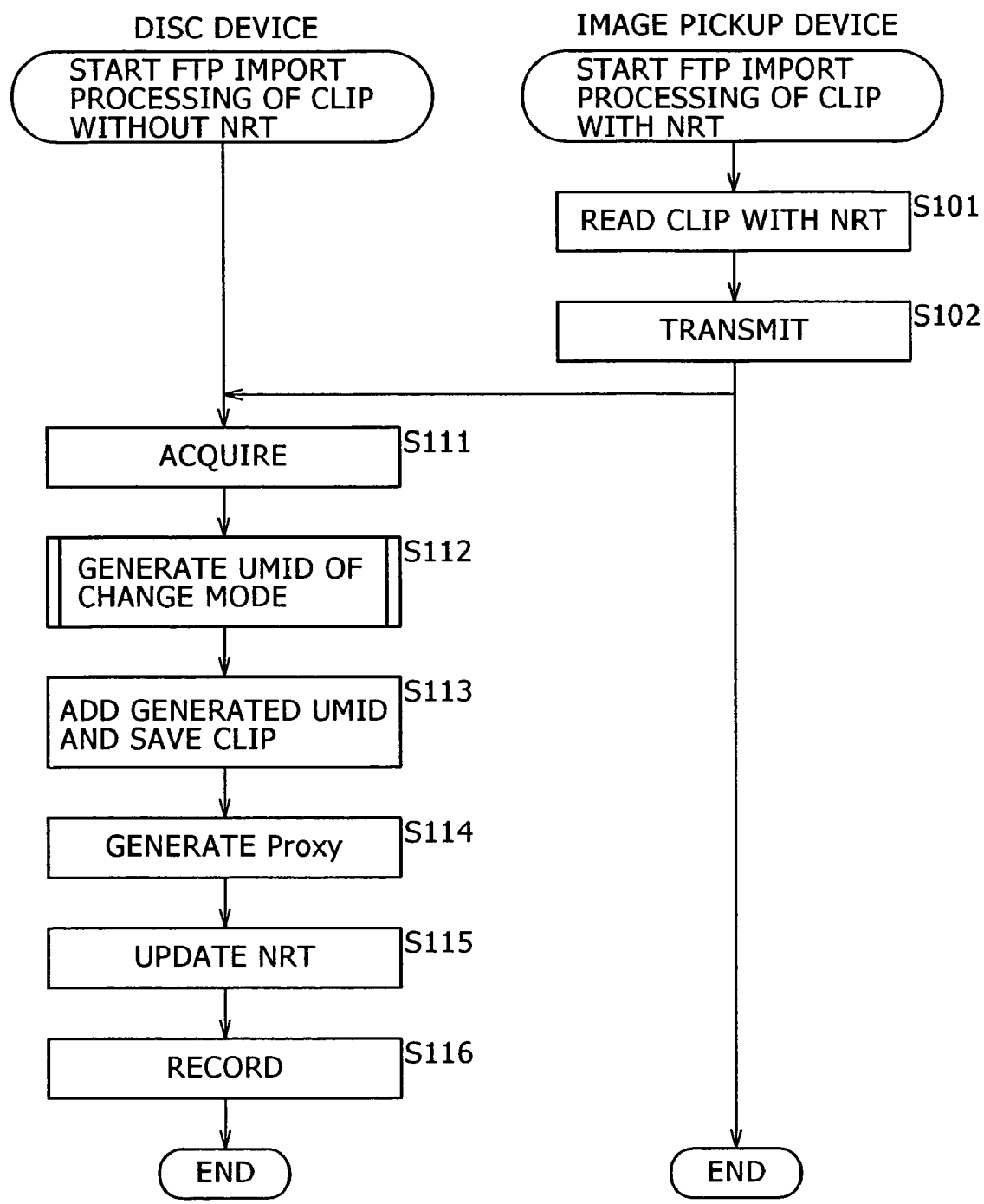
FIG. 20 is a flowchart for explaining an FTP import process of a clip with NRT in the disk drive and the image pickup device shown in FIG. 3 in a change mode.

Subsequently, a description will be given of a process in which the clip including the NRT that has been generated through the image pickup process by the image pickup device 2 is transmitted to the disc drive 1 by the standard FTP transfer, and then imported (recorded) with reference to a flowchart of FIG. 20. The processing of Steps S111 to S114 and S116 in the flowchart shown in FIG. 20 is identical with the processing of Steps S41 to S44 and S46 which are described with reference to the flowchart shown in FIG. 12. Therefore, their description will be omitted.

Figure 21:
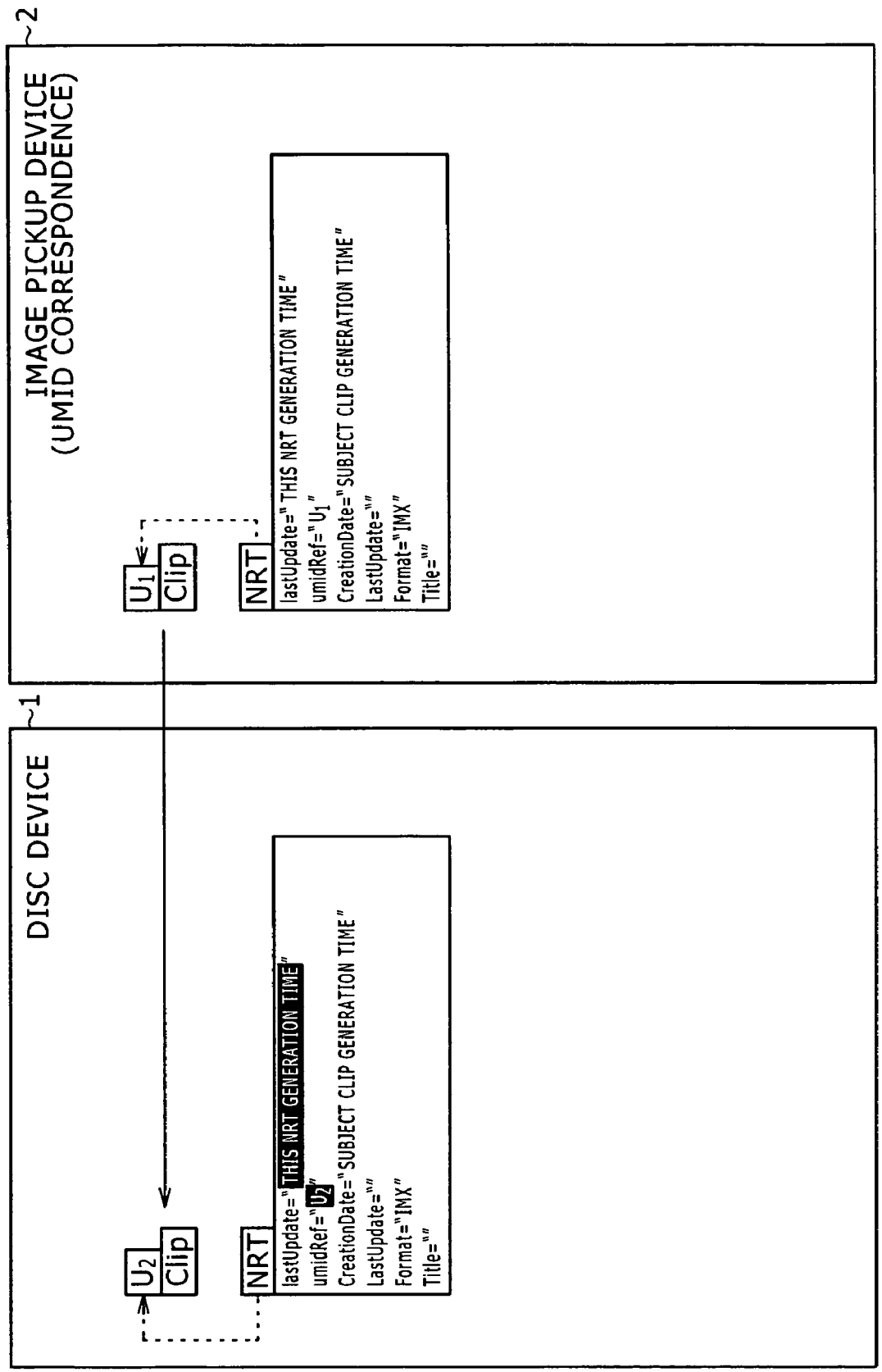
FIG. 21 is a flowchart for explaining an FTP import process of a clip without NRT in the disk drive and the image pickup device shown in FIG. 3 in the change mode.

In Step S101, the communication section 53 of the image pickup device 2 reads the clip and the NRT which are stored in the memory section 52, and transmits the read clip and NRT to the disc drive 1 through the network 6 in Step S102 as shown in FIG. 21.

In Step S115, the NRT editing section 32 updates the transmitted NRT. That is, the NRT editing section 32 updates the transmitted NRT on the basis of the information on the generated clip. That is, the NRT generating section 62 updates "this NRT generation time" as the lastupdate indicative of the time at which the NRT is updated as shown in FIG. 21, and then updates the umidRef (the information on the reference UMID which is referred to at the time of link) from "$U_1$" to "$U_2$" since the link has been updated with respect to the newly generated UMID.

Through the above processing, since the NRT is updated in correspondence with the newly generated UMID in the standard FTP transfer, it is easy to manage the clip.

Figure 22:
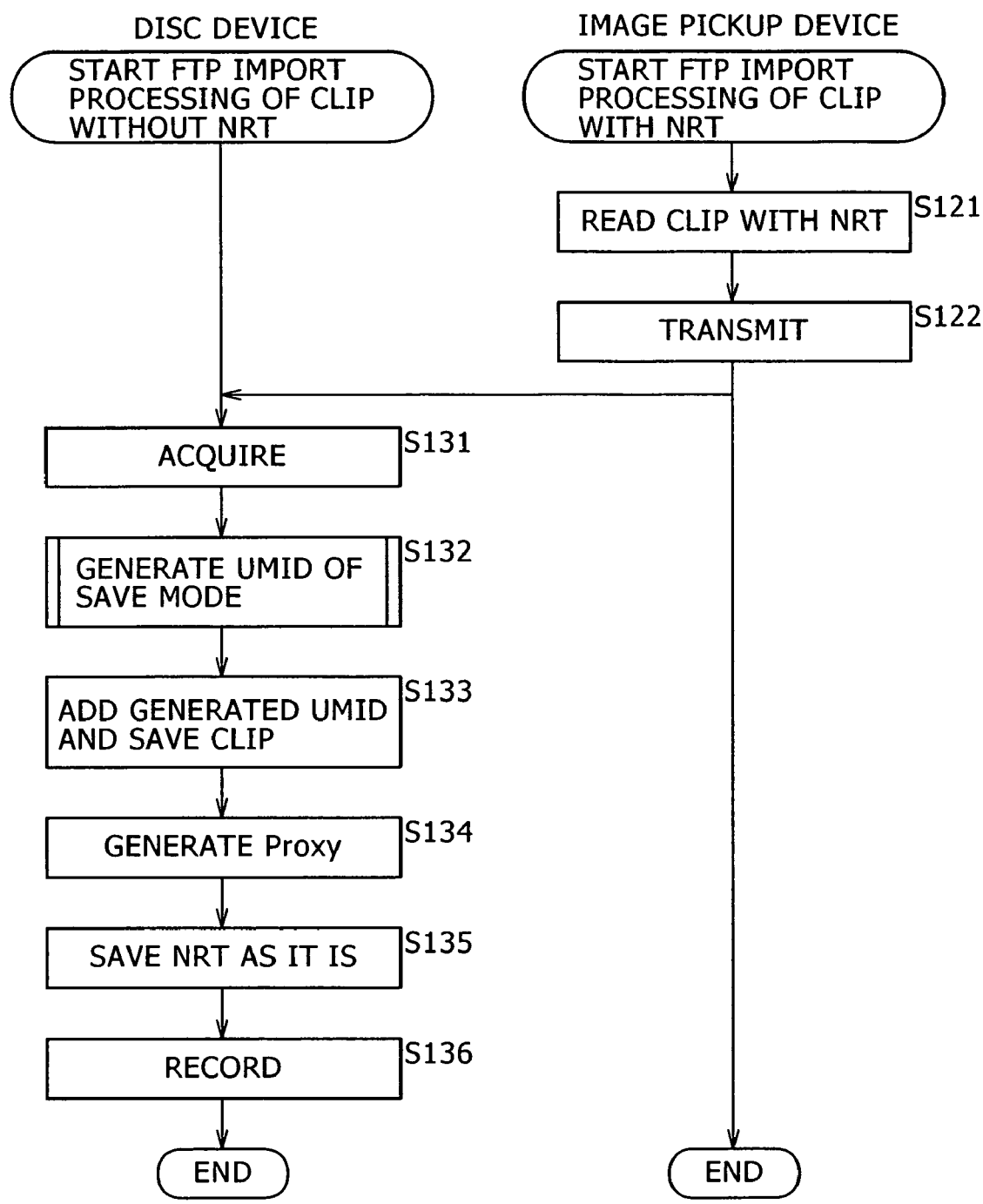
FIG. 22 is a flowchart for explaining an FTP import process of a clip with NRT in the disk drive and the image pickup device shown in FIG. 3 in the save mode.

Subsequently, a description will be given of a process in which the clip including the NRT that has been generated through the image pickup process by the image pickup device 2 is transmitted to the disc drive 1 by the extended FTP transfer, and then imported (recorded) with reference to a flowchart of FIG. 22. The processing of Steps S131 to S134 and S136 in the flowchart shown in FIG. 22 is identical with the processing of Steps S71 to S74 and S76 which are described with reference to the flowchart shown in FIG. 16. Therefore, their description will be omitted.

Figure 23:
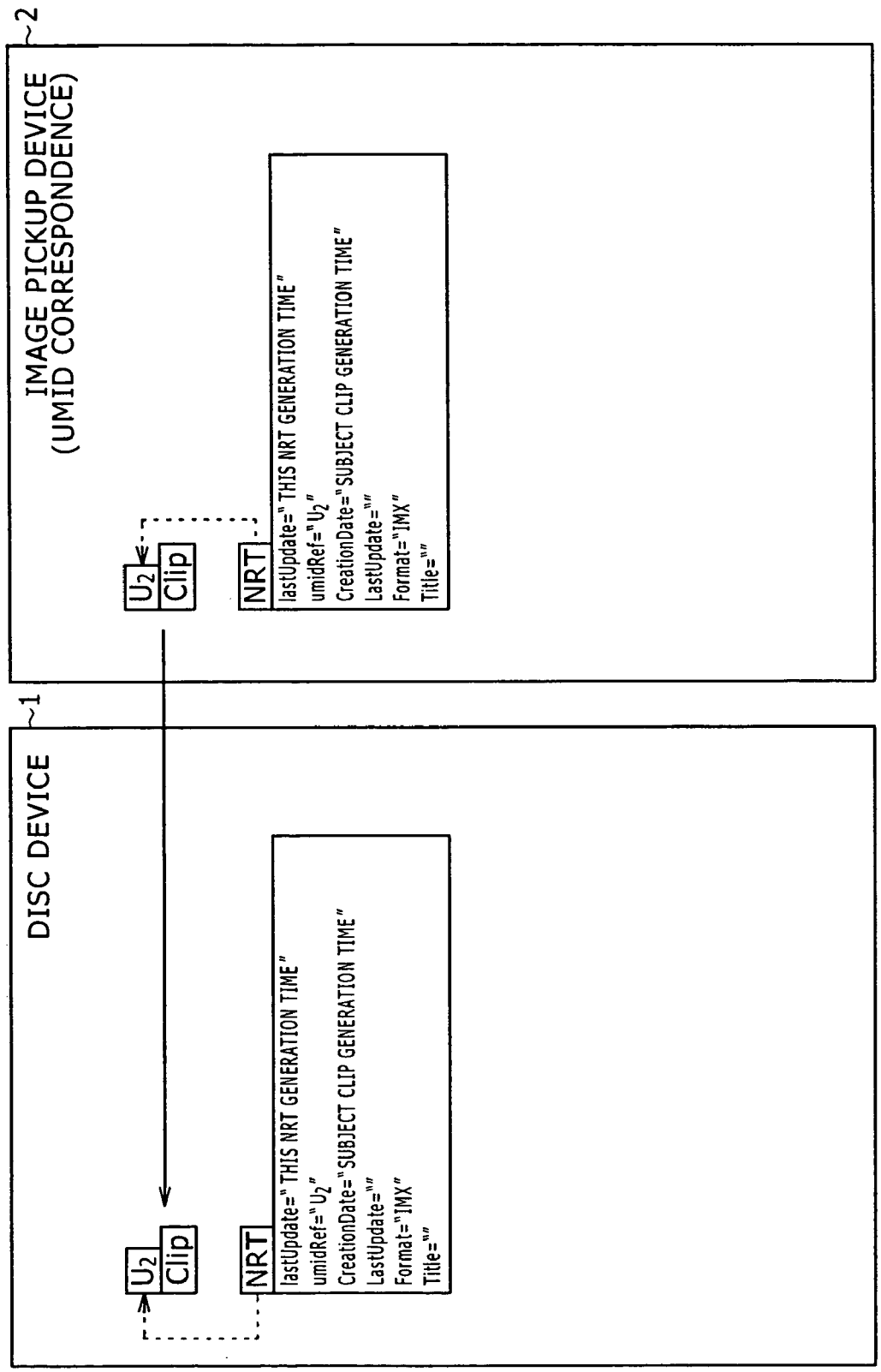
FIG. 23 is a diagram for explaining an overwrite process of a clip with NRT in the disk drive and the image pickup device shown in FIG. 3 in the save mode.

In Step S121, the communication section 53 of the image pickup device 2 reads the clip and the NRT which are stored in the memory section 52, and transmits the read clip and NRT to the disc drive 1 through the network 6 in Step S122 as shown in FIG. 23.

In Step S135, the NRT editing section 32 saves the transmitted NRT as it is. That is, as shown in FIG. 23, the NRT editing section 32 records "this NRT generation time" as the clip, the UMID (recorded as "$U_2$"), and the NRT (lastUpdate (information on the generation date of this NRT)) in the image pickup device 1. The NRT editing section 32 also records "$U_2$" as the umidRef (information on the reference UMID that is referred to at the time of link), and records "object clip generation time" as the Creation Date (information on the generation date of the object clip). The NRT editing section 32 further records blank as the Last Update (information on the update date of the object clip), records "IMX" as the Format (format of the information generated by an equipment), and records the Title (title of the generated NRT) in the identical state in the disc drive 1.

Through the above processing, in the case where he clip is subjected to the extended FTP transfer between the apparatuses, since the UMID is saved, and the NRT is also saved correspondingly as it is, the management of the clip is facilitated according to the circumstances.

Figure 24:
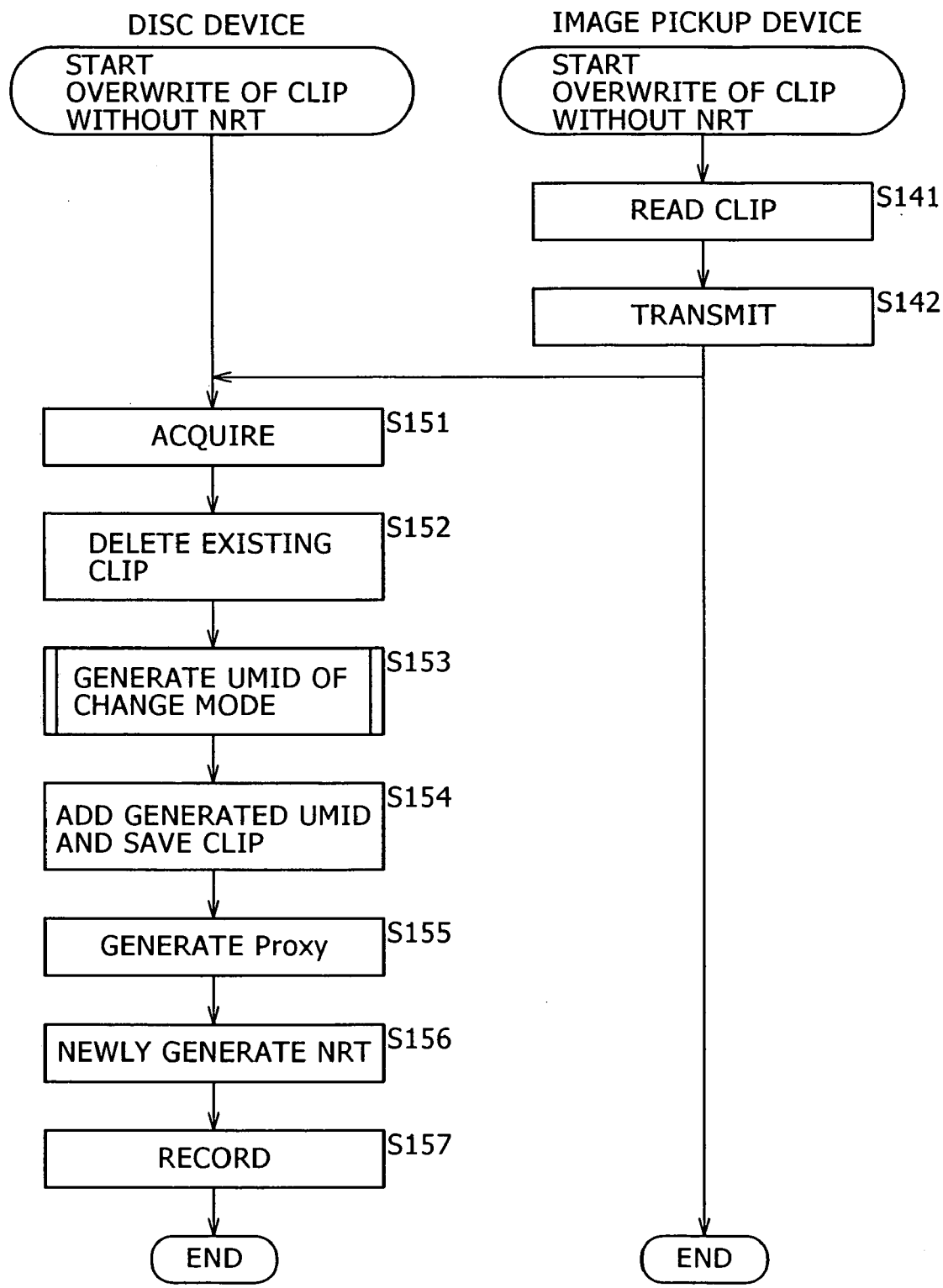
FIG. 24 is a flowchart for explaining an overwrite process of a clip without NRT in the disk drive and the image pickup device shown in FIG. 3 in the change mode.

Subsequently, a description will be given of a process in which the clip without NRT that has been generated through the image pickup process by the image pickup device 3 is imported (recorded) to the disc drive 1 by the standard FTP transfer, and then overwritten on the clip with the existing NRT in the disc drive 1 with reference to a flowchart of FIG. 24. The processing of Steps S151 and S153 to S157 in the flowchart shown in FIG. 24 is identical with the processing of Steps S41 to S46 in the flowchart shown in FIG. 12. Therefore, their description will be omitted.

Figure 25:
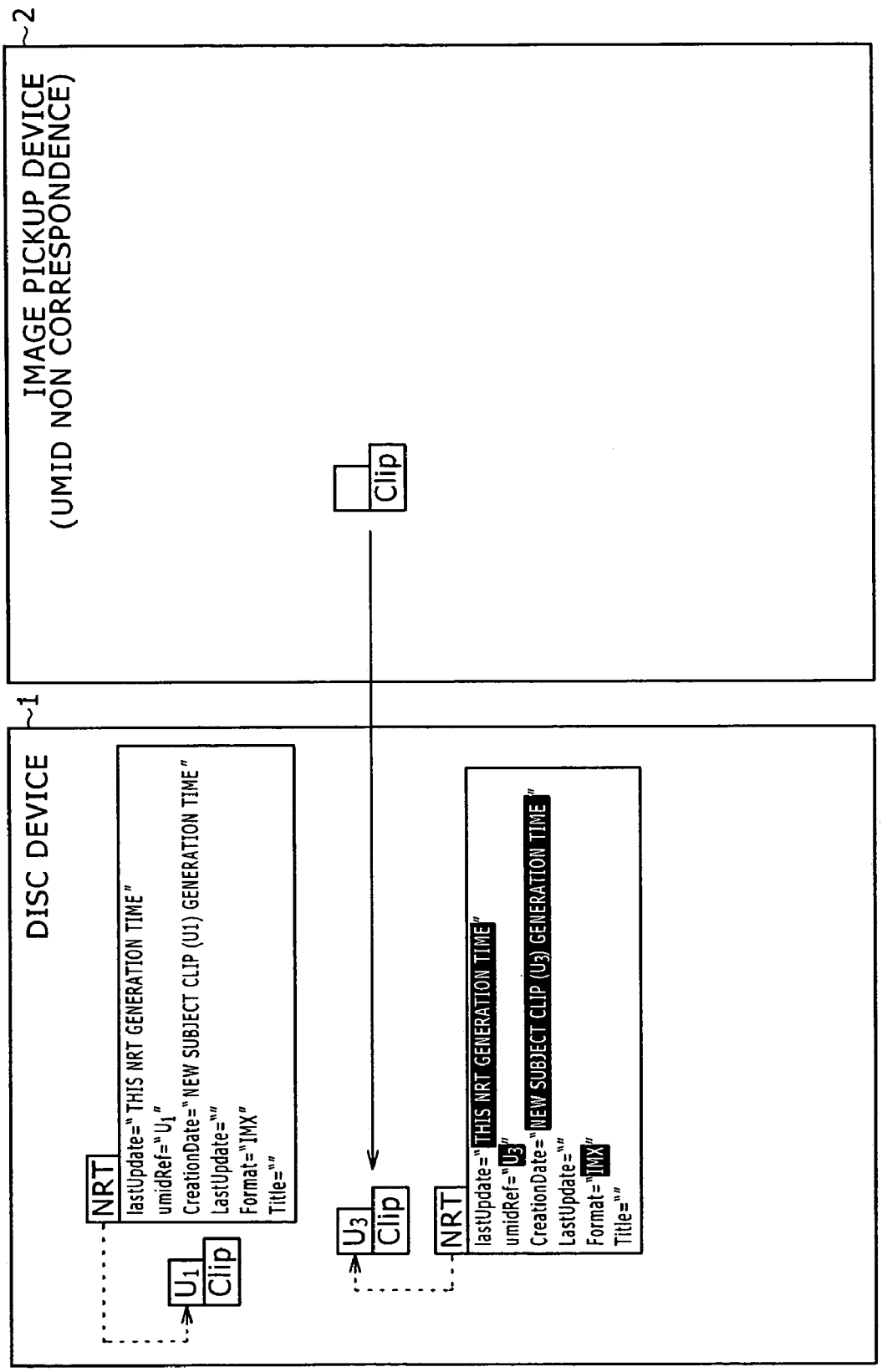
FIG. 25 is a diagram for explaining an overwrite process of a clip without NRT in the disk drive and the image pickup device shown in FIG. 3 in the change mode.

In Step S141, the communication section 83 in the image pickup device 3 reads the clip stored in the memory section 82 and, as shown in FIG. 25, transmits the clip to the disc drive 1 via the network 6 in Step 142. Since the image pickup device 3 cannot attach UMID to the clip, the clip to be received has not been provided with UMID, as shown in the image pickup device 3 of FIG. 25 (the inside the frame of UMID has been blanked).

In Step S152, upon transmission of the clip from the image pickup device 3, the edit list editing section 14 controls the disc drive section 22, and the deletes the existing clip that is recorded in the disc recording medium 24.

That is, as shown in FIG. 25, in the disc drive 1 (upper portion in the figure), there exists the clip with the NRT having "$U_1$" attached to the UMID as the existing clip (in FIG. 25, NRT in which the lastUpdate is recorded as "this NRT generation time", the umidRef is recorded as "$U_1$", the Creation Date is recorded as "new object clip ($U_1$) generation time", the LastUpdate is recorded in a blank state, the Format is recorded as "IMX", and the Title is recorded in the blank state) The edit list editing section 14 deletes the clip except for the existing NRT. Then, the UMID is generated in the change mode in Step S153, and the generated UMID is attached to the transmitted clip in Step S154. That is, as shown in FIG. 25, the "$U_3$" which is the UMID that has been generated in the update mode is attached to the transmitted clip instead of the "$U_1$" which is the existing UMID.

Further, in Step S156, the NRT is newly generated. That is, the new NRT is generated with respect to the transmitted clip as indicated at the lower portion of FIG. 25, in addition to the NRT that is attached to the existing clip indicated at the upper portion of FIG. 25. In the NRT that has been newly generated at the lower portion of FIG. 25, the newly recorded information is indicated by white characters on the black background. Then, the lastUpdate is recorded as "this NRT update time", the umidRef is recorded as "$U_3$", the Creation Date is recorded as "new object clip ($U_3$) generation time", the LastUpdate is recorded in a blank state, the Format is recorded as "IMX", and the Title is recorded in the blank state.

That is, the overwrite process that is described with reference to the flowchart of FIG. 24 is substantially identical with a case in which the new clip is generated after the existing clip has been deleted.

Accordingly, for example, the NRT may not be newly generated, but the existing NRT may be updated.

Figure 26:
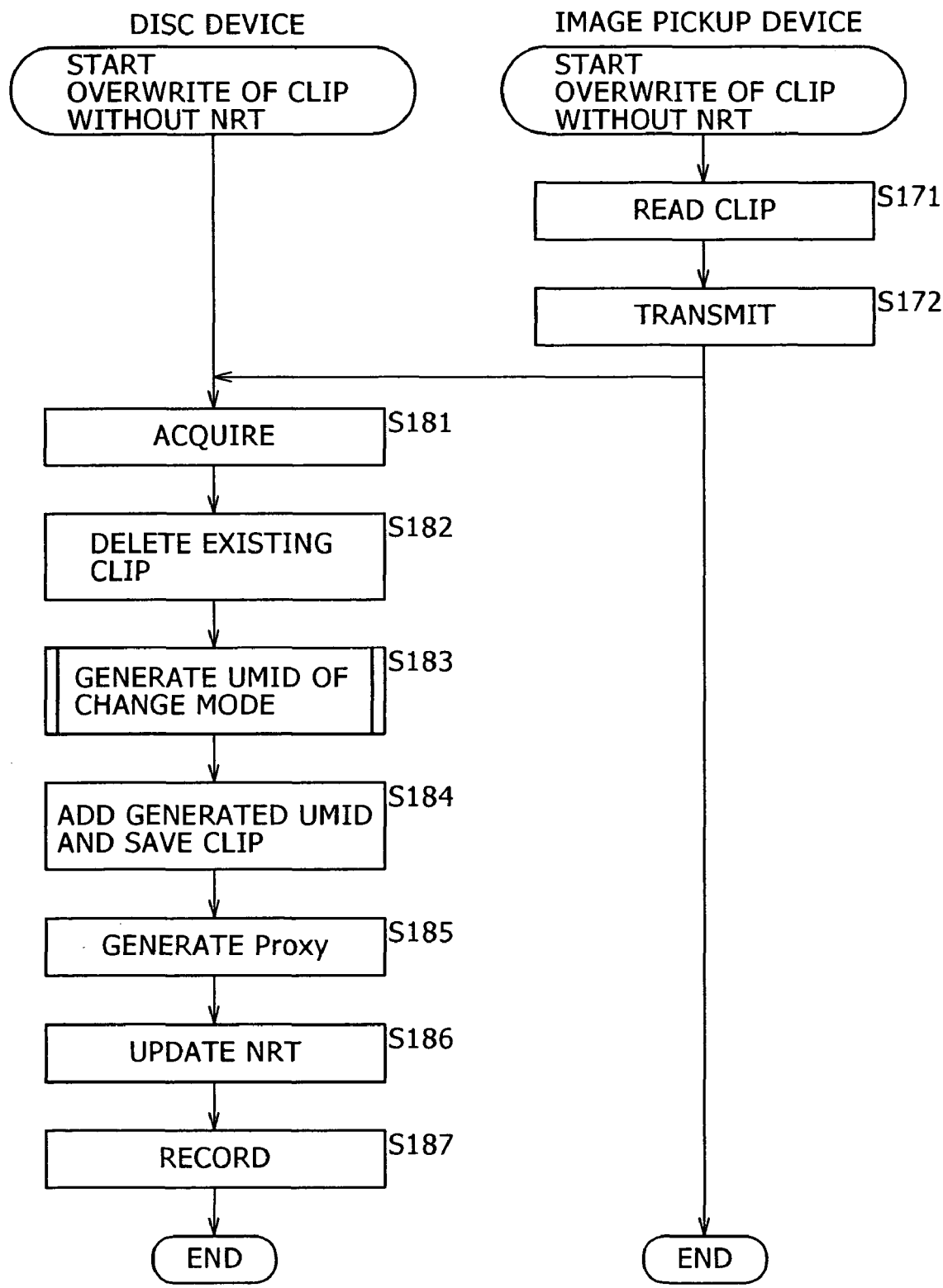
FIG. 26 is a flowchart for explaining another overwrite process of a clip without NRT in the disk drive and the image pickup device shown in FIG. 3 in the change mode.

Subsequently, a description will be given of a process in which the clip without NRT that has been generated through the image pickup process by the image pickup device 3 is transmitted and imported to the disc drive 1 through the standard FTP transfer, and the NRT is updated and overwritten with respect to the clip with the existing NRT in the disc drive 1 with reference to a flowchart of FIG. 26. The processing of Steps S171 and S172 and the processing of Steps S181 to S185 and S187 in the flowchart shown in FIG. 26 are identical with the processing of Steps S141 and S142 and the processing of Steps S151 to S155, and S157 in the flowchart shown in FIG. 24. Therefore, their description will be omitted.

Figure 27:
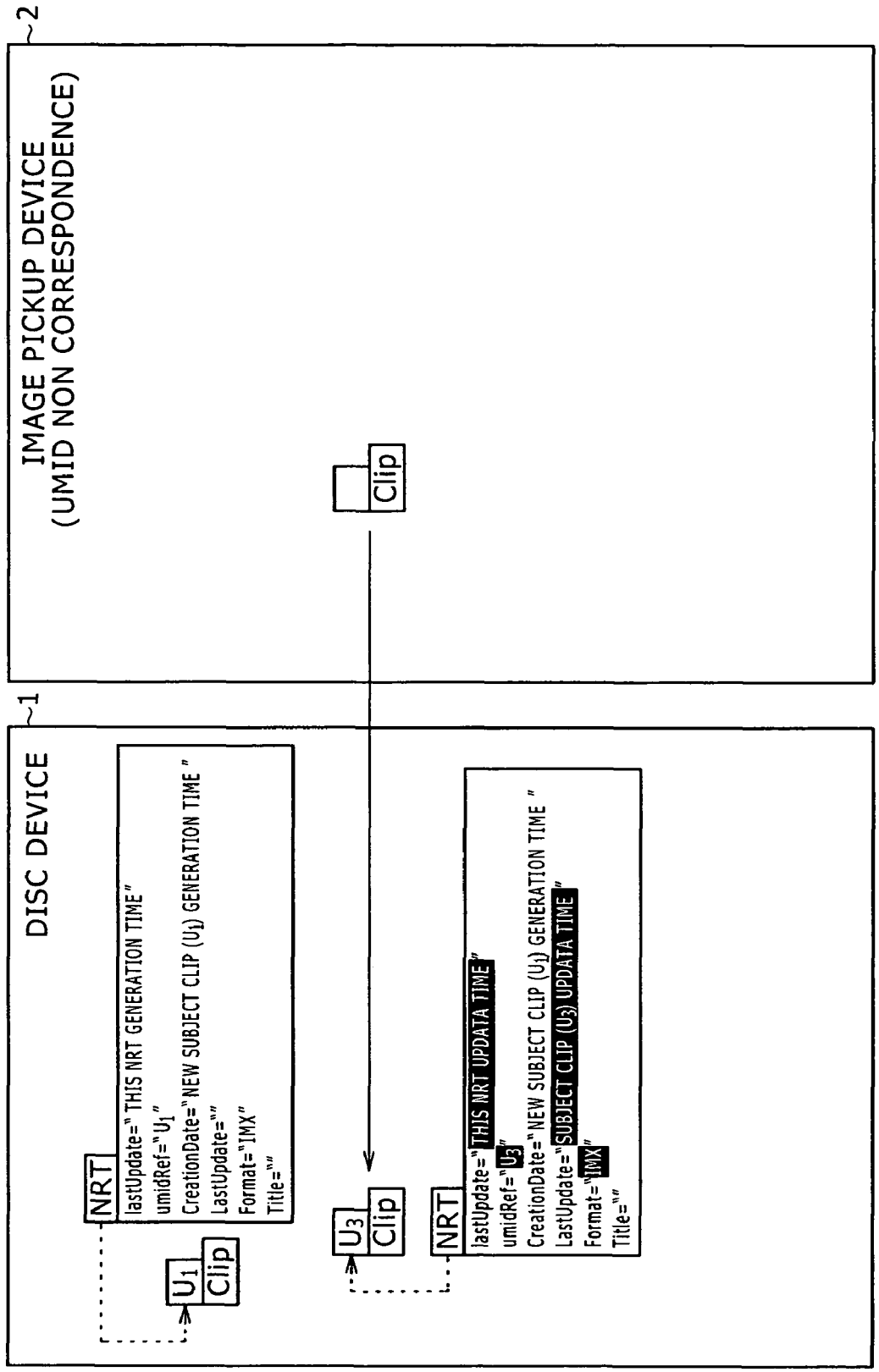
FIG. 27 is a diagram for explaining another overwrite process of a clip without NRT in the disk drive and the image pickup device shown in FIG. 3 in the change mode.

In Step S186, as shown in FIG. 27, the NRT is updated. That is, information corresponding to the new clip with respect to the transmitted clip is updated as indicated at the lower portion of the disc drive 1 in FIG. 27 among the information of the NRT that is attached to the existing clip as indicated at the upper portion of the disc drive 1 in FIG. 27.

In the NRT that has been newly generated at the lower portion of FIG. 27, the newly recorded information is indicated by white characters on the black background. Then, the lastupdate is recorded as "this NRT update time", the umidRef is recorded as "$U_3$", the Creation Date is recorded as "new object clip ($U_1$) generation time", the LastUpdate is recorded as "new object clip ($U_3$) update time", the Format is recorded as "IMX", and the Title is recorded in the blank state. That is, the NRT is not newly generated, but the existing NRT is updated. Therefore, the lastupdate, the umidRef and the LastUpdate are changed so as to correspond to the newly generated UMID, and the Creation Date is not changed from "the new object clip ($U_1$) generation time" which has been recorded in the existing NRT.

Through the above processing, when the clip is transmitted to the disc drive 1 from the editing device 5, it is possible that the NRT is newly generated or changed according to the transmitted clip, and it is possible to manage the NRT by switching over the processing if necessary.

Figure 28:
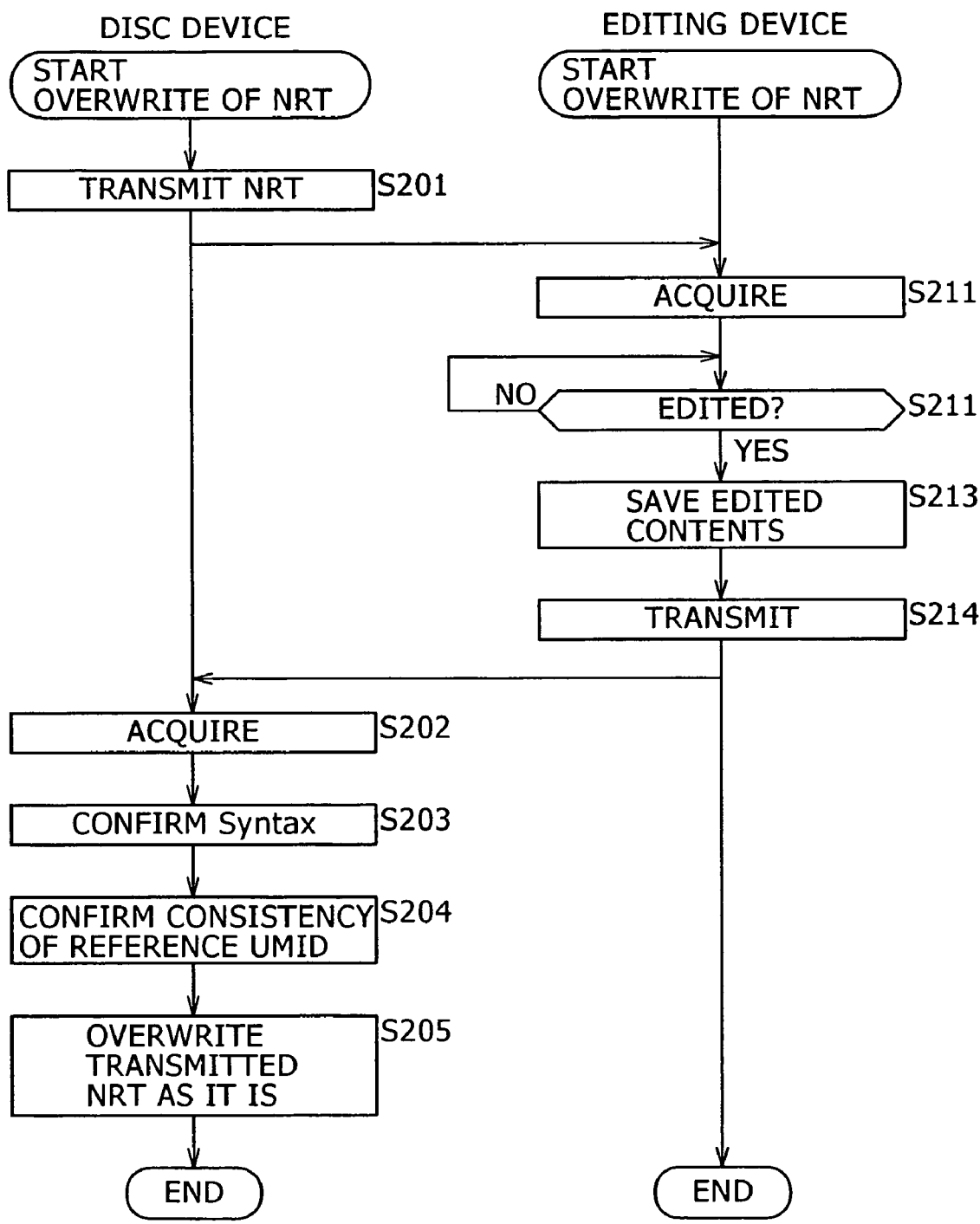
FIG. 28 is a flowchart for explaining the overwrite process of NRT by-the disc drive and the editing device shown in FIG. 5.

Subsequently, with reference to a flowchart of FIG. 28, a description will be given of a process in which after the disc drive 1 transmits the existing NRT to the editing device 4 and the NRT is edited by the editing device 4, the editing device 4 overwrites the edited NRT on the disc drive 1.

Figure 29:
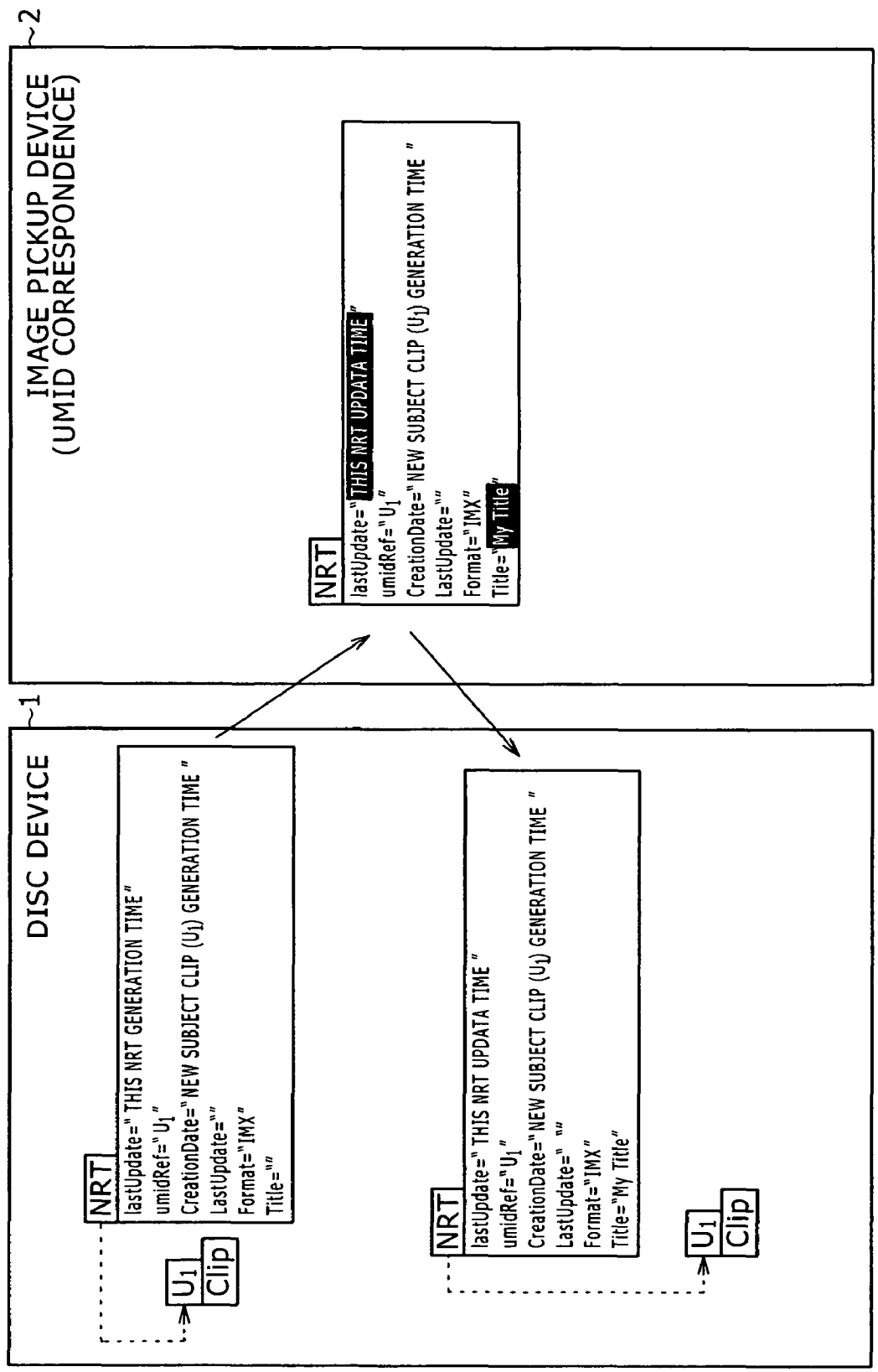
FIG. 29 is a diagram for explaining the overwrite process of NRT by the disc drive and the editing device shown in FIG. 5.

In Step S201, the communication section 220 in the disc drive 1 transmits the NRT of the clip with the NRT, for example, indicated at the upper portion of the disc drive 1 in FIG. 29, which is read from the disc recording medium 24 by means of the disc drive section 22, to the editing device 4 through the network. In FIG. 29, in the clip that is transmitted from the disc drive 1, the UMID is indicated by "$U_1$1". In the NRT, the lastUpdate is recorded as "this NRT update time", the umidRef is recorded as "$U_1$" the Creation Date is recorded in the bland state, the LastUpdate is recorded as "new object clip ($U_3$) update time", the Format is recorded as "IMX", and the Title is recorded in the blank state.

In Step S211, the communication section 111 in the editing device 4 acquires the NRT that is transmitted from the disc drive 1 through the network 6 and stores the transmitted NRT in the memory section 110.

In Step S212, the edit list editing section 105 reads the NRT that has been transmitted from the disc device 1, which has been stored in the memory section 110. Then, the input section 108 is operated by the user, and judges whether the NRT has been edited, or not. Until the judgment is made that the NRT has been edited, the above processing is repeated. For example, as shown in FIG. 29, in the case where the information on the Title which has been in the blank stage is edited as "My Title", and the editing process is completed, judgment is made that the information on the Title has been edited, and the processing is advanced to Step S213.

In Step S213, the edit list editing section 105 updates the NRT in correspondence with the edition contents, and saves the edition contents in the memory section 110. That is, the edit list editing section 105 updates the item of the edited Title as "My Title" as indicated in the editing device 4 of FIG. 29, and also updates the lasatupdate indicative of the NRT update time to "this NRT update time". In FIG. 29, the updated portion is indicated by white characters on the black background.

In Step S214, the communication section 111 reads the edited NRT that has been stored in the memory section 110, and then transmits the read NRT to the disc drive 1 through the network 6.

In Step S202, the communication section 20 of the disc drive 1 acquires the NRT that has been edited by the editing device 4 through the network 6, and then stores the acquired NRT in the memory section 19.

In Step S203, the edit list editing section 14 reads the edited NRT that has been stored in the memory section 19, and confirms syntax. That is, it is confirmed whether the transmitted NRT is grammatically accurately made up, or not, and if not, the NRT is canceled whereas if so, the operation is advanced to the processing of Step S204.

In Step S204, the edit list editing section 14 confirms the consistency of the reference UMID. That is, the edit list editing section 14 reads the UMID that has been recorded in the umidRef recorded in the NRT, and then confirms the consistency of the UMID. In this case, since "$U_1$" is recorded in the umiRef of the NRT, it is confirmed whether there actually exists the clip whose UMID is "$U_1$", or not. In this case, as indicated at the above portion of FIG. 29, since there exists the clip whose UMID is "$U_1$", the consistency of the UMID is confirmed.

In Step S205, the edit list editing section 14 saves the transmitted NRT as it is in the memory section 19. That is, the NRT that has been edited by the editing device 4 is saved as the NRT of the clip whose UMID is "$U_1$".

The above processing makes it possible that the NRT that is attached to the clip which has been recorded in the disc drive 1 is read, and edited by the editing device 4, and the edition result is overwritten and recorded.

Figure 30:
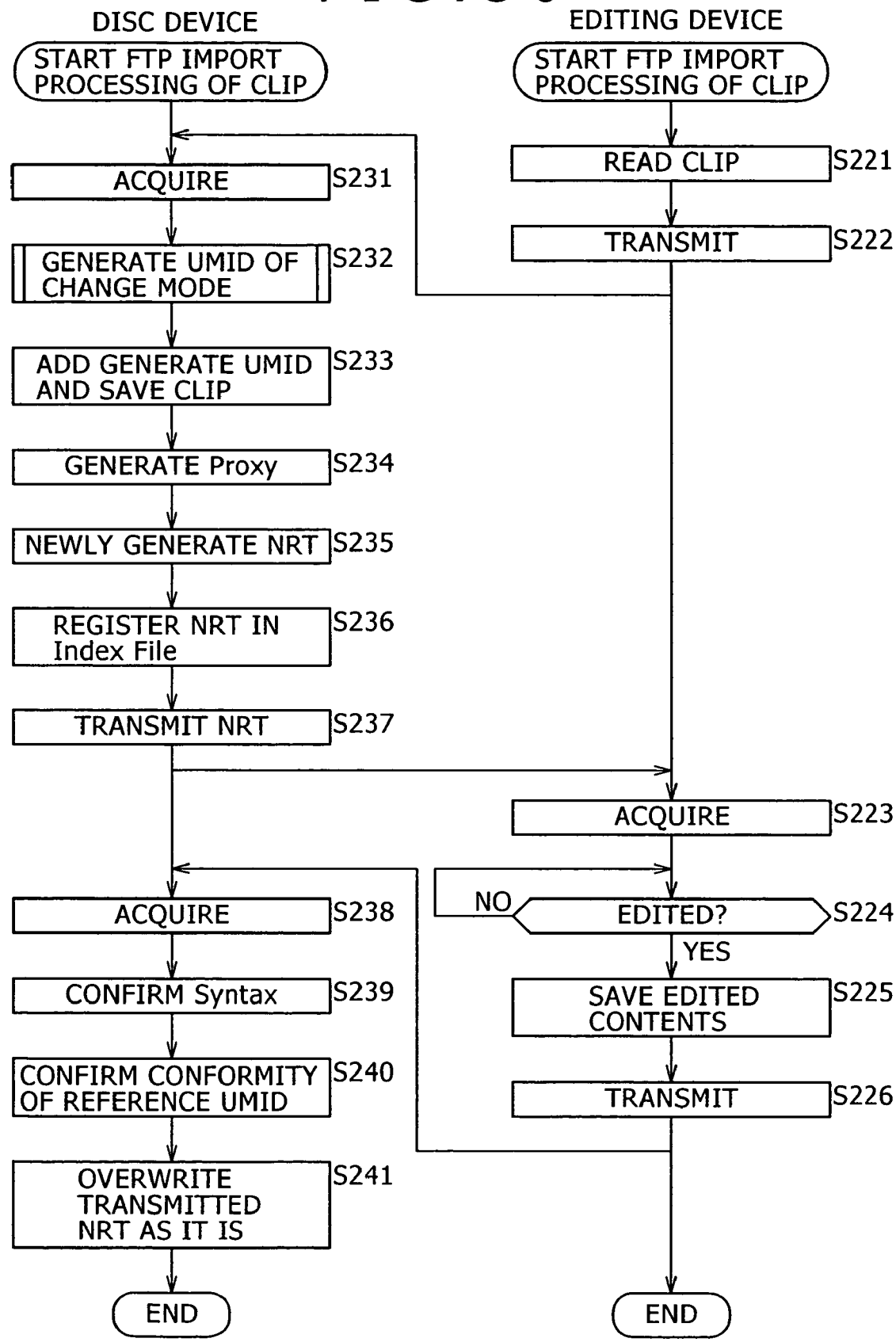
FIG. 30 is a flowchart for explaining an import process of a clip with NRT by the disc drive and the editing device shown in FIG. 6 in a standard FTP transfer.

Subsequently, a description will be given of a process in which the clip with NRT that has been edited by the editing device 5 is transmitted to the disc drive 1 through the standard FTP transfer, and then imported (recorded) with reference to a flowchart of FIG. 30. The processing combines the processing that is described with reference to the flowchart of FIG. 12 with the processing that is described with reference to a flowchart shown in FIG. 28. The processing of Steps S221 to S226 and the processing of Steps S231 to S241 in the flowchart of FIG. 30 are identical with the processing of Steps S31 and S32 which are described with reference to the flowchart of FIG. 12, the processing of Steps S211 to S214 in FIG. 28, the processing of Steps S41 to S45 in FIG. 12, and the processing of Steps S201 to S25 in FIG. 28. Therefore, their description will be omitted. The processing of Steps S221 to S226 is not executed by the edit list editing device 45 or 105, but is executed by the metadata editing section 135.

Figure 31:
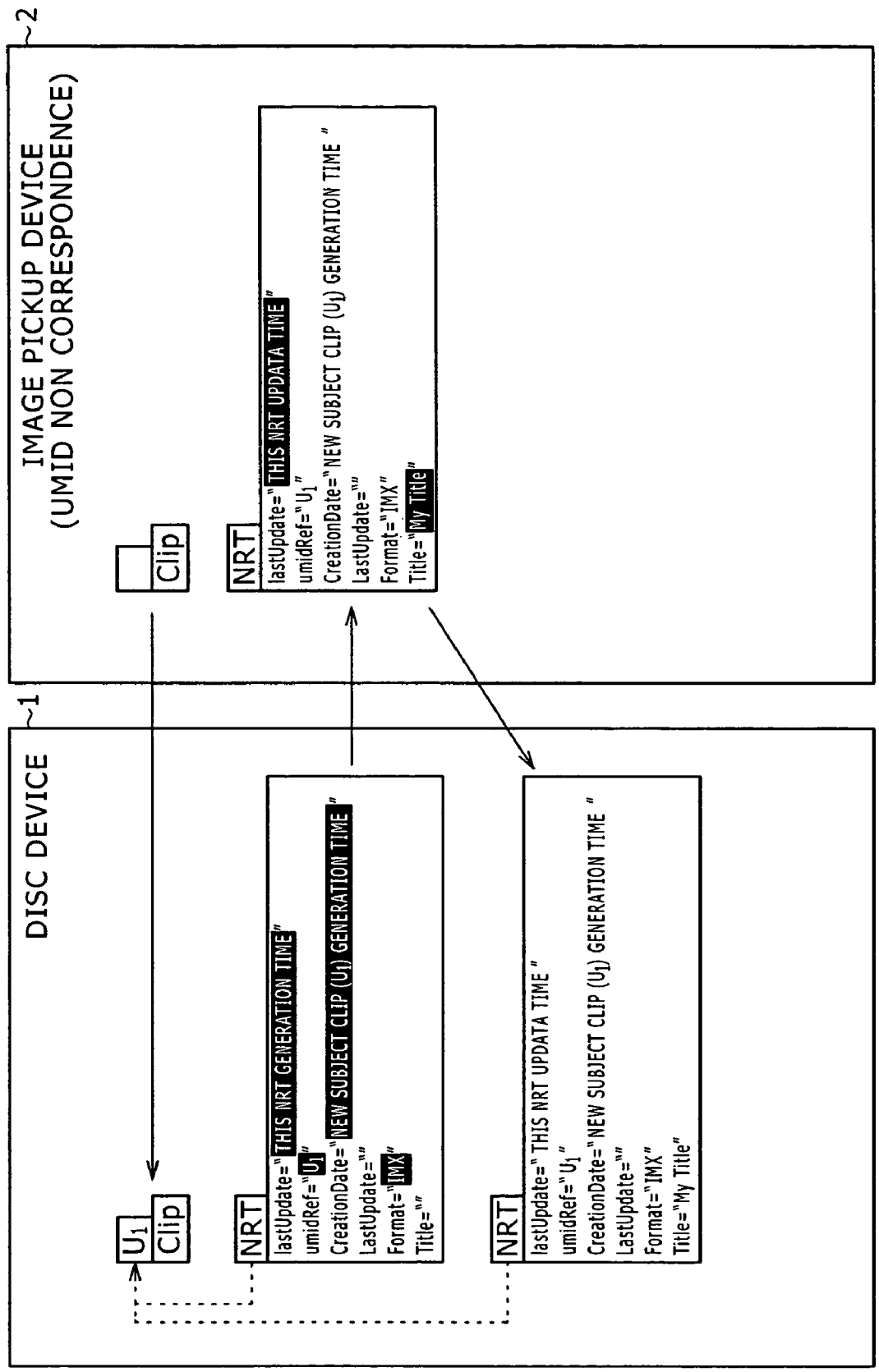
FIG. 31 is a diagram for explaining an import process of a clip with NRT by the disc drive and the editing device shown in FIG. 6 in the standard FTP transfer.

That is, since the editing device 5 cannot generate the UMID (since there is no correspondence to the UMID), the edited clip is not attached with the UMID, and the NRT is also generated. Therefore, through the processing of Step S222, as shown in FIG. 31, the clip whose UMID column is not occupied is transmitted to the disc device 1.

In Step S231, when the clip without UMID is acquired in the disc drive 1, the UMID is generated in the process of Step S232, the UMID is attached to the clip in the process of Step S233, and the NRT is newly generated and then recorded in the disc recording medium 24 in the process of Step S235. That is, in FIG. 31, the NRT is recorded in the disc recording medium 24 in a state where the NRT is attached to the clip. In the NRT, "$U_1$" is add as the UMID, the lastupdate is recorded as "this NRT update time", the umidRef is recorded as "$U_1$", the Creation Date is recorded as "the new object clip ($U_1$) generation time", the LastUpdate is recorded in a blank state, the Format is recorded as "IMX", and the Title is recorded in the blank state. In FIG. 31, the newly generated portion or the updated portion is indicated by white characters on the black background.

Thereafter, the generated NRT is transmitted to the editing device 5 through the processing of Step S247.

In addition, after the NRT has been edited in Steps S223 to S225, the NRT is again transmitted to the disc device 1 in Step S226. In this example, the item of the edited Title is updated as "My Title", and the lasatUpdate indicative of the update time of the NRT is updated to "this NRT update time".

Then, in Steps S238 to S241, after the grammatical check of the NRT and the confirmation of the consistency of the UMID, the transmitted NRT is recorded in association with the clip as it is.

Through the above processing, the disc device 1 generates the UMID with respect to the clip that is edited by the editing device 5. After the NRT is attached to the clip, the NRT is edited by the editing device, and the edition result is recorded in the disc drive 1. As a result, it is possible that even the editing device 5 that cannot generate the UMID or cannot recognize the UMID can apparently generate the UMID, and executes the same processing as that of the editing device 4 that can recognize the UMID.

Figure 32:
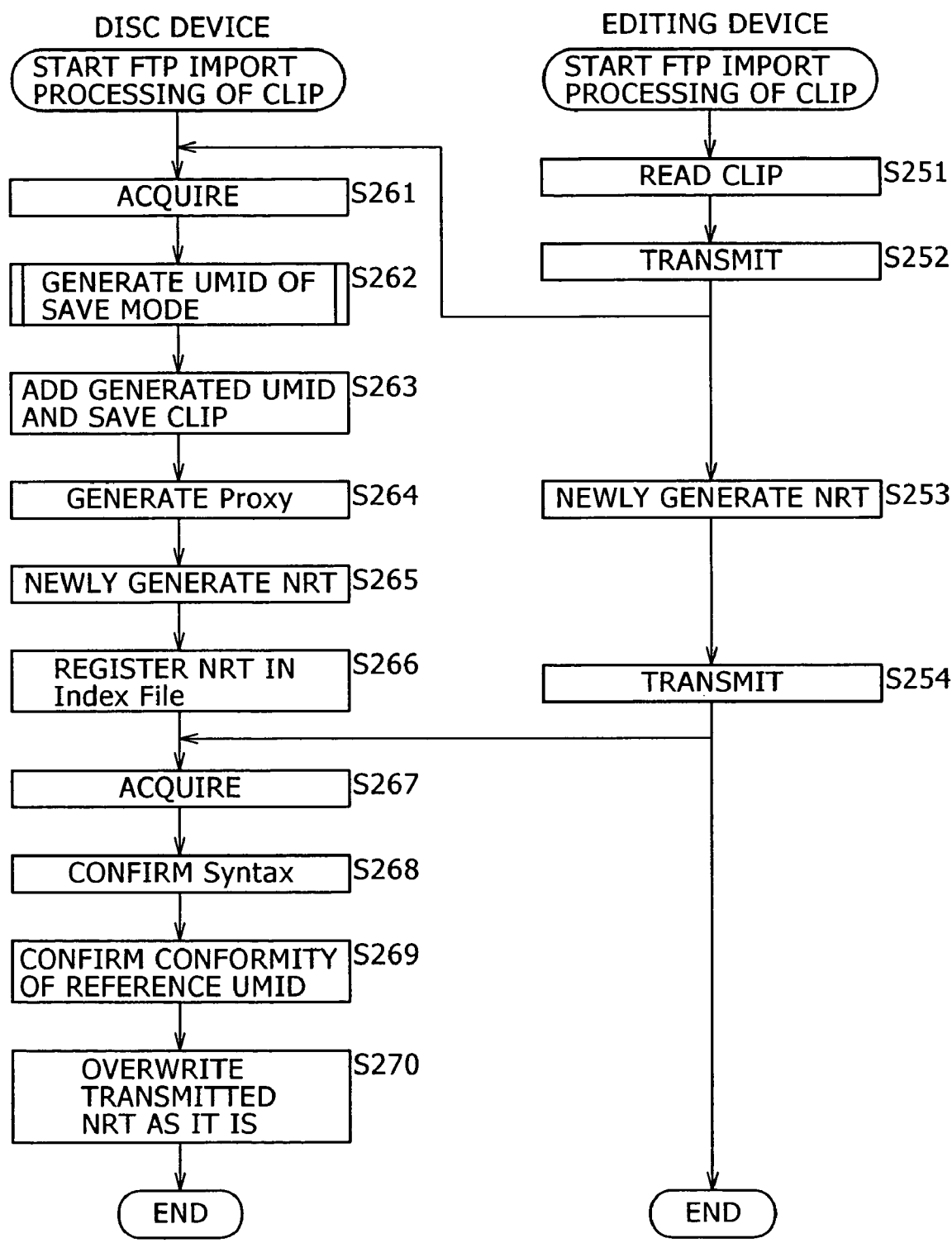
FIG. 32 is a flowchart for explaining an import process of a clip with NRT by the disc drive and the editing device shown in FIG. 5 in an extended FTP transfer.

Subsequently, a description will be given of a process in which the clip with NRT that has been edited by the editing device 4 is transmitted to the disc drive 1 through the extended FTP transfer, and then imported (recorded) with reference to a flowchart of FIG. 32. The processing of Steps S261 to S266 is identical with the processing of Steps S71 and S76 which are described with reference to the flowchart of FIG. 16, and the processing of Steps S267 to S270 in FIG. 32 is identical with the processing of Steps S202 and S205 in the flowchart of FIG. 28. Therefore, their description will be omitted.

Figure 33:
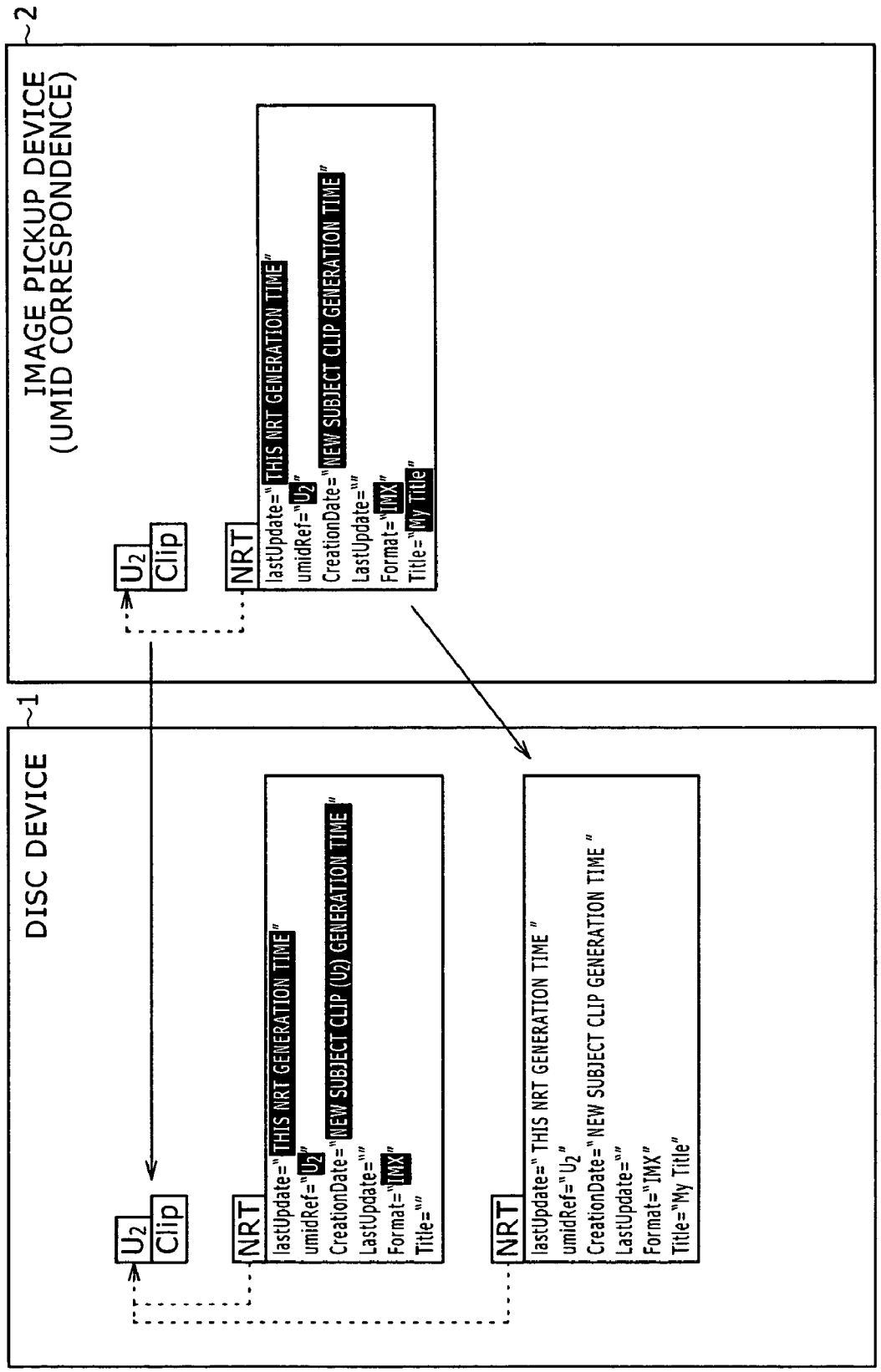
FIG. 33 is a diagram for explaining an import process of a clip with NRT by the disc drive and the editing device shown in FIG. 5 in the extended FTP transfer.

That is, in Step S251, the edit list editing section 105 of the editing device 4 reads the clip that is stored in the memory section 110, and the communication section 111 transmits the read clip to the disc drive 1 through the network 6 by the process of Step S252. That is, since the editing device 4 can generate the UMID, for example, as shown in FIG. 33, the clip which is added with "$U_2$" as the UMID is transmitted to the disc drive 1 as the clip to be transmitted.

Through the above processing, in Steps S261 to S266, the UMID corresponding to the clip is generated and added in the save mode, and a new corresponding NRT is generated. That is, as shown in FIG. 33, the UMID of the transmitted clip is not substantially changed because of the save mode. The NRT is newly generated and recorded in the disc recording medium 24 in a state where the NRT is attached to the clip. In the NRT, the lastUpdate is recorded as "this NRT update time", the umidRef is recorded as "$U_2$", the Creation Date is recorded as "the new object clip ($U_2$) generation time", the LastUpdate is recorded in a blank state, the Format is recorded as "IMX", and the Title is recorded in the blank state. In FIG. 33, the newly generated portion or the updated portion is indicated by white characters on the black background.

On the other hand, in Step S253, the NRT editing section 122 in the editing device 4 generates the NRT. In the NRT, for example, as shown in FIG. 33, the lastupdate is recorded as "this NRT update time", the umidRef is recorded as "$U_2$", the Creation Date is recorded as "the new object clip ($U_2$) generation time", the LastUpdate is recorded in a blank state, the Format is recorded as "IMX", and the Title is recorded in the blank state. In this example, "the new object clip ($U_2$) generation time" of the CreationDate is information on a time at which the clip is read through the processing of Step S251.

In Step S254, the communication section 111 transmits the generated NRT to the disc drive 1.

Then, the processing of Steps S267 to S270 allows the NRT that has been transmitted from the editing device 4 to be attached to the clip and recorded as it is without any change.

Through the above processing, the editing device 4 can record the clip that has been edited by editing device 4 per se in the disc recording medium 24 of the disc drive 1 in a state where the UMIR and NRT are attached to the clip without any change, and for example can edit the same clip by using plural editing devices 4.

Subsequently, a description will be given of a process in which the clip that has been recorded in the disc drive 1 is edited by the editing device 5, and the clip with NRT is again transmitted to the disc drive 1 through the standard FTP transfer, and then imported (recorded) with reference to a flowchart of FIG. 34. The processing of Steps S303 to S313 and the processing of Steps S325 to S328 in the flowchart of FIG. 34 are identical with the processing of Steps S231 and S241 and the processing of Steps S223 to S226 which are described with reference to the flowchart of FIG. 30. Therefore, their description will be omitted. The processing of Steps S221 to S226 is not executed by the edit list editing device 45 or 105, but is executed by the metadata editing section 135. The processing of Steps S325 to S328 is executed by not the edit list editing section 105 but the metadata editing section 135.

Figure 35:
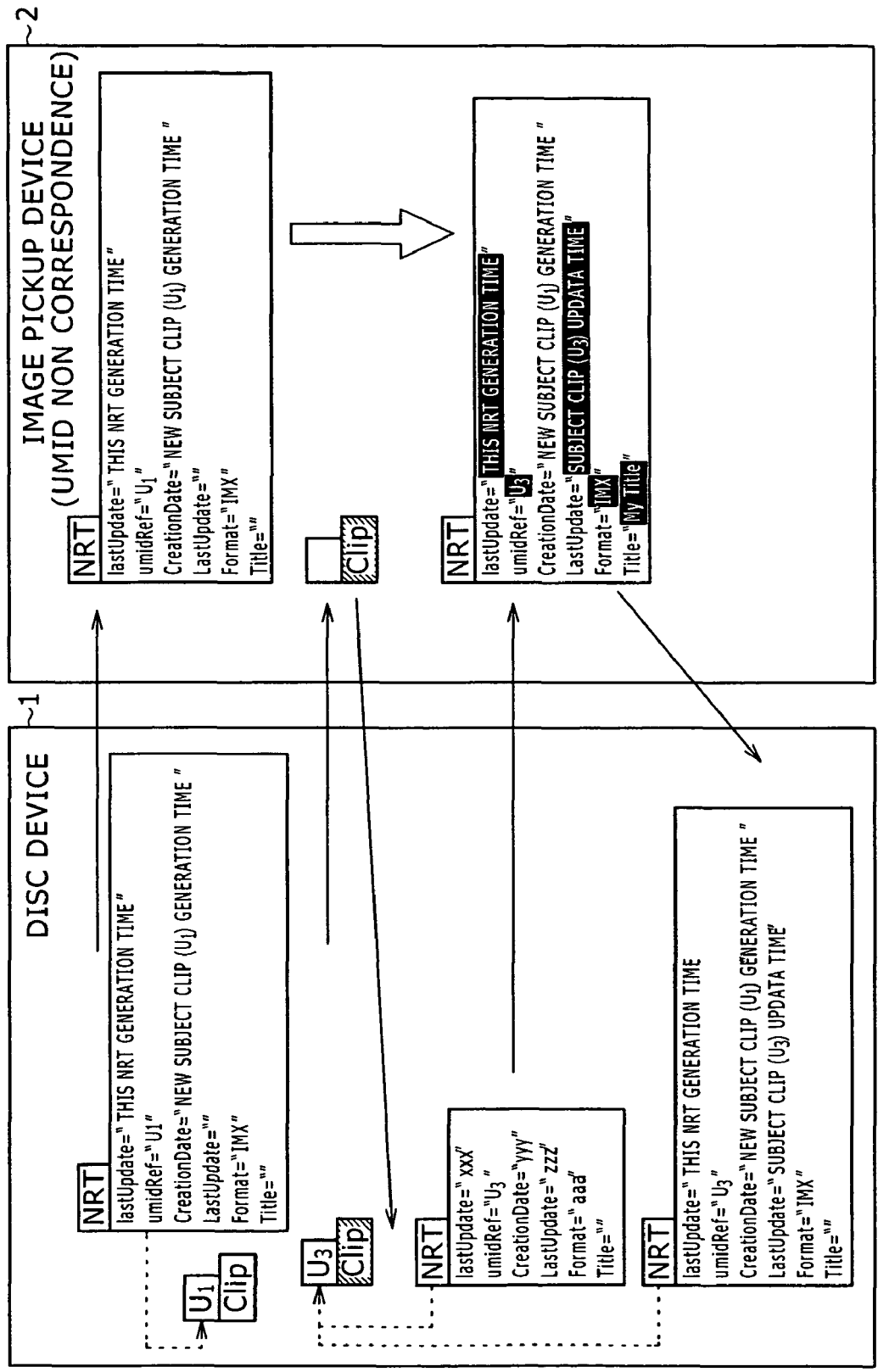
FIG. 35 is a diagram for explaining an editing process of a clip with NRT by the disc drive and the editing device shown in FIG. 6 in the standard FTP transfer.

The communication section 20 reads the clip with NRT that has been stored in the memory section 19 in Step S301, and then transmits the read clip to the editing device 5 through the network 6 in Step S302. That is, for example, as shown in FIG. 35, the clip with the NRT is transmitted to the editing device 5. In the NRT, "$U_1$" is add as the UMID, the lastUpdate is recorded as "this NRT update time", the umidRef is recorded as "$U_1$", the Creation Date is recorded as "the new object clip ($U_1$) generation time", the LastUpdate is recorded in a blank state, the Format is recorded as "IMX", and the Title is recorded in the blank state.

In Step S321, the communication section 141 receives and acquires the transmitted clip and NRT. In Step S322, the clip data editing section.134 judges whether the clip is edited by operating the input section 138, or not. For example, in the case where the input section 138 is operated by the user to edit the clip, the operation is advanced to Step S323.

In Step S323, the clip data editing section 134 updates the clip on the basis of the information on the edited clip.

In Step S324, the communication section 141 transmits the edited clip to the disc drive 1. The metadata editing section 135 cannot generate the UMID, and therefore as shown in FIG. 35, transmits the edited clip in a state where the UMID is not added to the edited clip.

The subsequent processing is identical with the processing of Steps S231 to S241 and Steps 223 to 226 in the flowchart of FIG. 30. That is, in the processing of Steps S303 to S309, the edit list editing section 45 adds the UMID indicated by "$U_3$" to the clip that has been transmitted from the editing device 5, for example, as shown in FIG. 35. Further, the edit list editing section 45 transmits the newly generated NRT to the editing device 5 in a state where the NRT is attached to the clip. In the newly generated NRT, the lastupdate is recorded as "xxx", the umidRef is recorded as "$U_3$", the Creation Date is recorded as "yyy", the LastUpdate is recorded as "zzz", the Format is recorded as "aaa", and the Title is recorded in the blank state.

In Steps S325 to S328, the metadata editing section 135 updates the NRT that has been acquired in the processing of Step S321 on the basis of the transmitted NRT, and again transmits the updated NRT to the disc drive 1. That is, the NRT is updated to the NRT in which the lastupdate is recorded as "this NRT generation time", the umidRef is recorded as "$U_3$", the Creation Date is recorded as "the new object clip ($U_1$) generation time", the LastUpdate is recorded as "the object clip ($U_3$) update time", the Format is recorded as "IMX", and the Title is recorded "My Title". Then, the updated NRT is transmitted to the disc drive 1. In FIG. 35, the updated item is indicated by white characters on the black background.

Then, through the processing of Steps S310 to S313, the disc drive 1 records the transmitted NRT in association with the clip that has been transmitted from the editing device 5 as it is, in the disc recording medium 24 as shown in FIG. 35.

Through the above processing, even if the editing device 5 that cannot generate the UMID or cannot recognize the UMID edits the clip and imports to the disc drive 1, it is possible to record the UMID in the disc drive 1 as if the UMID can be generated in the editing device 5, and the NRT is generated, correspondingly.

Figure 36:
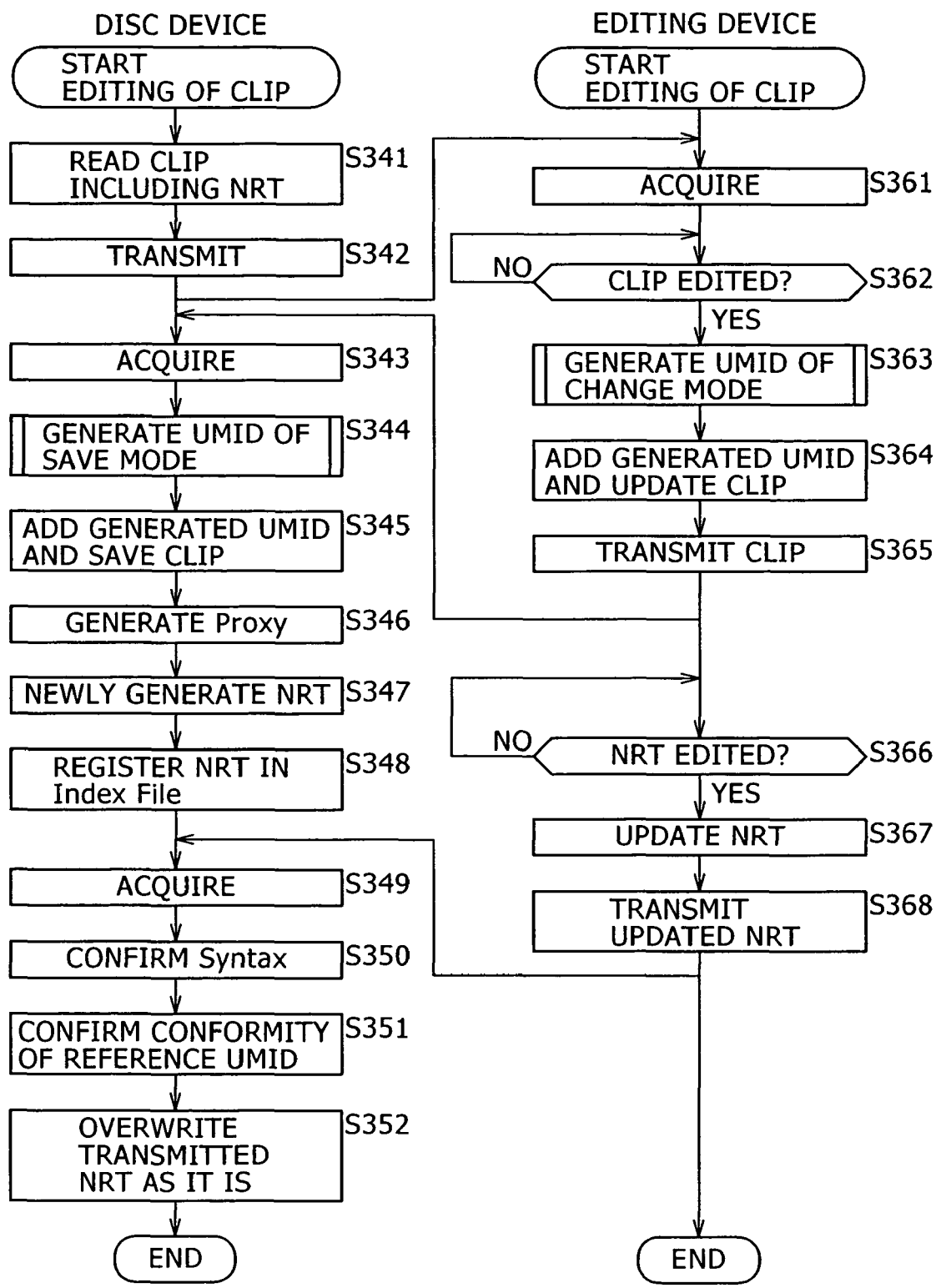
FIG. 36 is a flowchart for explaining an editing process of a clip with NRT by the disc drive and the editing device shown in FIG. 5 in the extended FTP transfer.

Subsequently, a description will be given of a process in which the clip that has been recorded in the disc drive 1 is edited by the editing device 4, and the clip with NRT is again transmitted to the disc drive 1 through the extended FTP transfer, and then imported (recorded) with reference to a flowchart of FIG. 36. The processing of Steps S343 to S352 in the flowchart of FIG. 36 are identical with the processing of Steps S261 and S270 which are described with reference to the flowchart of FIG. 32. Therefore, their description will be omitted.

For example, when the clip with NRT is transmitted to the editing device 4 through the processing of Steps S341 and S342, the communication section 111 acquires the transmitted clip in Step S361. In the NRT, as indicated at the upper portion of the disc drive 1 shown in FIG. 37, the UMID is indicated by "$U_1$", the lastUpdate is recorded as "this NRT generation time", the umidRef is recorded as "$U_1$", the Creation Date is recorded as "the new object clip ($U_1$) generation time", the LastUpdate is recorded in a blank state, the Format is recorded as "IMX", and the Title is recorded in the blank state. In Step S362, the clip data editing section 104 judges whether the clip has been edited by operating the input section 108, or not. For example, in the case where the input section 108 is operated by the user to edit the clip, the processing is advanced to Step S363.

In Step S363, the UMID editing section 121 executes the UMID generating process of the change mode. That is, when the clip is transmitted from the disc drive 1, the clip is transmitted through the standard FTP transfer. The UMID generating process of the change mode is described above with reference to the flowchart of FIG. 14, and therefore their description will be omitted.

In Step S363, the clip data editing section 104 updates the clip according to the contents of the edited clip.

In Step S364, the edit list generating section 105 attaches the generated UMID to the updated clip. Then, in Step S365, the communication section 111 transmits the clip attached with "$U_2$" as the updated UMID to the disc drive 1, for example, as shown in FIG. 37.

The subsequent processing is identical with the processing of Steps S261 to S266 in FIG. 32. In the disc drive 1, the edit list editing section 14 adds the UMID indicated by "$U_2$" which has been generated through the UMID generating process of the save mode to the clip that has been transmitted from the editing device 4, for example, as shown in FIG. 37. Further, the NRT is newly added and then stored in the memory section 82 in a state where the NRT is attached to the clip. In the newly generated NRT, the lastupdate is recorded as "xxx", the umidRef is recorded as "$U_3$", the Creation Date is recorded as "yyy", the LastUpdate is recorded as "zzz", the Format is recorded as "aaa,", and the Title is recorded in the blank state.

On the other hand, in Step S366, the NRT editing section 122 of the editing device 4 judges whether the NRT has been edited by operating the input section 108, or not, and this processing is repeated until the NRT is edited. For example, when it is judged that the NRT has been edited, in Step S367, the NRT editing section 122 updates the NRT that has been transmitted in the processing of Step S342 in correspondence with the edited NRT, for example, as shown in FIG. 37. That is, in FIG. 37, the NRT of the editing device 4 is updated to an NRT in which the lastUpdate is recorded as "this NRT generation time", the umidRef is recorded as "$U_2$", the Creation Date is recorded as "the new object clip ($U_1$) generation time", the LastUpdate is recorded as "the object clip ($U_2$) update time", the Format is recorded as "IMX", and the Title is recorded "My Title". In Step S368, the communication section 111 transmits the updated NRT to the disc drive 1. In FIG. 37, the updated item is indicated by white characters on the black background.

Figure 37:
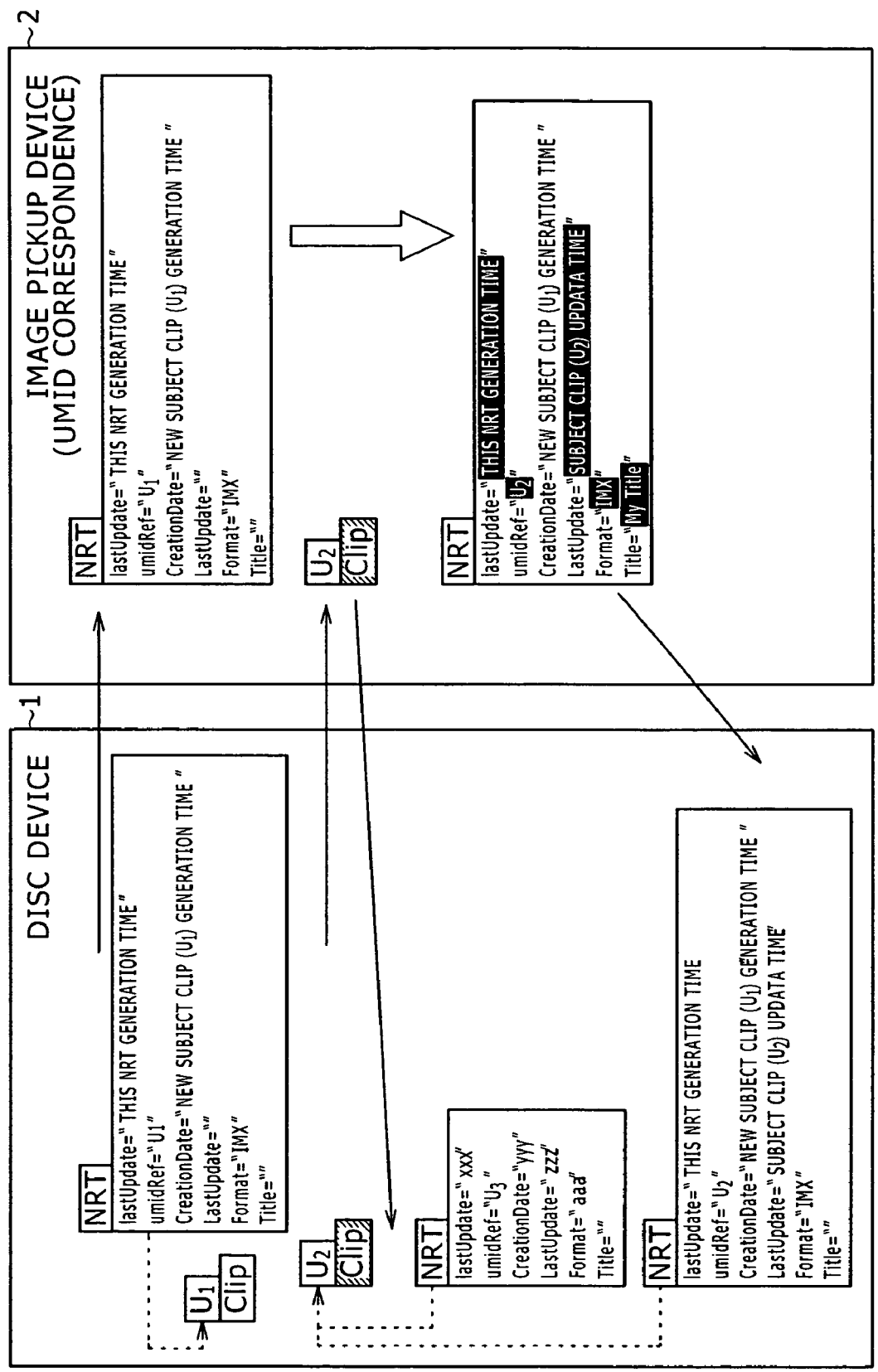
FIG. 37 is a diagram for explaining an editing process of a clip with NRT by the disc drive and the editing device shown in FIG. 5 in the extended FTP transfer.

Then, through the processing of Steps S349 to S352, the disc drive 1 records the transmitted NRT in association with the clip that has been transmitted from the editing device 4 as it is, in the disc recording medium 24 as shown in FIG. 37.

Through the above processing, even if the clip that has been recorded in the disc drive 1 is read and edited by the editing device 4, it is possible to record the UMID in the disc drive 1 without changing the UMID through the extended FTP transfer by changing the NRT.

The above description was given assuming that the MXF transfer process in the FTP transfer is conducted. However, it is needless to say that the transfer type is not limited to the above structure, and other transfer types may be applied, for example, an SDI transfer may be applied.

In the SDI transfer, the UMID generating method changes according to a case of a single clip and a case of plural clips.

Figure 38:
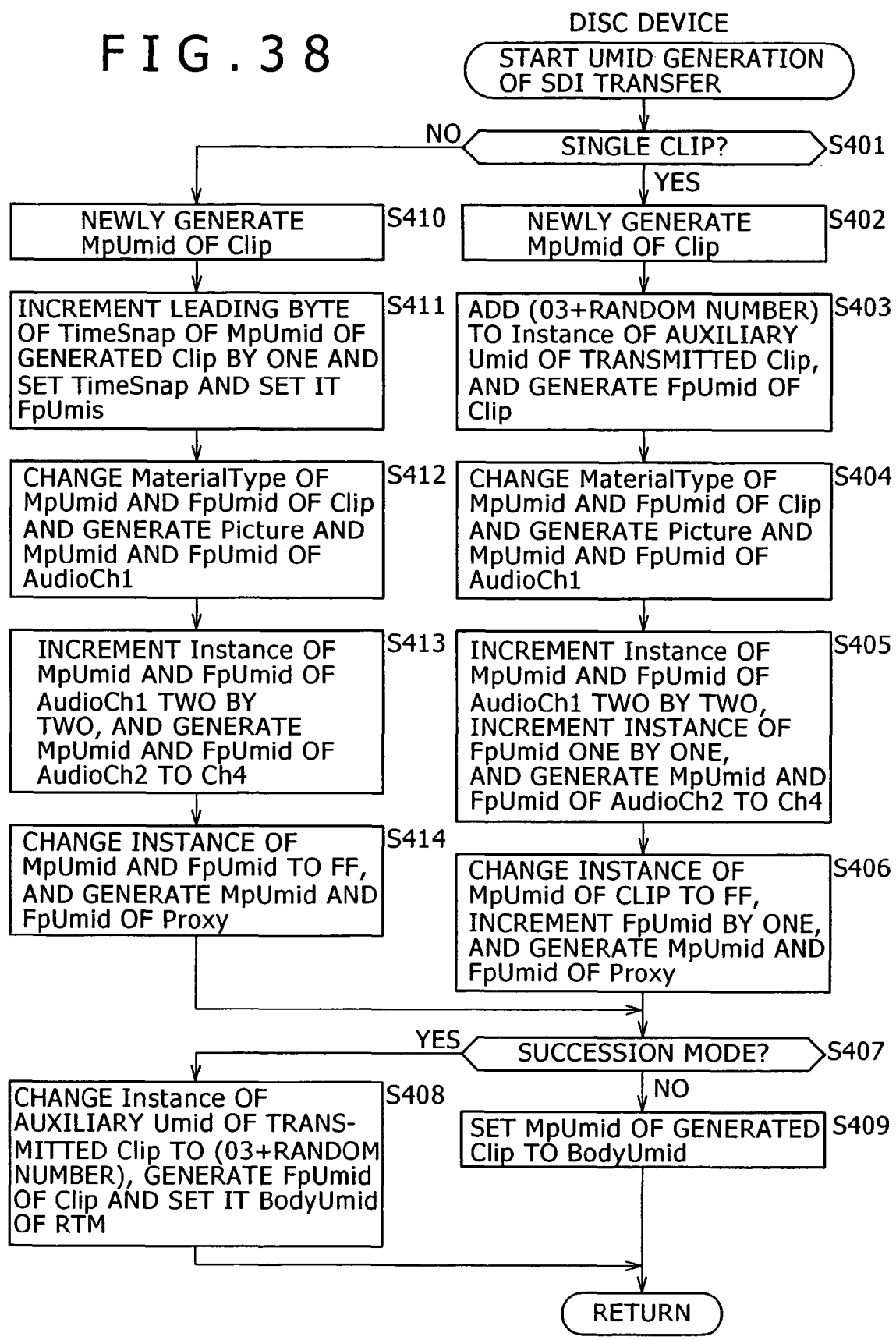
FIG. 38 is a flowchart for explaining a UMID generating process in an SDI transfer.

Now, the UMID generating process in the SDI transfer will be described with reference to a flowchart of FIG. 38.

In Step S401, the edit list editing section 14 judges whether the clip in the SDI transfer is a single clip, or not. For example, when it is judged that the clip is of the single type, the processing is advanced to Step S402.

In Step S402, the clip UMID generating section 51a newly generates the MpUmid with respect to the clip. For example, it is assumed that the MpUmid with respect to the clip is generated as "060A2B340101010501010D43130000006 C291C00722405C2080046020 117F001" as shown in FIG. 39. In FIG. 39, "UMID of input signal" is indicated at the uppermost column in the figure, and the auxiliary UMID of the transmitted clip is exhibited. In this case, the UMID that is attached to the transmitted clip is displayed as "660A2B340101010501010D431302FEDC2405C2080046 020117F0016C2 91C0072".

In Step S403, the clip UMID generating section 31a changes the instance number in the auxiliary Umid that is attached to the transmitted clip to (03+random number), and generates the FpUmid of the new clip. That is, as shown in FIG. 39, the clip UMID generating section 31a changes "02FEDC" which is the instance number in the MpUmid that is attached to the supplied clip to "03ABCD", to thereby generate the FpUmid of the new clip. In FIG. 39, the new portion is indicated by white characters on the black background. The "ABCD" in the instance number indicates the value generated by the random number.

In Step S404, the picture UMID generating section 31c changes the Material Type of the MpUmid and FpUmid of the clip, and generates the MpUmid and FpUmid of the image data. Also, the audio UMID generating section 31d changes the Material Type of the MpUmid and FpUmid of the clip, and generates the MpUmid and FpUmid of the audio data of a first channel as shown in FIG. 39.

In Step S405, as shown in FIG. 39, the audio UMID generating section 31 sequentially increments the head byte of the MpUmid and FpUmid of the audio data of the first channel two by two, respectively, and generates the MpUmid of the audio data of the second to fourth channels. Also, the audio UMID generating section 31 sequentially increments the last byte of the instance number of the FpUmid of the audio data of the first channel one by one, respectively, and generates the FpUmid of the audio data of the second to fourth channels.

That is, as shown in FIG. 39, the value of the head byte of the TimeSnap of the MpUmid in the sound data of the first channel is "6C". The audio UMID generating section 31d increments that value by two to provide "6E", respectively, and generates the MpUmid in the sound data of the second channel.

Likewise, the value of the head byte of the TimeSnap of the MpUmid in the sound data of the second channel is "6E", respectively. Therefore, the audio UMID generating section 31d further increments that value by two to provide "70", and generates the MpUmid in the sound data of the third channel.

Further, the value of the head byte of the TimeSnap of the MpUmid in the sound data of the third channel is "70". Therefore, the audio UMID generating section 31d further increments that value by two to provide "72", and generates the MpUmid in the sound data of the fourth channel.

Also, the value of the instance number of the FpUmid in the sound data of the first channel is "03ABCD". The audio UMID generating section 31d increments that value by one to provide "03ABCD", and generates the FpUmid in the sound data of the second channel.

Likewise, the value of the instance number of the FpUmid in the sound data of the second channel is "03ABCE". Therefore, the audio UMID generating section 31d further increments that value by one to provide "03ABCF", respectively, and generates the FpUmid in the sound data of the third channel.

Further, the value of the instance number of the FpUmid in the sound data of the third channel is "03ABCF". Therefore, the audio UMID generating section 31d further increments that value by one to provide "03ABD0", and generates the FpUmid in the sound data of the fourth channel.

In Step S406, the proxy UMID generating section 31e changes the head byte of the instance number of the MpUmid of the clip from "00" to "FF" indicative of the proxy data. Then, the proxy UMID generating section 31e increments the last byte of the instance number of the FpUmid of the clip by one, and generates the MpUmid and FpUmid of the proxy data. That is, in the case of FIG. 39, the instance of the MpUmid of the proxy data becomes "FF0000", and the instance of the FpUmid becomes "03ABCE" obtained by incrementing "3ABCD" of the instance number of the clip by one.

In Step S407, the RTM-UMID generating section 31d judges whether the RTM is in a succession mode, or not. The generation of the RTM-UMID is in the succession mode and a new mode, and any modes can be set. The succession mode is a mode in which only the instance number is changed by using the auxiliary UMID to use a part of the auxiliary UMID in succession. Also, the new mode is a mode in which the MpUmid of the newly generated clip is used as it is.

For example, in Step S407, when it is judged as the succession mode, the RTM-UMID generating section 31b changes the instance number of the auxiliary Umid of the transmitted clip to (03+random number), and generates the changed number as the BodyUmid of the RTM in Step S408. That is, as shown in FIG. 39, the BodyUmid of the RTM is generated as the same value as the FpUmid of the clip through the same process as the process of generating the FpUmid of the clip.

On the other hand, when it is judged in Step S401 that the clip is not the single clip, but the plural clips, the clip UMID generating section 31a newly generates the MpUmid with respect to the clip in Step S410. For example, it is assumed that the MpUmid with respect to the clip is generated as "060A2B3401010105010101010D43130000006C291C0072240 5C2080046020 117F001" as shown in FIG. 40. In FIG. 40, "UMID of Input signal" is exhibited at the uppermost column in the figure, which represents the UMID of the MpUmid of the transmitted clip. However, the transmitted clips are not defined because the clips are plural.

In Step S411, the clip UMID generating section 31a increments the head byte of the TimeSnap of the generated MpUmid by one to provide the FpUmid. That is, as shown in FIG. 40, the FpUmid of the clip is generated as the same value as the MpUmid of the newly generated clip.

In Step S412, as shown in FIG. 40, the picture UMID generating section 31c changes the Material Type of the MpUmid and FpUmid of the clip from "0D" to "06", and generates the MpUmid and FpUmid of the image data. Also, the audio UMID generating section 31d changes the Material Type of the MpUmid and FpUmid of the clip from "0D" to "08", and generates the MpUmid and FpUmid of the sound data of the first channel.

In Step S413, the audio UMID generating section 31d sequentially increments the head byte of the TimeSnap of the MpUmid and FpUmid of the audio data of the first channel two by two, respectively, and generates the MpUmid and FpUmid of the sound data of the second to fourth channels.

In Step S414, as shown in FIG. 40, the proxy UMID generating section 31e changes the head bytes of the respective instance numbers of the MpUmid and FpUmid of the clip from "00" to "FF" indicative of the proxy data to generate the MpUmid and FpUmid of the proxy data.

Also, when it is judged in Step S407 that the mode is not the succession mode but the new mode, the RTM-UMID generating section 31b generates the MpUmid of the generated clip as the BodyUmid of the RTM in Step S409. That is, as shown in FIG. 40, the BodyUmid of the RTM is generated as the same value as the MpUmid of the generated clip.

The above description is given of a case in which there are four sound channels. However, it is needless to say that there are provided the channels of the number other than four.

Through the above processing, even in the SDI transfer, only the MpUmid of the clip is substantially generated, thereby making it possible to generate other UMID in a chain reaction and to generate the UMID at a high speed. Also, the incremented value is not limited to 1 or 2 as described above, and other number may be incremented.

As was described above, since the plural new UMID are generated in a chain reaction by only changing the Material Type, TimeSnap or the instance of the generated UMID after one UMID has been generated, a large amount of UMID can be generated at a high speed.

Also, even if there is a device such as the editing device 5 that cannot generate the UMID or cannot recognize the UMID, if the disc drive 1 generates the UMID and manages the UMID in association with the NRT, it is possible to record the clip with NRT to which the UMD is attached in the disc drive 1 as if the device that cannot generate the UMID or cannot recognize the UMID generates the UMID and manages the clip.

The above-mentioned series of processing can be executed by hardware or can be executed by software as described above. In the case where the series of processing is executed by software, the program is installed from a recording medium or the like into a computer having a dedicated hardware into which a program that structures the above software is incorporated, or, for example, a general-purpose personal computer that can execute various functions by installing various programs.

As shown in FIG. 2, the recording medium is made up of a magnetic disc (including a flexible disc) in which the program has been recorded, an optical disc (CD-ROM (compact disc read only memory), a DVD (digital versatile disc including a magnetic optical disc), or a removable media 23 including a package media formed of a semiconductor memory or the like, which are distributed for supplying the program to the user in addition the disc drive 1. Also, the recording medium may be made up of a hard disc including the ROM 12 or the memory section 19 in which the programs are stored, which is supplied to the user in a state where the hard disc is incorporated into the computer in advance.

In the present specification, the step of describing the program that is supplied from the medium includes a process that is conducted according to the order described above in time series as well as a process that is executed in parallel or individually even if the process is not always conducted in the time series.

Also, in the present specification, the "system" means the overall device that is made up of plural devices.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A disc drive apparatus comprising:
a receiving device that receives clip data, via a network, generated by one of an information editing apparatus which edits clip data and an image pick up apparatus which obtains clip data, wherein the clip data includes at least real time metadata attached thereto;
a UMID (unique material identifier) generating device, that determines if UMID is attached to the received clip data and that generates UMID corresponding to the received clip data when UMID is not attached to the received clip data;
a nonreal time metadata generating device that (a) determines if nonreal time metadata is attached to the received clip data, (b) when nonreal time metadata is attached, confirms whether UMID included in the attached nonreal time metadata is associated with stored clip data and (c) generates nonreal time metadata which corresponds to the received clip data when nonreal time metadata is not attached to the received clip data;
a transmitting device that transmits the nonreal time metadata to the information editing apparatus; and
a disc recording device that stores (a) the received clip data, and (b) the generated UMID and generated nonreal time metadata associated with the received clip data and that overwrites the nonreal time metadata when UMID is confirmed by the nonreal time metadata generating device.

2. A disc drive storage method comprising the steps of:
receiving clip data, via a network, generated by one of an information editing apparatus which edits clip data and an image pickup apparatus which obtains clip data, wherein the clip data includes at least real time metadata attached thereto;
determining if UMID (unique material identifier) is attached to the received clip data and generating UMID corresponding to the received clip data when UMID is not attached to the received clip data;

determining if nonreal time metadata is attached to the received clip data, when nonreal time metadata is attached, confirming whether UMID included in the attached nonreal time metadata is associated with stored clip data and generating nonreal time metadata which corresponds to the received clip data when nonreal time metadata is not attached to the received clip data;

transmitting the nonreal time metadata to the information editing apparatus;

storing (a) the received clip data and, (b) the generated UMID and generated nonreal time metadata associated with the received clip data, and overwriting the nonreal time metadata when UMID is confirmed to be associated with stored clip data.

3. A recording medium readable by a computer of a disc drive apparatus, the recording medium storing a program comprising:

controlling the reception of clip data, via a network, generated by one of an information editing apparatus which edits clip data and an image pickup apparatus which obtains clip data, wherein the clip data includes at least real time metadata attached thereto;

determining if UMID (unique material identifier) is attached to the received clip data and controlling generating of UMID corresponding to the clip data received when UMID is not attached to the received clip data;

determining if nonreal time metadata is attached to the received clip data, when nonreal time metadata is attached, confirming whether UMID included in the attached nonreal time metadata is associated with stored clip data and controlling the generation of nonreal time metadata which corresponds to the received clip data when nonreal time metadata is not attached to the received clip data;

controlling the transmission of the nonreal time metadata to the information editing apparatus; and controlling the storage of (a) the received clip data and, (b) the generated UMID and generated nonreal time metadata associated with the received clip data and overwriting the nonreal time metadata when UMID is confirmed to be associated with stored clip data.

4. A computer program product, embodied on a computer readable storage medium executable by a computer of disc drive apparatus, performing the steps of:

controlling the reception, via a network, of clip data generated by one of an information editing apparatus which edits clip data and an image pickup apparatus which picks up clip data, wherein the clip data includes at least real time metadata attached thereto;

determining if UMID (unique material identifier) is attached to the received clip data and controlling generation of UMID corresponding to the clip data received when UMID is not attached to the received clip data;

determining if nonreal time metadata is attached to the received clip data, when nonreal time metadata is attached, confirming whether UMID included in the attached nonreal time metadata is associated with stored clip data and controlling the generation of nonreal time metadata which corresponds to the received clip data when nonreal time metadata is not attached to the received clip data;

controlling the transmission of the nonreal time metadata to the information editing apparatus; and controlling the storage of (a) the received clip data and (b) the generated UMID and generated nonreal time metadata associated with the received clip data and overwriting the nonreal time metadata when UMID is confirmed to be associated with stored clip data.

5. The disc drive apparatus according to claim 1, wherein the receiving device further receives the nonreal time metadata transmitted from the transmitting device which has been edited by the information editing apparatus.

6. The disc drive apparatus according to claim 5, wherein the disc recording device overwrites the nonreal time metadata edited by the information editing apparatus on the nonreal time metadata generated by the nonreal time metadata generating device, and stores the overwritten nonreal time metadata in association with the clip data generated by the information editing apparatus.

\* \* \* \* \*